(12) United States Patent
Manzari et al.

(10) Patent No.: US 11,386,280 B2
(45) Date of Patent: Jul. 12, 2022

(54) DEVICE, METHOD, AND GRAPHICAL USER INTERFACE FOR HANDLING DATA ENCODED IN MACHINE-READABLE FORMAT

(71) Applicant: Apple Inc., Cupertino, CA (US)

(72) Inventors: Behkish Johnnie Manzari, San Francisco, CA (US); Ada Chan, Cupertino, CA (US); Yongjun Zhang, Sunnyvale, CA (US); Patrick Lee Coffman, San Francisco, CA (US); Charles Ying, San Mateo, CA (US); Steven Jon Falkenburg, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/978,117

(22) Filed: May 12, 2018

(65) Prior Publication Data

US 2018/0349659 A1   Dec. 6, 2018

Related U.S. Application Data

(60) Provisional application No. 62/514,588, filed on Jun. 2, 2017.

(51) Int. Cl.
*G06K 7/10* (2006.01)
*G06F 3/0484* (2022.01)
(Continued)

(52) U.S. Cl.
CPC ....... *G06K 7/10722* (2013.01); *G06F 3/0484* (2013.01); *G06K 7/1417* (2013.01); *H04N 5/232935* (2018.08)

(58) Field of Classification Search
CPC .................................................. G06K 7/10722
(Continued)

(56) References Cited

U.S. PATENT DOCUMENTS

| 9,380,225 B2 | 6/2016 | Tiscareno et al. |
| 2014/0258127 A1* | 9/2014 | Chava .................. G06Q 20/326 705/44 |

(Continued)

OTHER PUBLICATIONS

International Search Report and Written Opinion of corresponding Intl. App. No. PCT/US2018/023298 dated Aug. 13, 2018.

*Primary Examiner* — Rafferty D Kelly
(74) *Attorney, Agent, or Firm* — Fernando & Partners, LLP

(57) ABSTRACT

An electronic device displays a media capture user interface that includes a media capture preview of objects in a field of view of the camera. While displaying the media capture user interface, the electronic device scans the field of view of the camera for data encoded in an optical machine-readable format. In accordance with a determination that the field of view of the camera includes data encoded in the optical machine-readable format that meets respective notification criteria, the electronic device displays a notification that indicates that the camera application has detected data encoded in the optical machine-readable format. In accordance with a determination that the field of view of the camera does not include data encoded in the optical machine-readable format that meets the respective notification criteria, the electronic device maintains display of the media capture user interface of the camera application without displaying the notification.

57 Claims, 54 Drawing Sheets

(51) Int. Cl.
*G06K 7/14* (2006.01)
*H04N 5/232* (2006.01)

(58) Field of Classification Search
USPC .................................................. 235/462.11
See application file for complete search history.

(56) References Cited

U.S. PATENT DOCUMENTS

| | | | | |
|---|---|---|---|---|
| 2015/0163345 A1* | 6/2015 | Cornaby | ............ | G06F 3/04847 |
| | | | | 345/633 |
| 2016/0119749 A1* | 4/2016 | Moldavsky | ............. | H04L 65/60 |
| | | | | 455/456.3 |
| 2017/0300734 A1* | 10/2017 | Zheng | ................ | G06K 7/10792 |

* cited by examiner

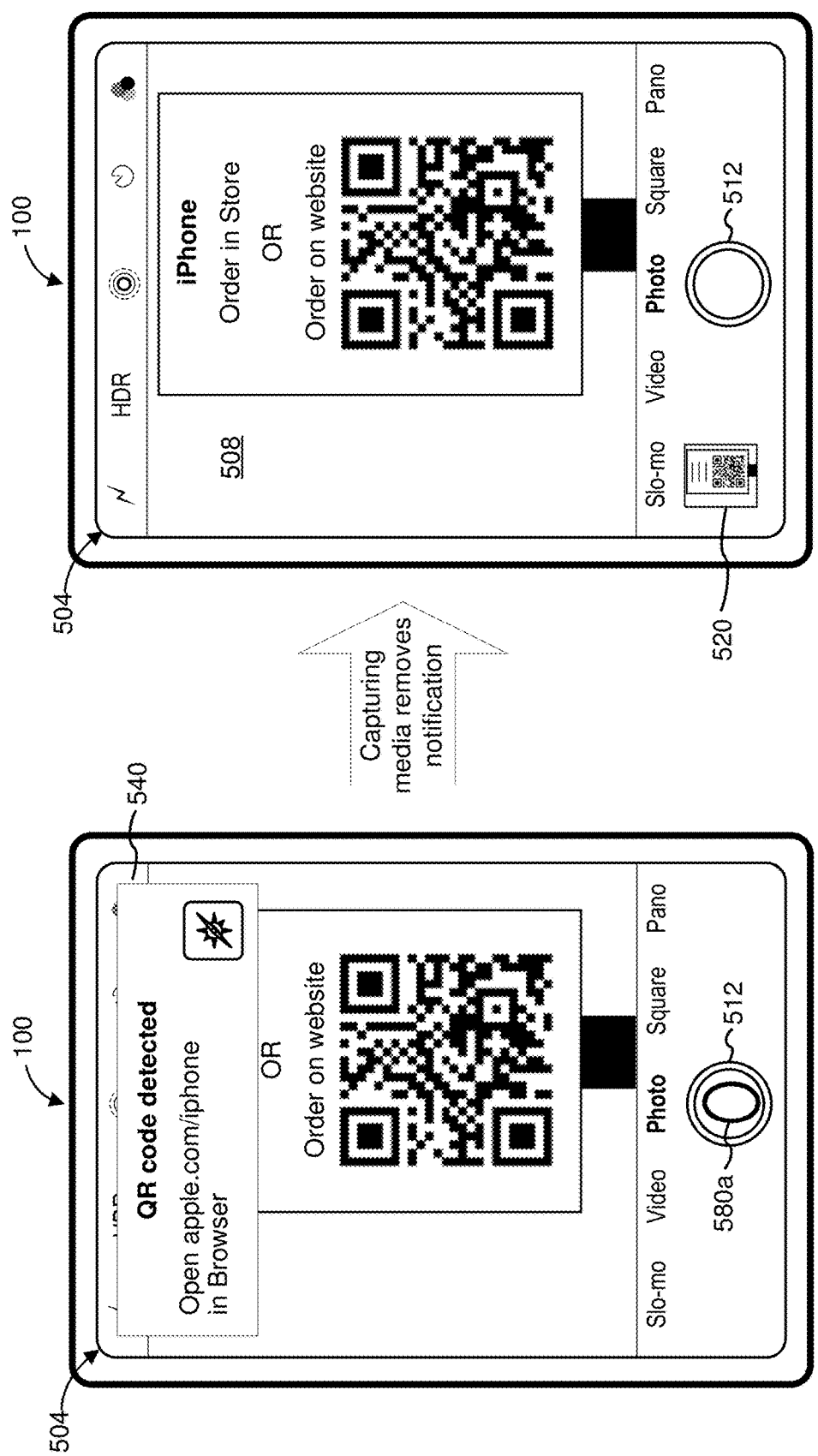

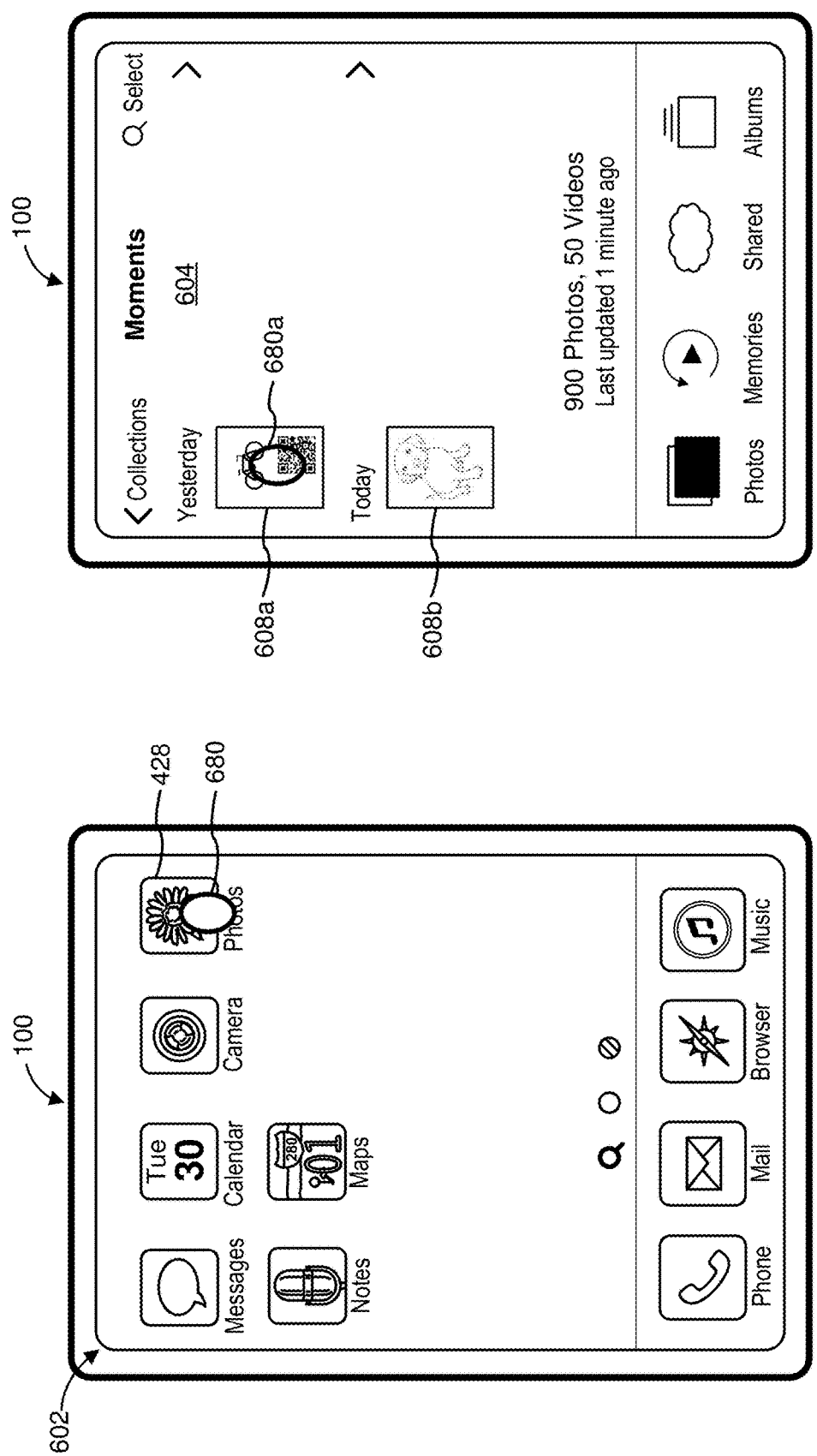

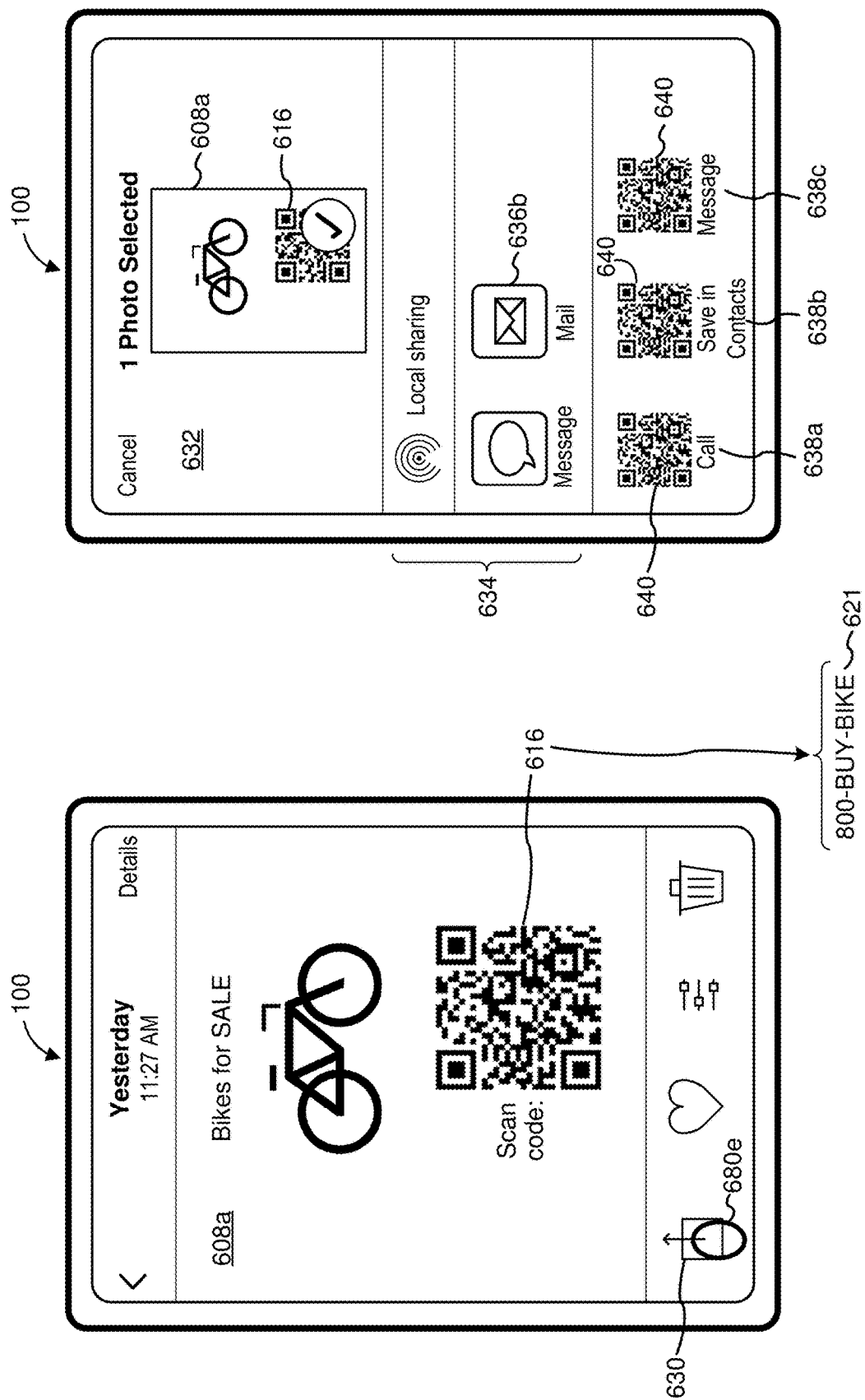

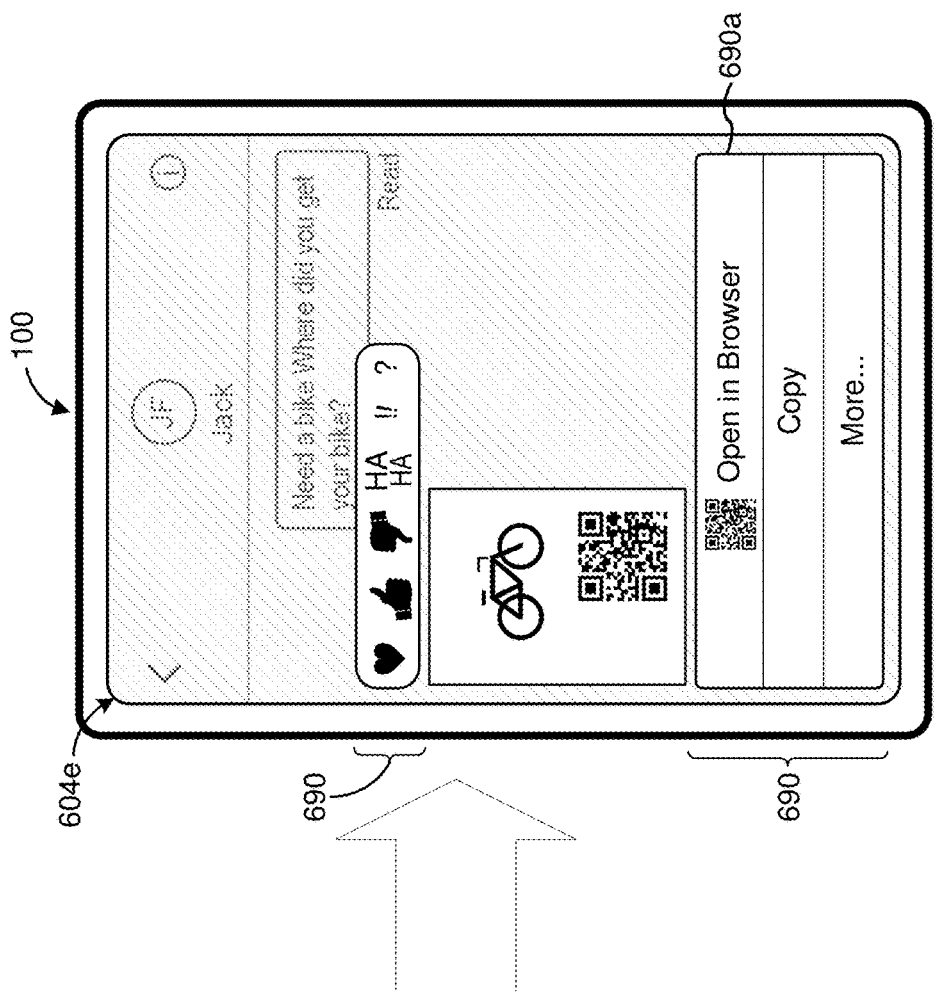
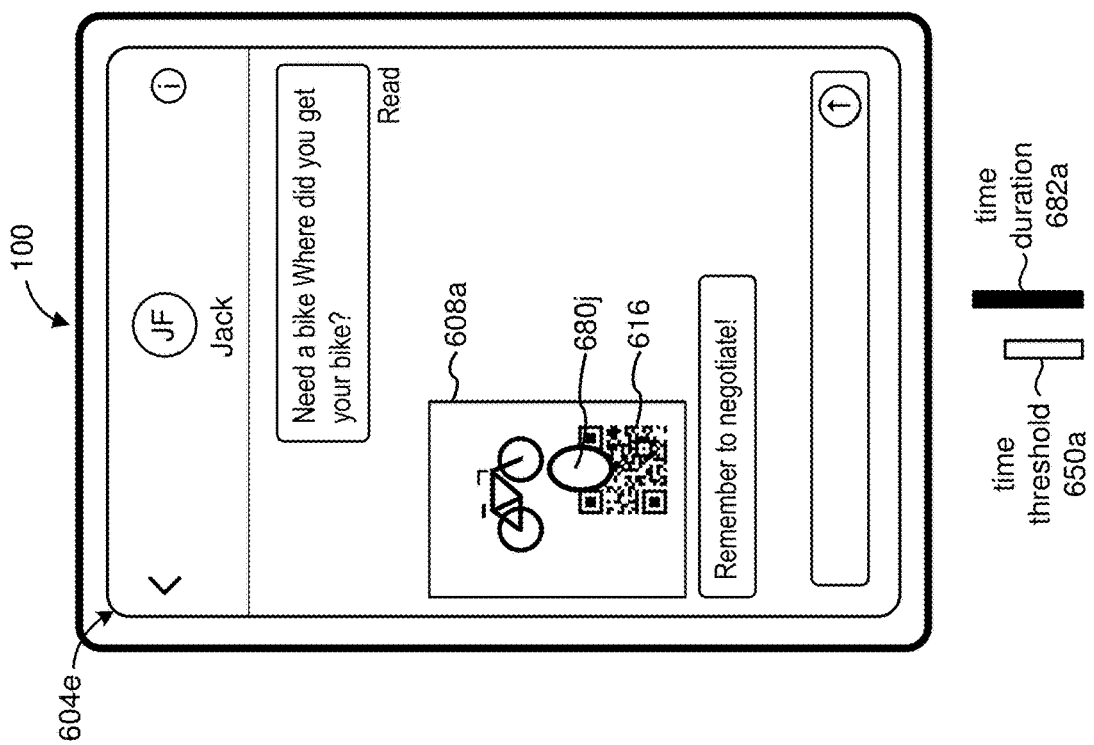
Figure 6P
Figure 6O

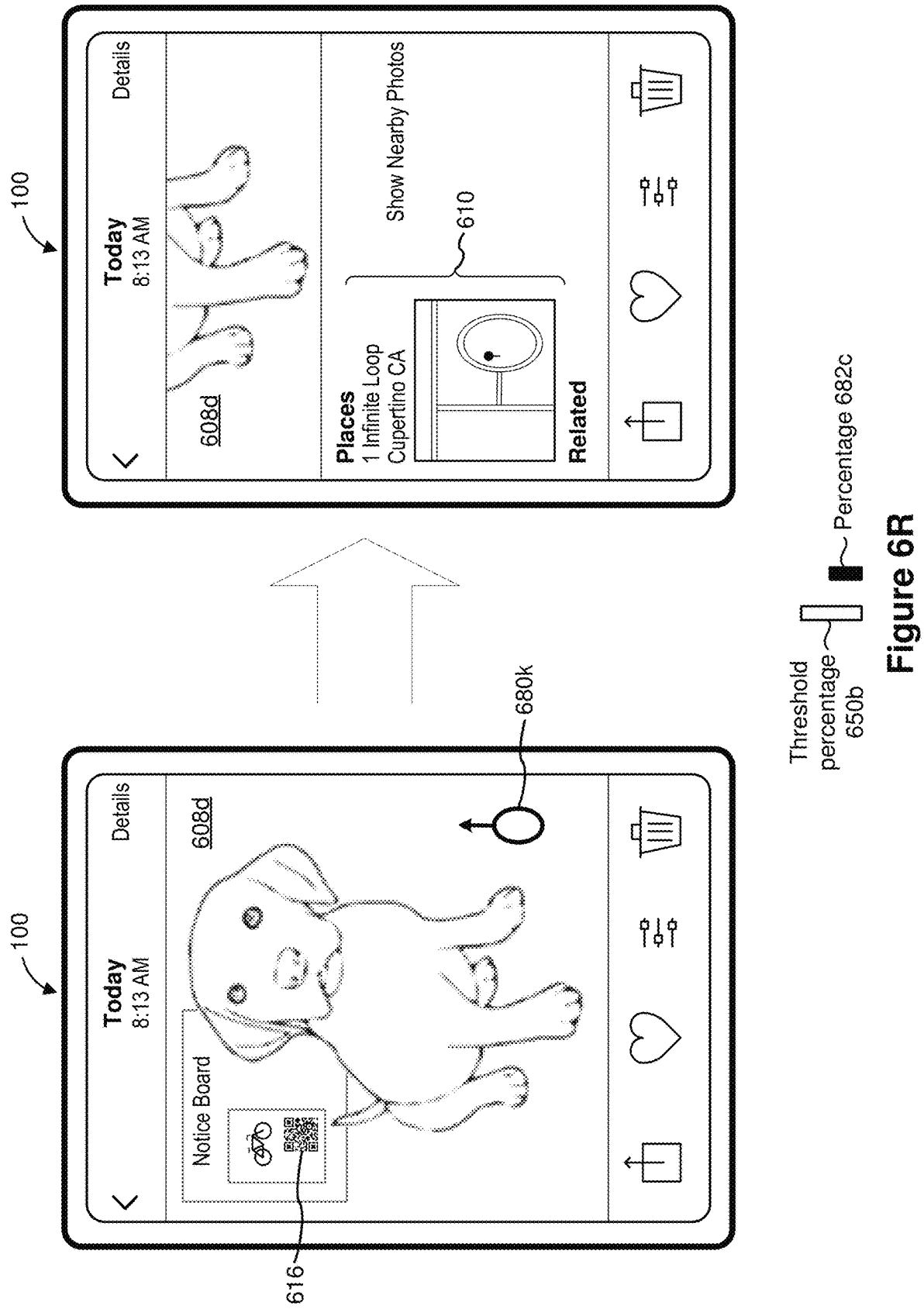

800

┌─────────────────────────────────────────────────────────────┐
│ At a device including a display, a camera, a non-transitory memory, and │ 802
│ one or more processors coupled with the display, the camera and the │
│ non-transitory memory: │
│                                                             │
│   Display, on the display, a media capture user interface of a camera │
│   application that allows a user to capture media, wherein the media │
│   capture user interface of the camera application includes: │
│                                                             │
│     A media capture preview of objects in a field of view of the │
│   camera that changes as the objects in the field of view of the camera │
│   change; and                                               │
│                                                             │
│     A media capture affordance that, when activated, captures │
│   media that corresponds to the field of view of the camera │
└─────────────────────────────────────────────────────────────┘

┌─────────────────────────────────────────────────────────────┐
│ While displaying the media capture user interface of the camera: │ 804
│   Scan the field of view of the camera for data encoded in an optical │
│   machine-readable format                                   │
└─────────────────────────────────────────────────────────────┘

┌─────────────────────────────────────────────────────────────┐
│   In accordance with a determination that the field of view of the │ 806
│ camera includes data encoded in the optical machine-readable format │
│ that meets respective notification criteria, display a notification that │
│ indicates that the camera application has detected data encoded in the │
│ optical machine-readable format                             │
└─────────────────────────────────────────────────────────────┘

┌─────────────────────────────────────────────────────────────┐
│   In accordance with a determination that the field of view of the │ 808
│ camera does not include data encoded in the optical machine-readable │
│ format that meets the respective notification criteria, maintaining display │
│ of the media capture user interface of the camera application without │
│ displaying the notification                                 │
└─────────────────────────────────────────────────────────────┘

Figure 8A (A)

While displaying the notification, receive a user input that activates the media capture affordance; and In response to receiving the user input:

Remove the notification;

Capture media via the camera; and

Display the captured media on the display

⎬ 810

(B)

The optical machine-readable format includes a barcode, and wherein scanning the field of view includes scanning the field of view for the barcode ⎬ 804 / 812

The barcode is a one-dimensional barcode, and wherein scanning the field of view includes scanning the field of view for the one-dimensional barcode ⎬ 814

The barcode is a two-dimensional barcode, and wherein scanning the field of view includes scanning the field of view for the two-dimensional barcode ⎬ 816

Figure 8B (D)

> Detecting a user input ; and
>
> In response to detecting the user input:
>
> in accordance with a determination that the user input meets intensity criteria, wherein the intensity criteria include a requirement that a characteristic intensity of the user input increase above a respective intensity threshold in order for the intensity criteria to be met, display an expanded view of the notification;
>
> In accordance with a determination that the user input does not meet the intensity criteria, forgo displaying the expanded view of the notification ⎯ 842
>
>> Present, within the notification, a plurality of affordances, each affordance being associated with a respective user interface operation; and
>>
>> In response to a selection of a first affordance of the plurality of affordances, perform the respective user interface operation associated with the first affordance ⎯ 844

(D)

> Receive a user input selecting the notification; and
>
> In response to receiving the user input, connect with the network using the authentication information included in the data encoded in the optical machine-readable format ⎯ 846

902 — At a device including a display, a non-transitory memory, and one or more processors coupled with the display and the non-transitory memory:

Display, on the display, an image (A)

904 — While displaying the image, receive an input indicative of a request for additional information corresponding to the image (B)

906 — In response to receiving the request for additional information corresponding to the image:

In accordance with a determination that the image includes data encoded in an optical machine-readable format that meets respective threshold criteria, display information corresponding to the data encoded in the optical machine-readable format (C)

(D)

908 — In accordance with a determination that the image does not include data encoded in the optical machine-readable format that meets respective threshold criteria, display additional information about the image without displaying information corresponding to data encoded in the optical machine-readable format (E)

```
┌─────────────────────────────────────────────────────────┐
│ At a device including a display, a non-transitory       │
│ memory, and one or more processors coupled with the     │──1002
│ display and the non-transitory memory:                  │
│                                                         │
│   Detect proximity of the device to an encoded feature  │
│                                                         │
│   In response to detecting proximity of the device to   │
│ the encoded feature, display, on the display, a         │
│ notification including                                  │
│                          (A)                            │
└─────────────────────────────────────────────────────────┘
                           │
                          (B)
                           ▼
┌─────────────────────────────────────────────────────────┐
│ In accordance with a determination that the encoded     │
│ feature is a first type of encoded feature, the         │──1004
│ notification includes a first indication of the first   │
│ type of encoded feature                                 │
│ ┌─────────────────────────────────────────────────────┐ │
│ │ The first type of encoded feature includes data     │ │
│ │ encoded in an optical machine-readable, and wherein │ │──1006
│ │ the second type of encoded feature includes one of  │ │
│ │ a beacon and a Near Field Communications (NFC) tag  │ │
│ └─────────────────────────────────────────────────────┘ │
└─────────────────────────────────────────────────────────┘
                           │
                           ▼
┌─────────────────────────────────────────────────────────┐
│ In accordance with a determination that the encoded     │
│ feature is a second type of encoded feature that is     │
│ different from the first type of encoded feature, the   │──1008
│ notification includes a second indication of the second │
│ type of encoded feature, wherein the second indication  │
│ is a graphical indication                               │
└─────────────────────────────────────────────────────────┘
```

Figure 10A

In accordance with a determination that the encoded feature is associated with an ecosystem that includes the device, indicate via the notification that the encoded feature is part of the ecosystem; and ~1032

In accordance with a determination that the encoded feature is not associated with the ecosystem that includes the device, forgo indicating via the notification that the encoded feature is part of the ecosystem

The encoded feature is associated with a network, and wherein selection of the notification triggers an automatic process for joining the network and authenticating the device with the network ~1034

Figure 10D

DEVICE, METHOD, AND GRAPHICAL USER INTERFACE FOR HANDLING DATA ENCODED IN MACHINE-READABLE FORMAT

RELATED APPLICATION

This application claims priority to U.S. Provisional Patent Application No. 62/514,588, filed on Jun. 2, 2017, entitled "Device, Method, and Graphical User Interface for Handling Data Encoded in Machine-Readable Format," the entire contents of which are incorporated herein by reference.

TECHNICAL FIELD

The present disclosure relates generally to electronic devices, including but not limited to electronic devices that handle data encoded in machine-readable format.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for handling data encoded in machine-readable format. Such methods and interfaces optionally complement or replace conventional methods for handling data encoded in machine-readable format. Such methods and interfaces reduce the cognitive burden on a user and produce a more efficient human-machine interface. Such methods and interfaces allow the device to recognize and act upon the data encoded in the machine-readable format thereby improving the operability of the device. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with a display, a camera, a non-transitory memory and one or more processors coupled with the display, the camera and the non-transitory memory. The method includes displaying, on the display, a media capture user interface of a camera application that allows a user to capture media. The media capture user interface of the camera application includes a media capture preview of objects in a field of view of the camera that changes as the objects in the field of view of the camera change. The media capture user interface of the camera application includes a media capture affordance that, when activated, captures media that corresponds to the field of view of the camera. The method includes, while displaying the media capture user interface of the camera, scanning the field of view of the camera for data encoded in an optical machine-readable format. In accordance with a determination that the field of view of the camera includes data encoded in the optical machine-readable format that meets respective notification criteria, the method includes displaying a notification that indicates that the camera application has detected data encoded in the optical machine-readable format. In accordance with a determination that the field of view of the camera does not include data encoded in the optical machine-readable format that meets the respective notification criteria, the method includes maintaining display of the media capture user interface of the camera application without displaying the notification.

In accordance with some embodiments, an electronic device includes a display unit configured to display a user interface, a camera unit configured to capture media, one or more input units configured to receive user inputs, and a processing unit coupled with the display unit, the camera unit and the one or more input units. The processing unit is configured to display, on the display unit, a media capture user interface of a camera application that allows a user to capture media. The media capture user interface of the camera application includes a media capture preview of objects in a field of view of the camera that changes as the objects in the field of view of the camera change. The media capture user interface of the camera application includes a media capture affordance that, when activated, captures media that corresponds to the field of view of the camera. The processing unit is configured to, while displaying the media capture user interface of the camera, scan the field of view of the camera for data encoded in an optical machine-readable format. In accordance with a determination that the field of view of the camera includes data encoded in the optical machine-readable format that meets respective notification criteria, the processing unit is configured to display a notification that indicates that the camera application has detected data encoded in the optical machine-readable format. In accordance with a determination that the field of view of the camera does not include data encoded in the optical machine-readable format that meets the respective notification criteria, the processing unit is configured to maintain display of the media capture user interface of the camera application without displaying the notification.

In accordance with some embodiments, a method is performed at a device with a display, a non-transitory memory and one or more processors coupled with the display, and the non-transitory memory. The method includes displaying, on the display, an image. The method includes while displaying the image, receiving an input indicative of a request for additional information corresponding to the image. In response to receiving the request for additional information corresponding to the image, in accordance with a determination that the image includes data encoded in an optical machine-readable format that meets respective threshold criteria, the method includes displaying information corresponding to the data encoded in the optical machine-readable format. In accordance with a determination that the image does not include data encoded in the optical machine-readable format that meets respective threshold criteria, the method includes displaying additional information about the image without displaying information corresponding to data encoded in the optical machine-readable format.

In accordance with some embodiments, an electronic device includes a display unit configured to display a user interface, a non-transitory memory and a processing unit coupled with the display unit, the non-transitory memory. The processing unit is configured to display, on the display unit, an image. The processing unit is configured to while displaying the image, receive an input indicative of a request for additional information corresponding to the image. In response to receiving the request for additional information corresponding to the image and in accordance with a determination that the image includes data encoded in an optical machine-readable format that meets respective threshold criteria, the processing unit is configured to display information corresponding to the data encoded in the optical machine-readable format. In accordance with a determination that the image does not include data encoded in the optical machine-readable format that meets respective threshold criteria, the processing unit is configured to display additional information about the image without displaying information corresponding to data encoded in the optical machine-readable format.

In accordance with some embodiments, a method is performed at a device with a display, a non-transitory memory and one or more processors coupled with the display, and the non-transitory memory. The method includes detecting proximity of the device to an encoded feature. In response to detecting proximity of the device to the encoded feature, the method includes displaying, on the display, a notification. In accordance with a determination that the encoded feature is a first type of encoded feature, the notification includes a first indication of the first type of encoded feature. In accordance with a determination that the encoded feature is a second type of encoded feature that is different from the first type of encoded feature, the notification includes a second indication of the second type of encoded feature. The second indication is a graphical indication.

In accordance with some embodiments, an electronic device includes a display unit configured to display a user interface, a non-transitory memory and a processing unit coupled with the display unit, the non-transitory memory. The processing unit is configured to detect proximity of the device to an encoded feature. In response to detecting proximity of the device to the encoded feature, the processing unit is configured to display, on the display, a notification. In accordance with a determination that the encoded feature is a first type of encoded feature, the notification includes a first indication of the first type of encoded feature. In accordance with a determination that the encoded feature is a second type of encoded feature that is different from the first type of encoded feature, the notification includes a second indication of the second type of encoded feature. The second indication is a graphical indication.

Thus, electronic devices with displays and input devices are provided with faster, more efficient methods and interfaces for displaying affordances in accessibility mode. Such electronic devices improve the visibility of the affordances thereby improving the operability of the electronic devices. Such methods and interfaces may complement or replace conventional methods for displaying affordances in accessibility mode.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8E are flow diagrams illustrating a method of handling data encoded in optical machine-readable format in accordance with some embodiments.

FIGS. 9A-9D are flow diagrams illustrating a method of handling images that include data encoded in optical machine-readable format in accordance with some embodiments.

FIGS. 10A-10D are flow diagrams illustrating a method of handling encoded features that trigger notifications in accordance with some embodiments.

DESCRIPTION OF EMBODIMENTS

Figure 1A:
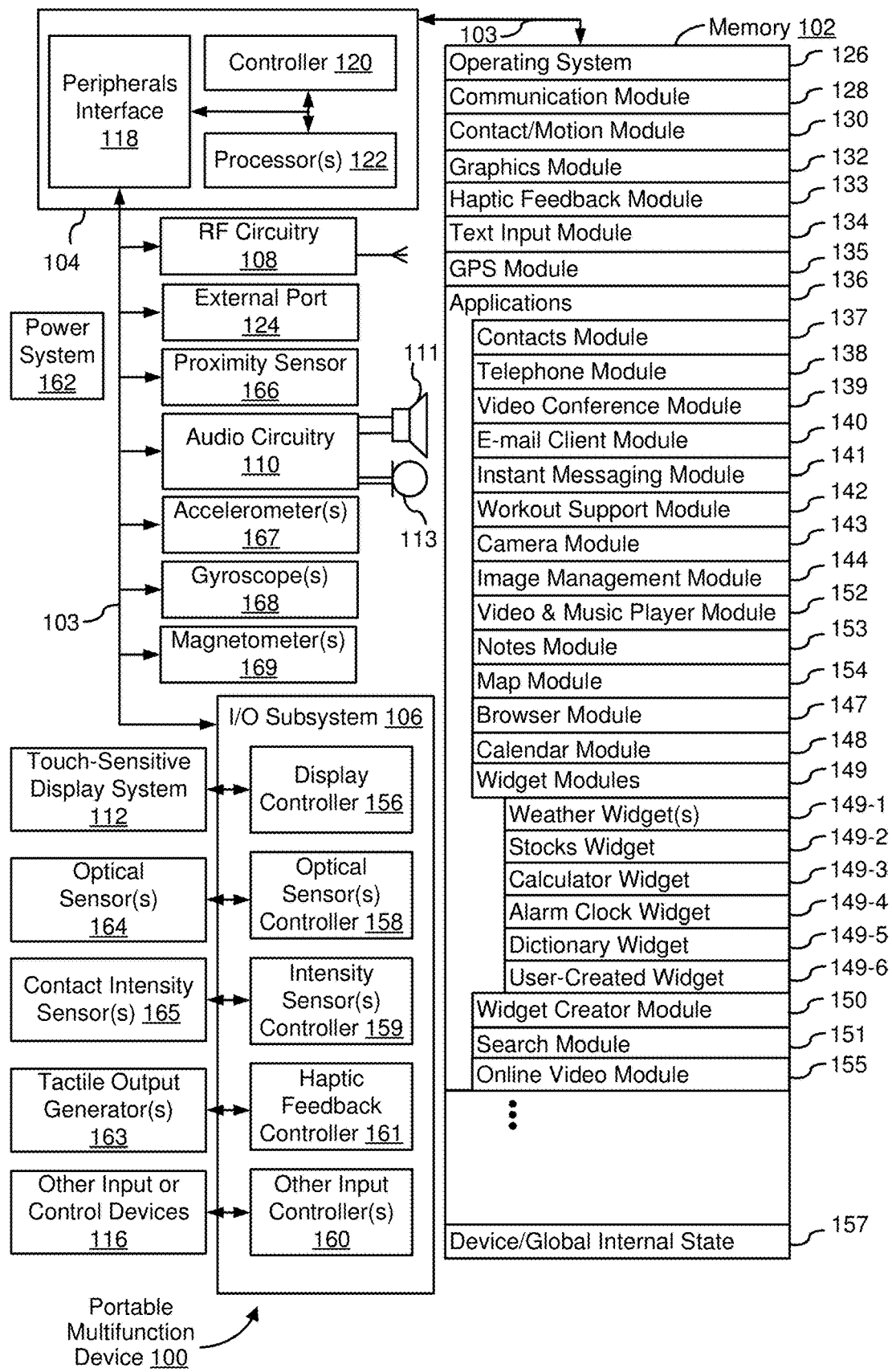
FIG. 1A is a block diagram illustrating a portable multifunction device with a touch-sensitive display in accordance with some embodiments.

Typically, obtaining information that is stored as data encoded in an optical machine-readable format is an unintuitive, non-user-friendly experience. Accordingly, in embodiments described below, a device displays a notification when the device detects that a media capture preview, generated by a media capture user interface of a camera application, includes data encoded in the optical machine-readable format. Displaying the notification in the media capture user interface provides an intuitive and user-friendly experience. Moreover, detecting the data encoded in the optical machine-readable format while displaying the media capture user interface reduces the need to launch a user interface that is dedicated to detecting the data encoded in the machine-readable format.

Some devices do not provide an intuitive and user-friendly option for handling images that include data encoded in an optical machine-readable format. Accordingly, in embodiments described below, in response to an image including data encoded in an optical machine-readable format, a device displays information corresponding to the data encoded in the optical machine-readable format. The device displays the information corresponding to the data encoded in the optical machine-readable format in response to receiving a request for additional information about the image. If the image does not include the data encoded in the optical machine-readable format, then the device displays additional information about the image. Displaying the information corresponding to the data encoded in the optical machine-readable format provides the user an option to act on the information thereby improving the operability of the device and providing a better user experience.

Some devices do not provide an intuitive and user-friendly option to act upon various types of encoded features. Accordingly, in embodiments described below, a device detects proximity of the device to an encoded feature, and displays a notification that includes an indication indicating a type of the encoded feature. The notification provides the user with an option to act upon information that is stored in the encoded feature. Detecting and indicating various types of encoded features when the device is in proximity of the encoded features improves the operability of the device by providing the user with an option to act upon the encoded feature.

Below, a description of example devices illustrated in FIGS. 1A-1B, 2, and 3 is provided. FIGS. 4A-4B, 5A-5W, and 6A-6R illustrate example user interfaces for handling data encoded in optical machine-readable format. FIGS. 7A-7P illustrate example user interfaces for handling encoded features that trigger notifications. FIGS. 8A-8E illustrate a flow diagram of a method of handling data encoded in optical machine-readable format. The user interfaces in 5A-5W are used to illustrate the processes in FIGS. 8A-8E. FIGS. 9A-9D illustrate a flow diagram of a method of handling images that include data encoded in optical machine-readable format. The user interfaces in 6A-6R are used to illustrate the processes in FIGS. 9A-9D. FIGS. 10A-10D illustrate a flow diagram of a method of handling encoded features that trigger notifications. The user interfaces in 7A-7P are used to illustrate the processes in FIGS. 10A-10D.

EXAMPLE DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 120, one or more processing units (CPUs) 122, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or an "up click" of a physical actuator button. In some cases, a user will feel a tactile sensation such as a "down click" or an "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 122 and the peripherals interface 118, is, optionally, controlled by memory controller 120.

Peripherals interface 118 can be used to couple input and output peripherals of the device to CPU(s) 122 and memory 102. The one or more processors 122 run or execute various software programs and/or sets of instructions stored in memory 102 to perform various functions for device 100 and to process data.

In some embodiments, peripherals interface 118, CPU(s) 122, and memory controller 120 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

Figure 3:
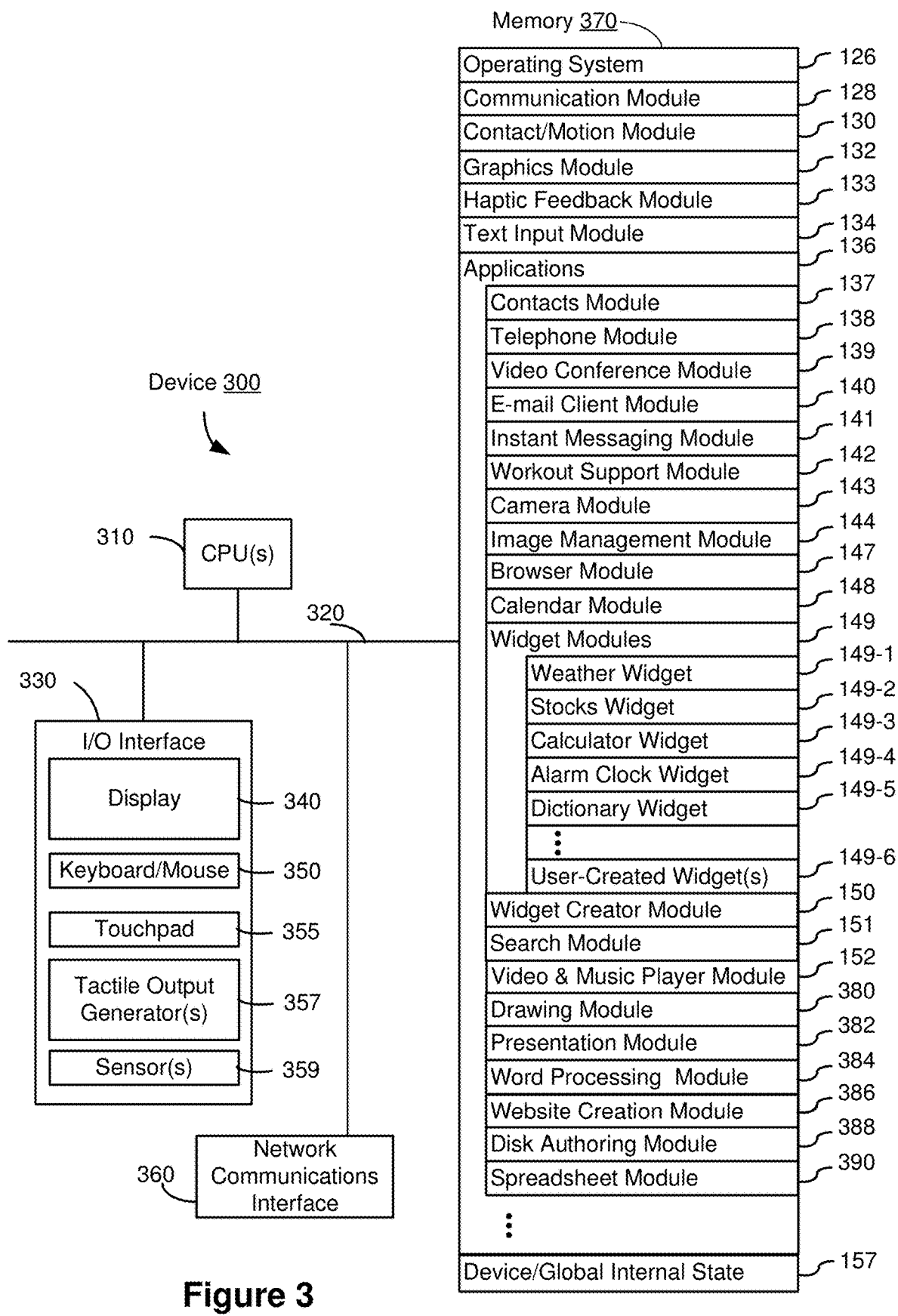
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conference module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail client 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, video conference module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
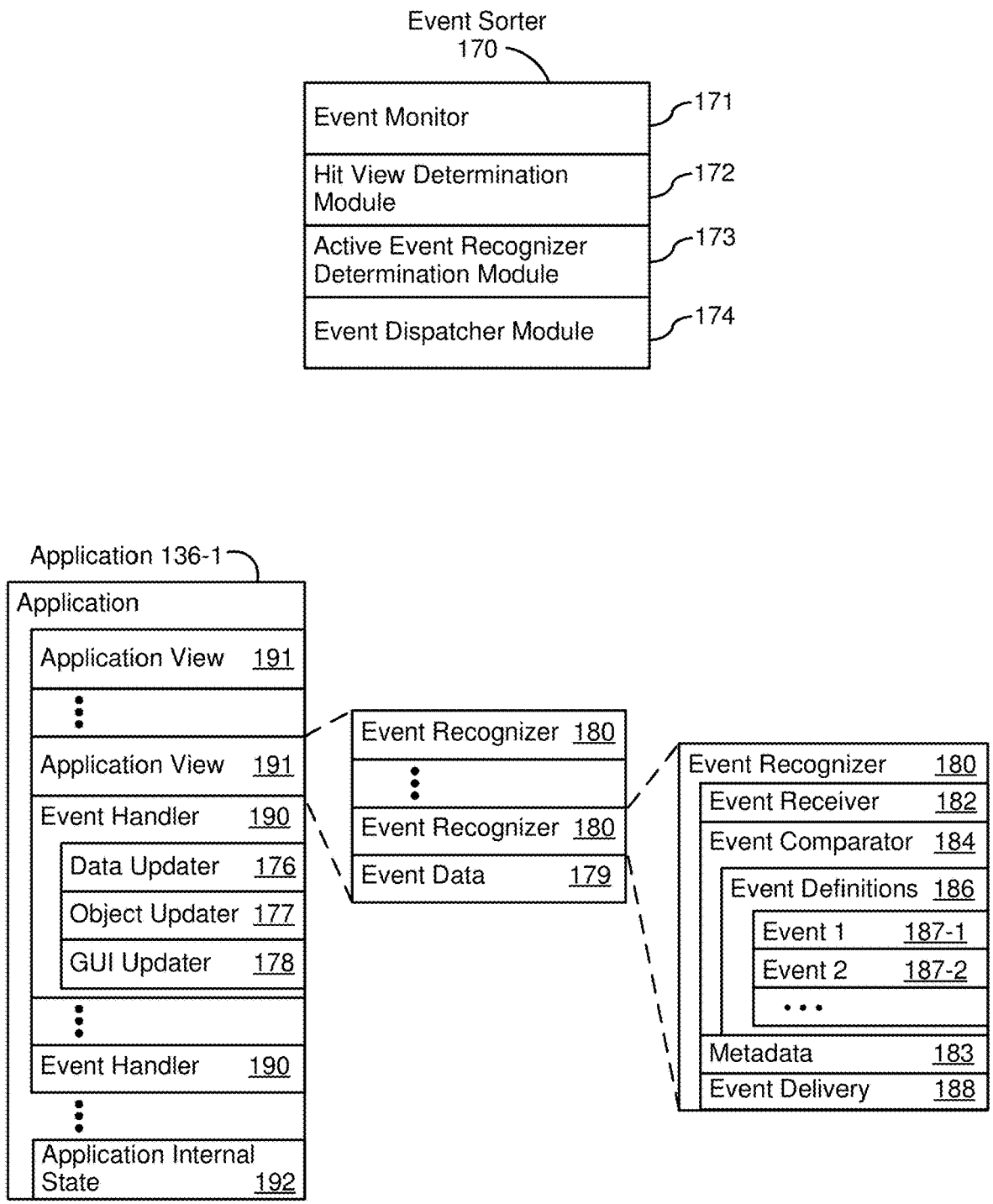
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in a respective event, such as event 1 (187-1) or event 2 (187-2), include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, the event definition for a respective event, such as event 1 (187-1) or event 2 (187-2), includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event, such as event 1 (187-1) or event 2 (187-2), also includes delayed actions that delay delivery of the event information until after it has been determined whether the sequence of sub-events does or does not correspond to the event recognizer' s event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
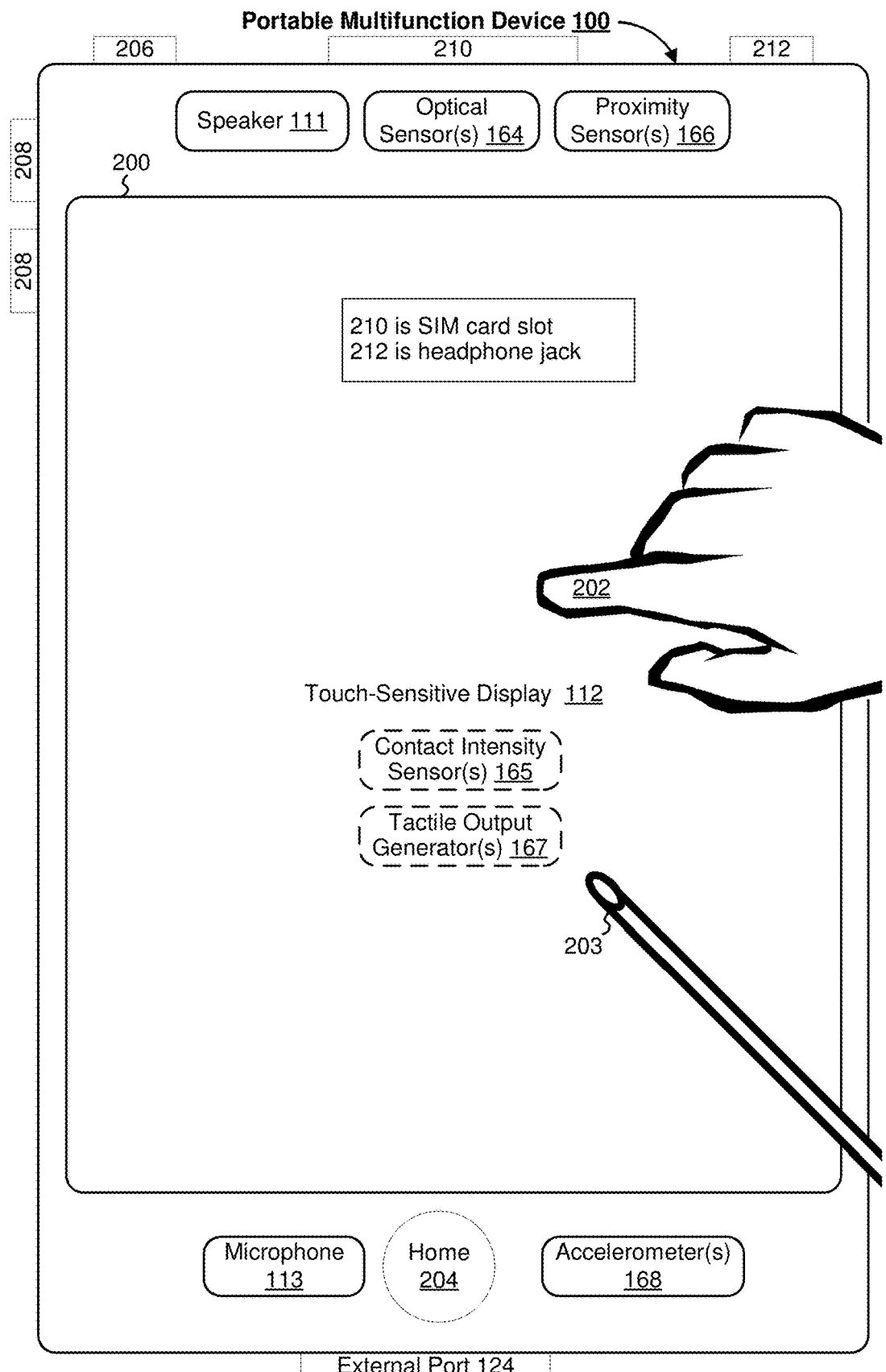
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed toward embodiments of user interfaces ("UI") that are, optionally, implemented on portable multifunction device 100.

Figure 4A:
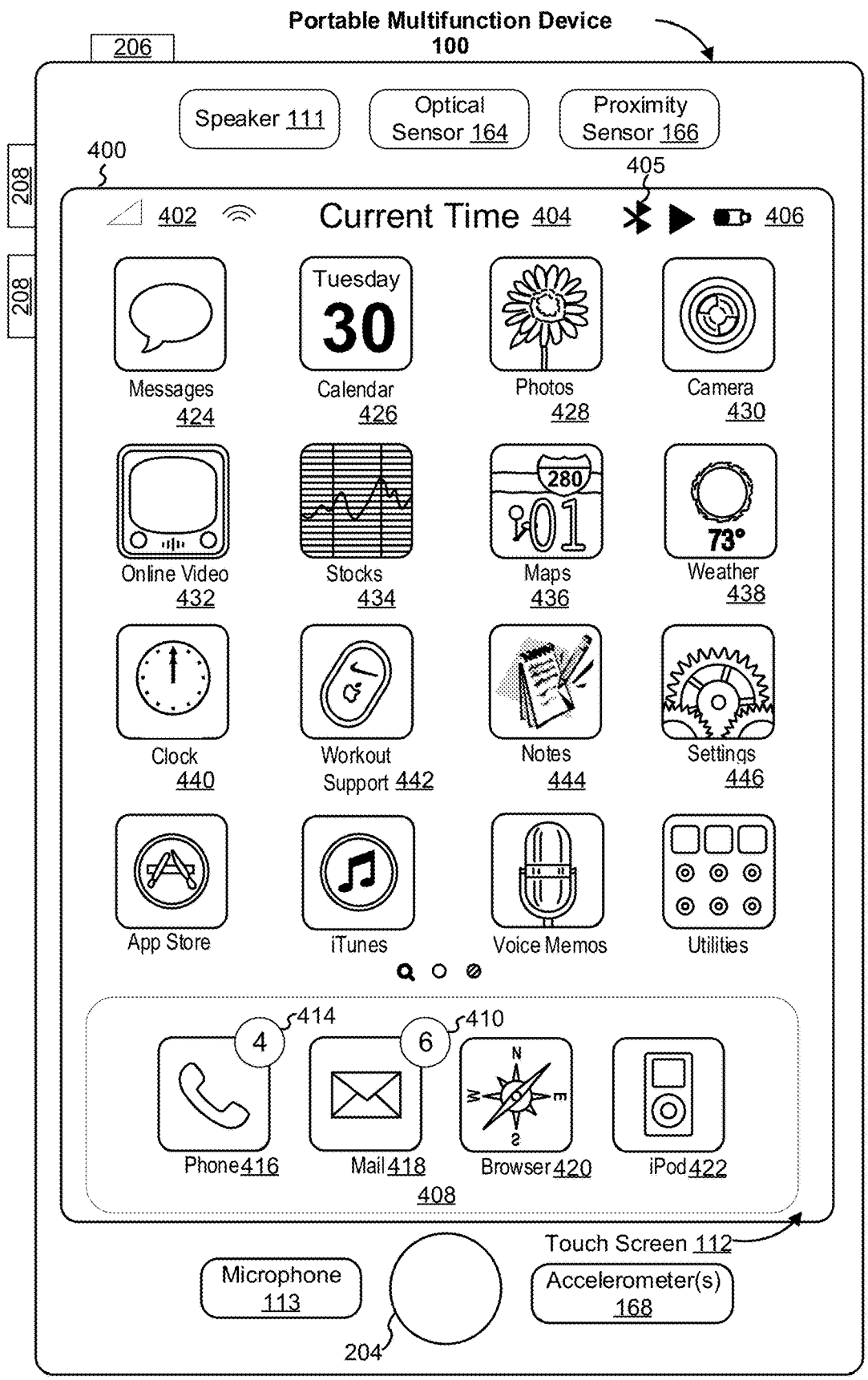
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and
Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, also referred to as iPod (trademark of Apple Inc.) module 152, labeled "iPod"; and
Icons for other applications, such as:
  Icon 424 for IM module 141, labeled "Text";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";
  Icon 436 for map module 154, labeled "Map";
  Icon 438 for weather widget 149-1, labeled "Weather";
  Icon 440 for alarm clock widget 169-6, labeled "Clock";
  Icon 442 for workout support module 142, labeled "Workout Support";
  Icon 444 for notes module 153, labeled "Notes"; and
  Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
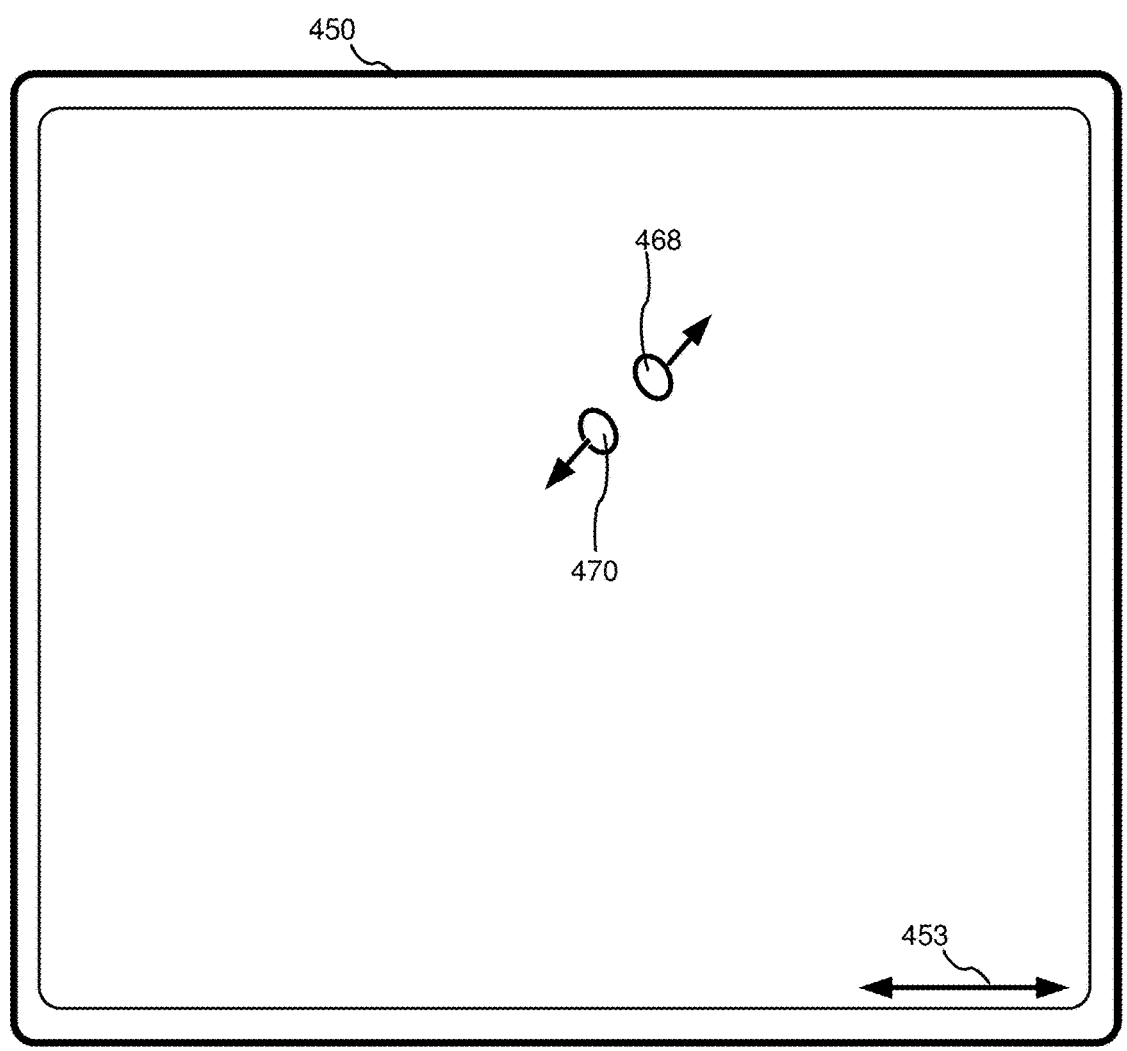
FIG. 4B illustrates an example user interface for a multifunction device with a touch-sensitive surface that is separate from the display in accordance with some embodiments.
Figure 4B:
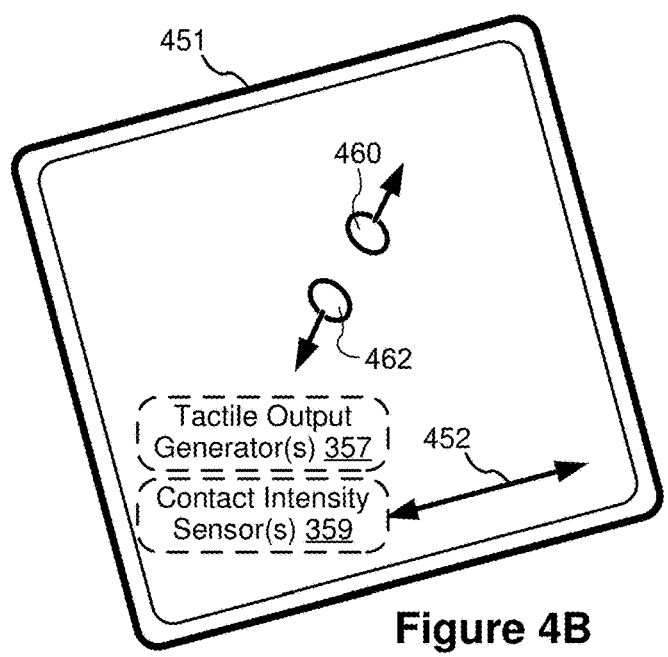

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 and/or 430 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined threshold values without changing the trackpad or touch-screen display hardware. Additionally, in some embodiments, a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described below optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiment, the triggering of these responses also depends on time-based criteria being met (e.g., a delay time has elapsed between a first intensity threshold being met and a second intensity threshold being met).

USER INTERFACES AND ASSOCIATED PROCESSES

Attention is now directed toward embodiments of user interfaces ("UI") and associated processes that may be implemented on an electronic device, such as portable multifunction device 100 or device 300, with a display, a touch-sensitive surface, and one or more sensors to detect intensity of contacts with the touch-sensitive surface.

Figure 5B:
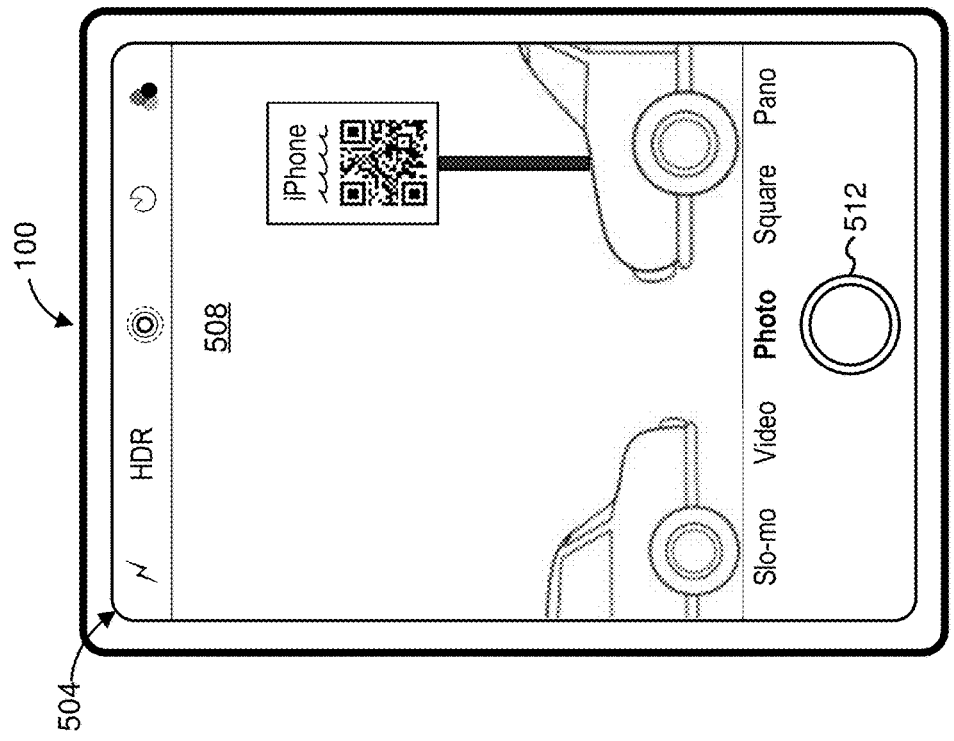
FIGS. 5A-5W illustrate example user interfaces for handling data encoded in optical machine-readable format in accordance with some embodiments.
Figure 5A:
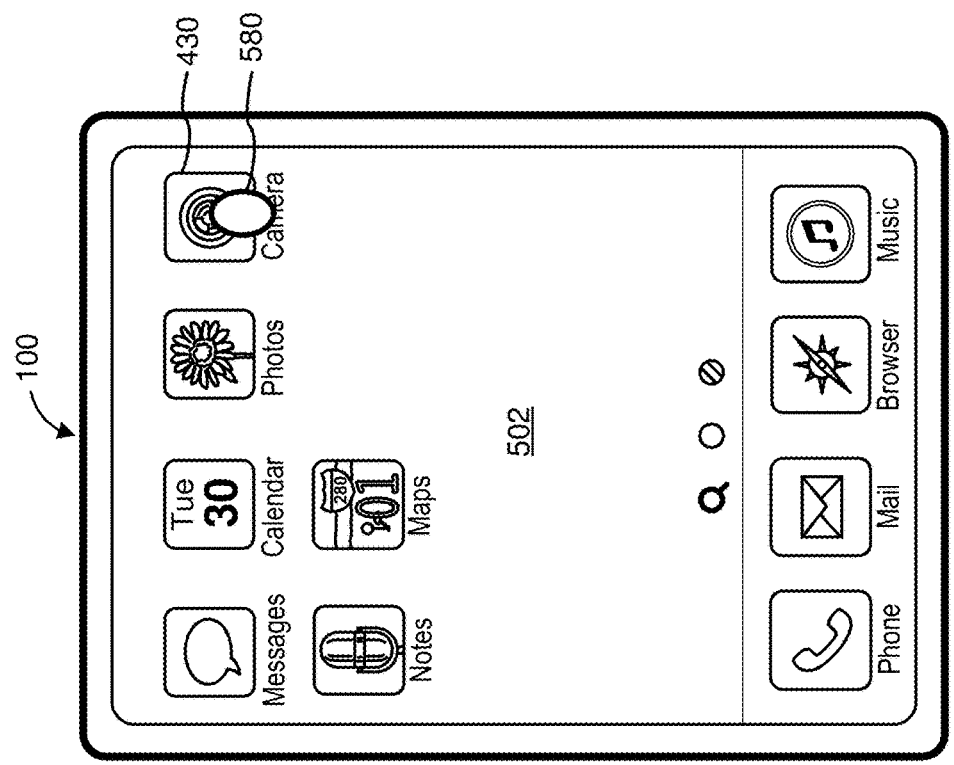
Figure 5D:
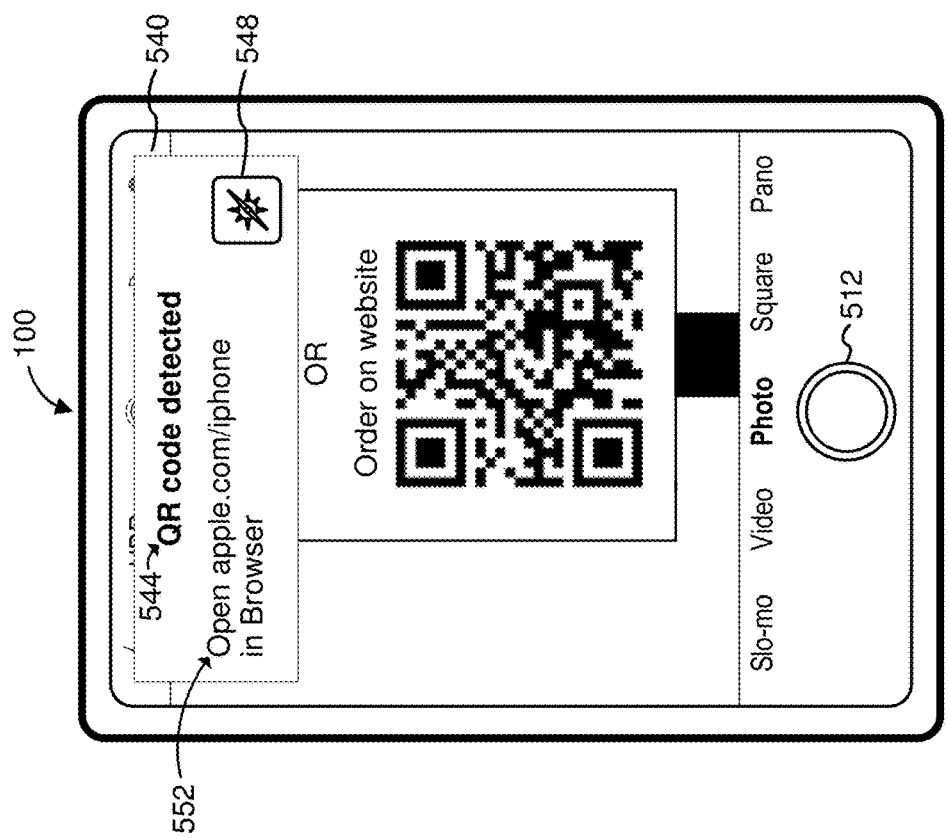
Figure 5C:
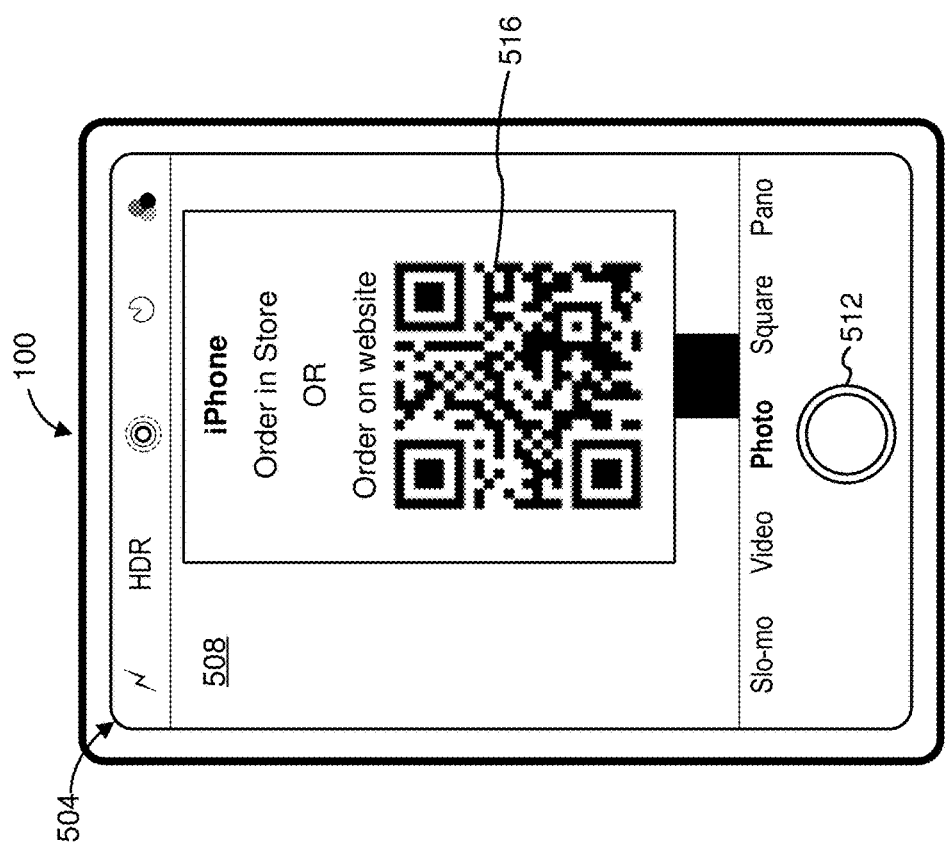
Figure 5H:
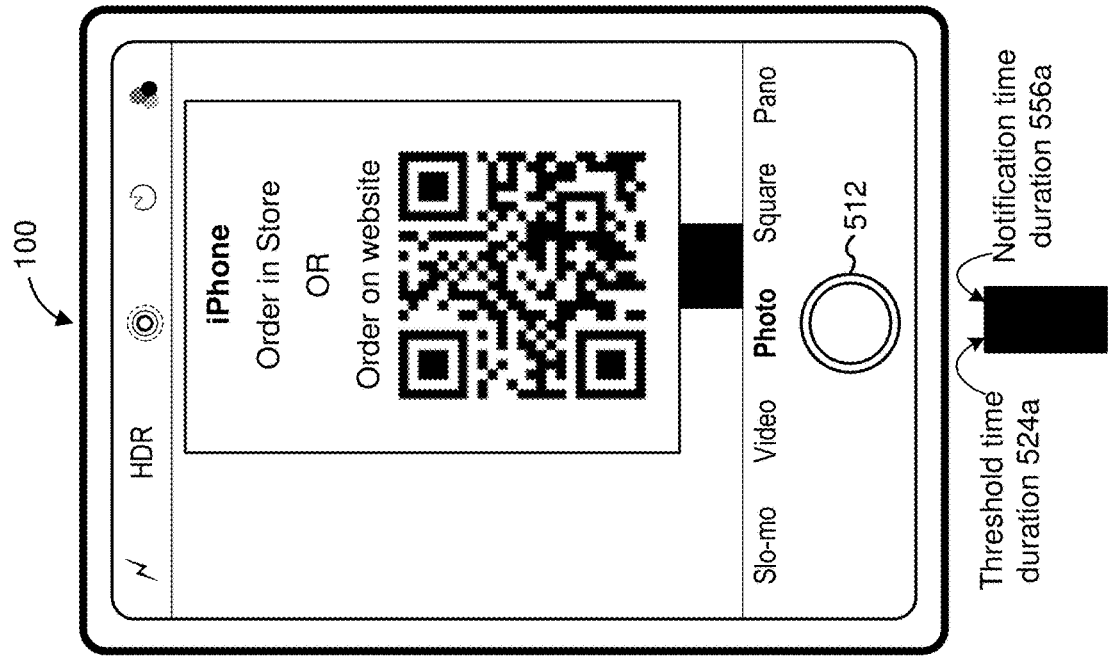
Figure 5G:
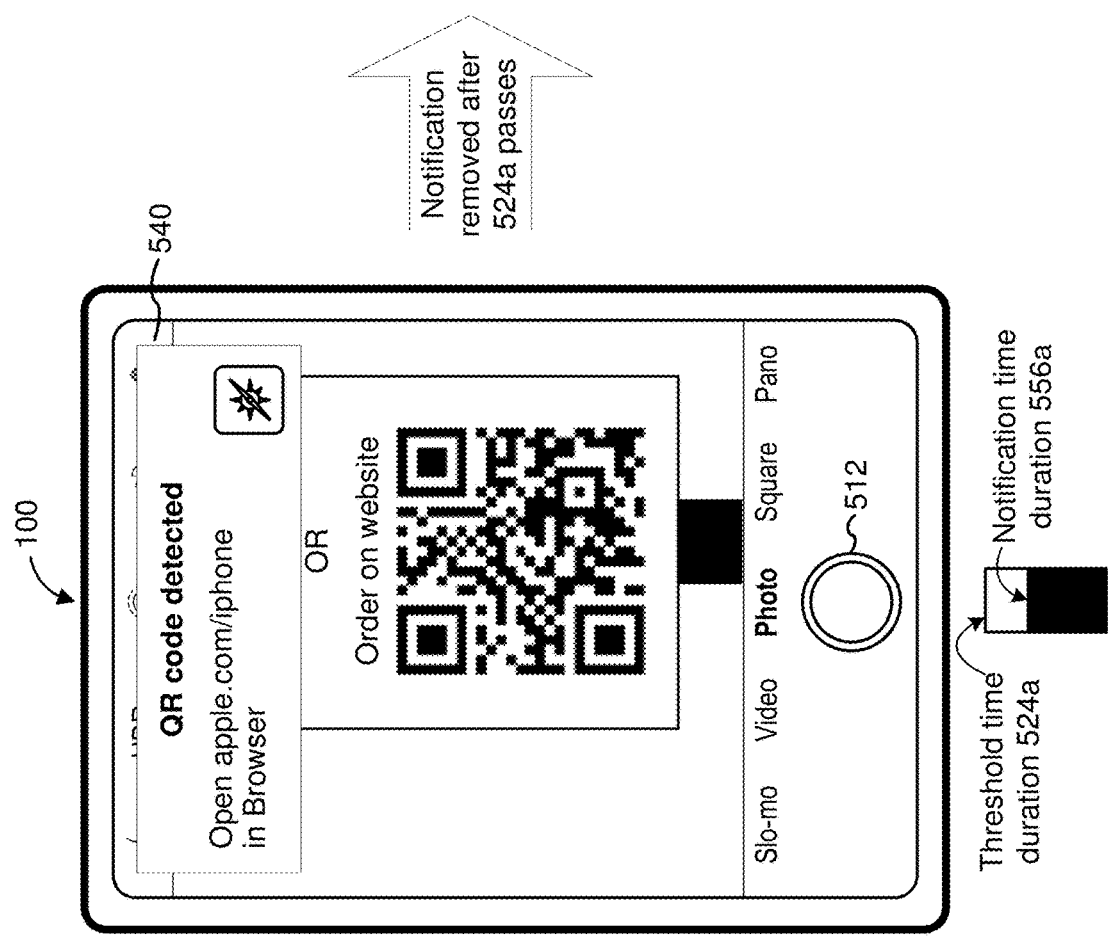
Figure 5I:
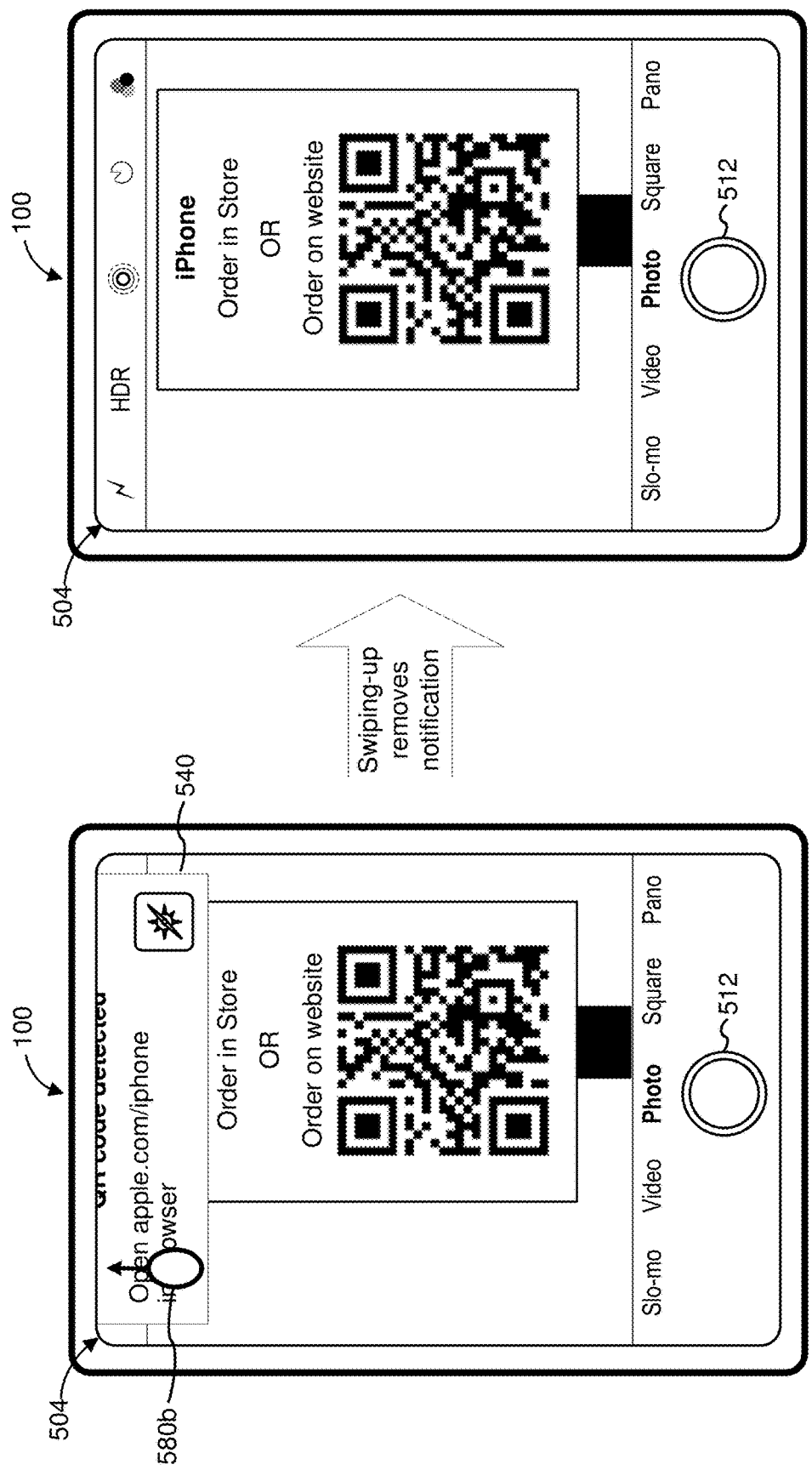
Figure 5J:
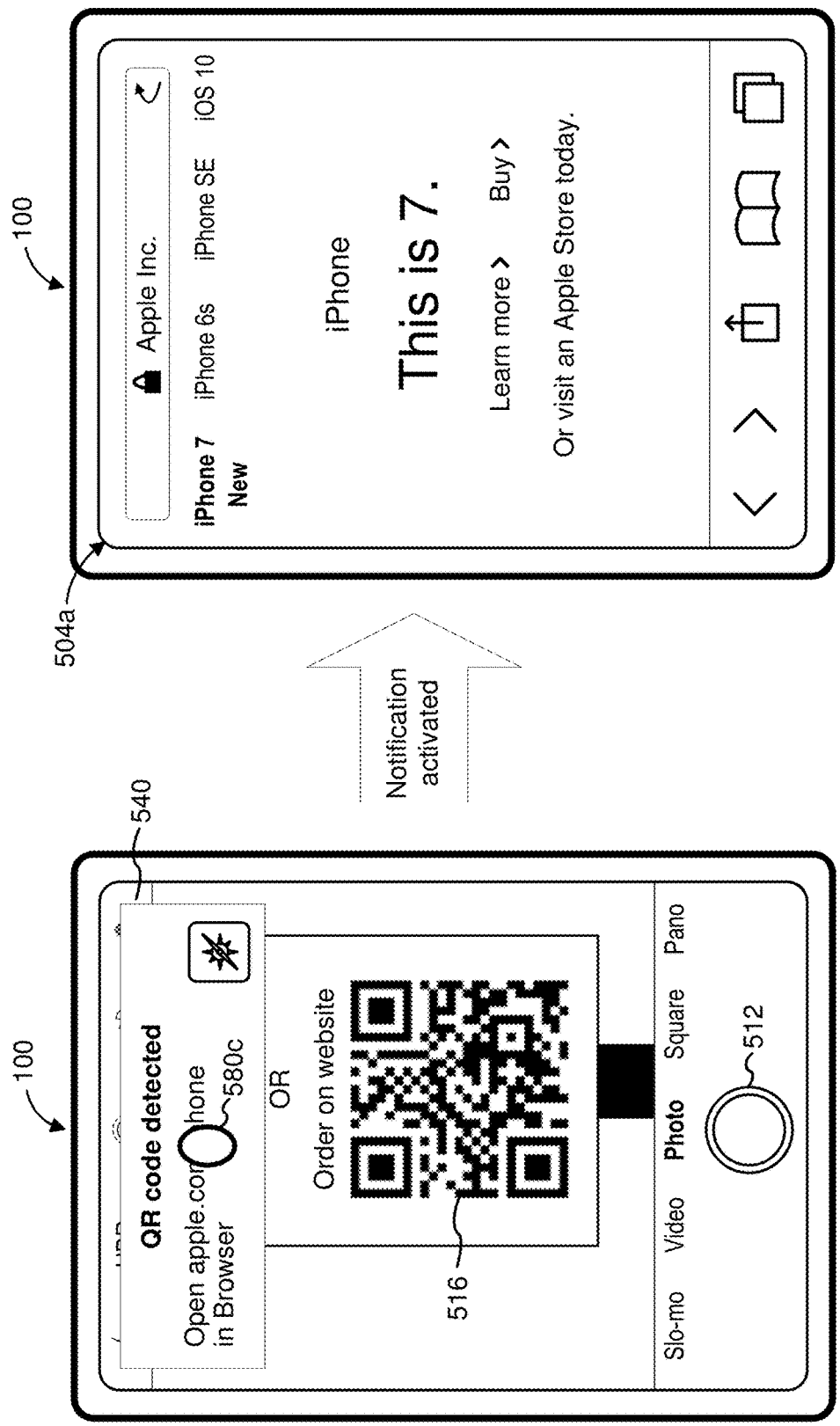
Figure 5K:
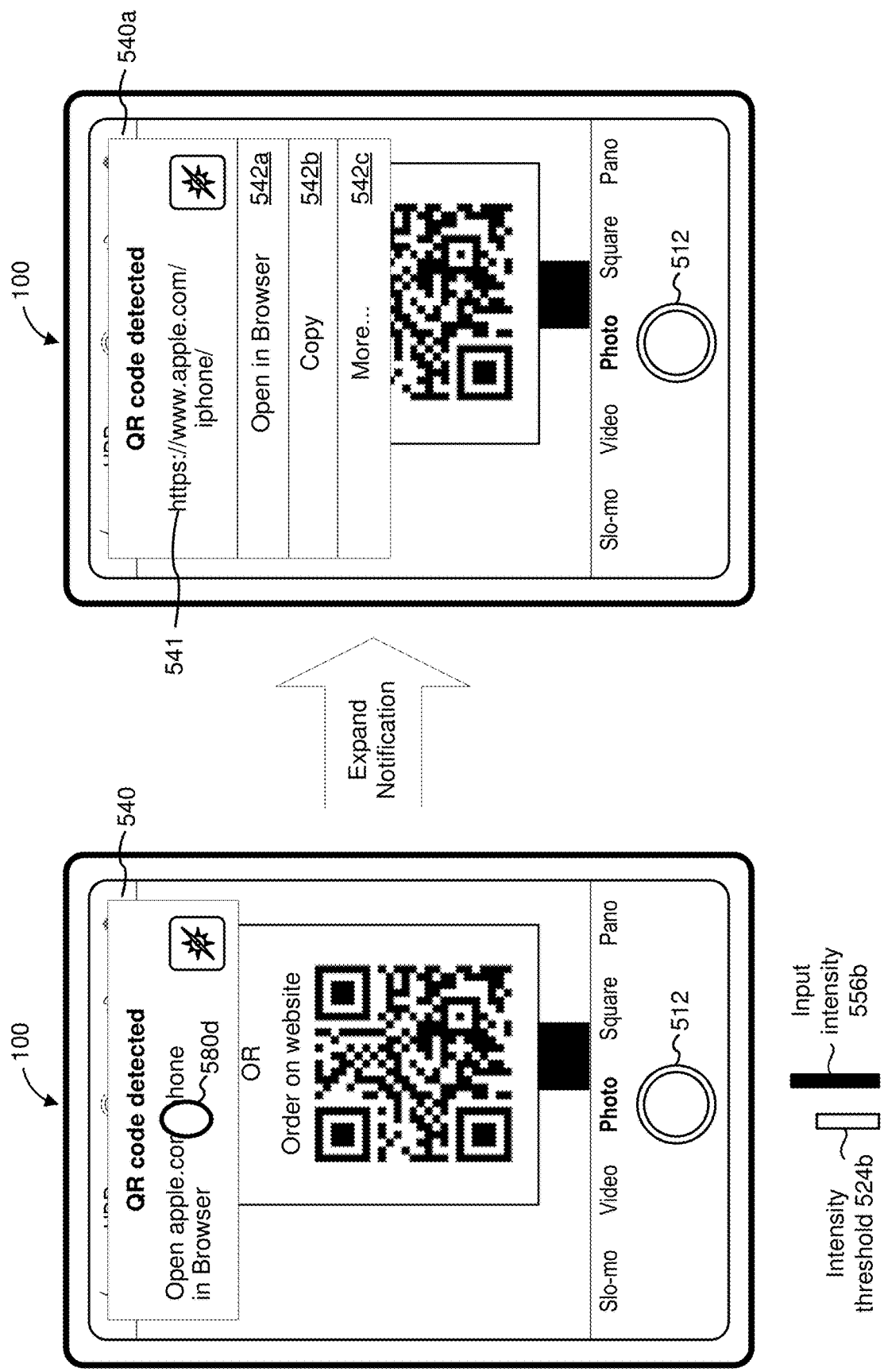
Figure 5M:
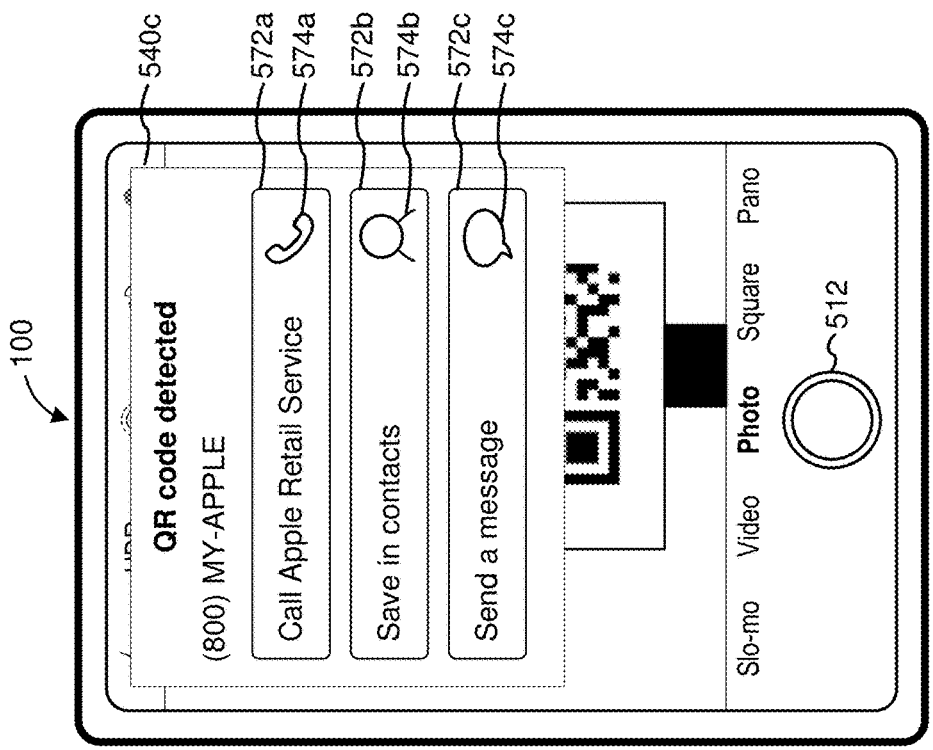
Figure 5L:
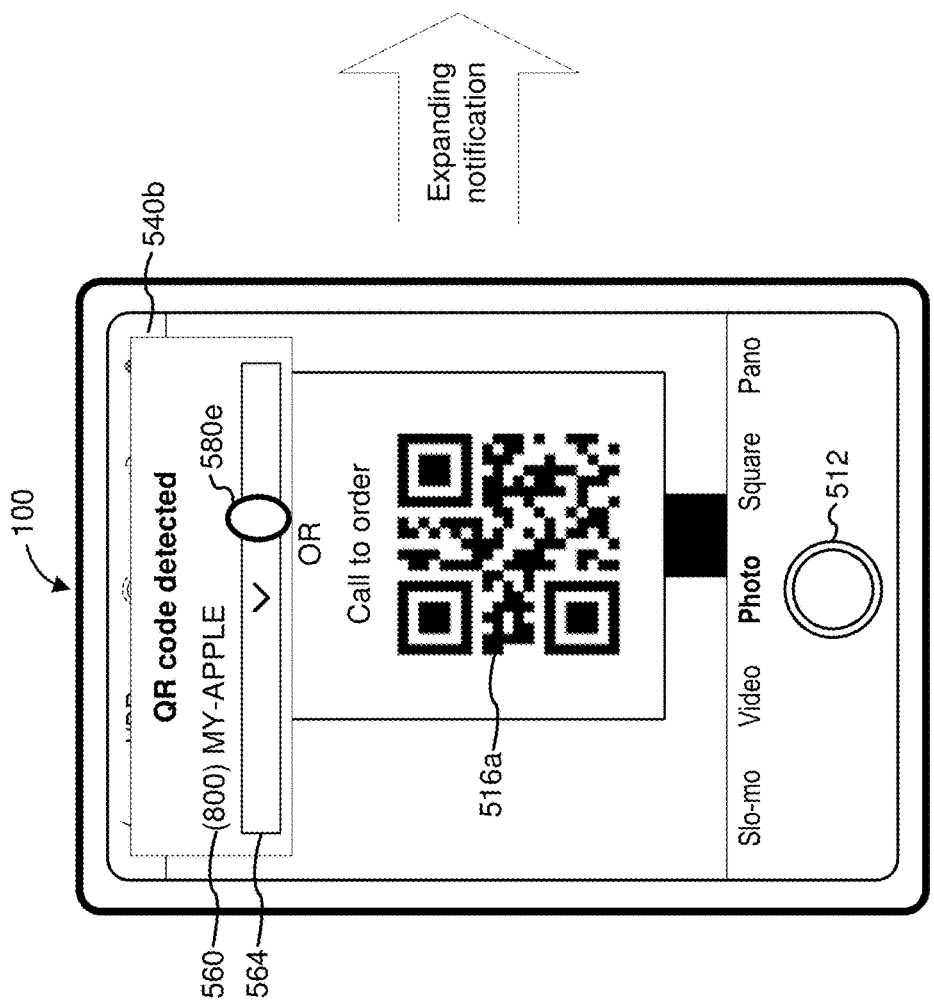
Figure 5O:
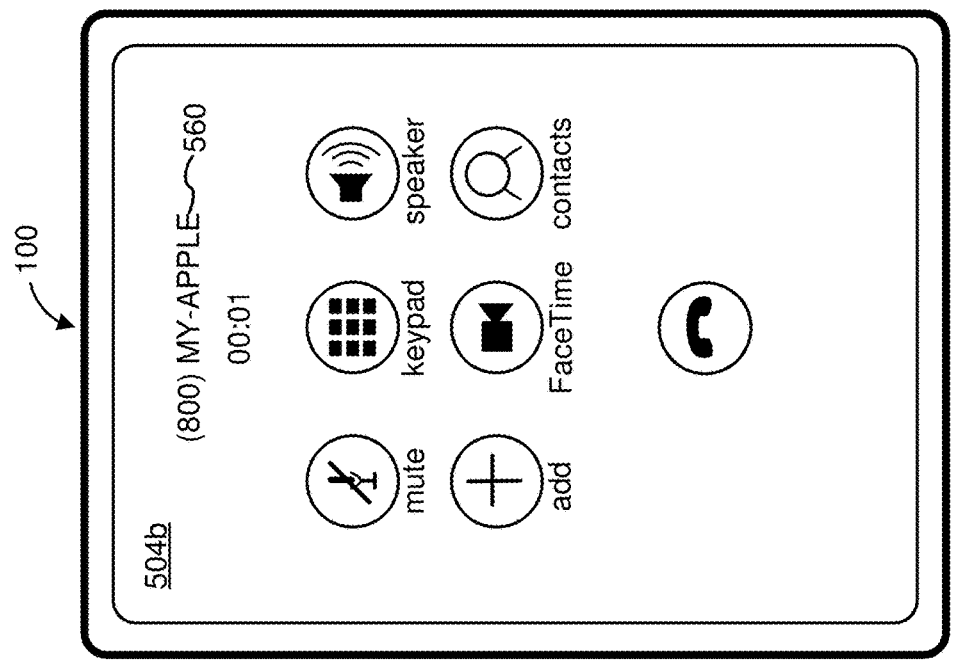
Figure 5N:
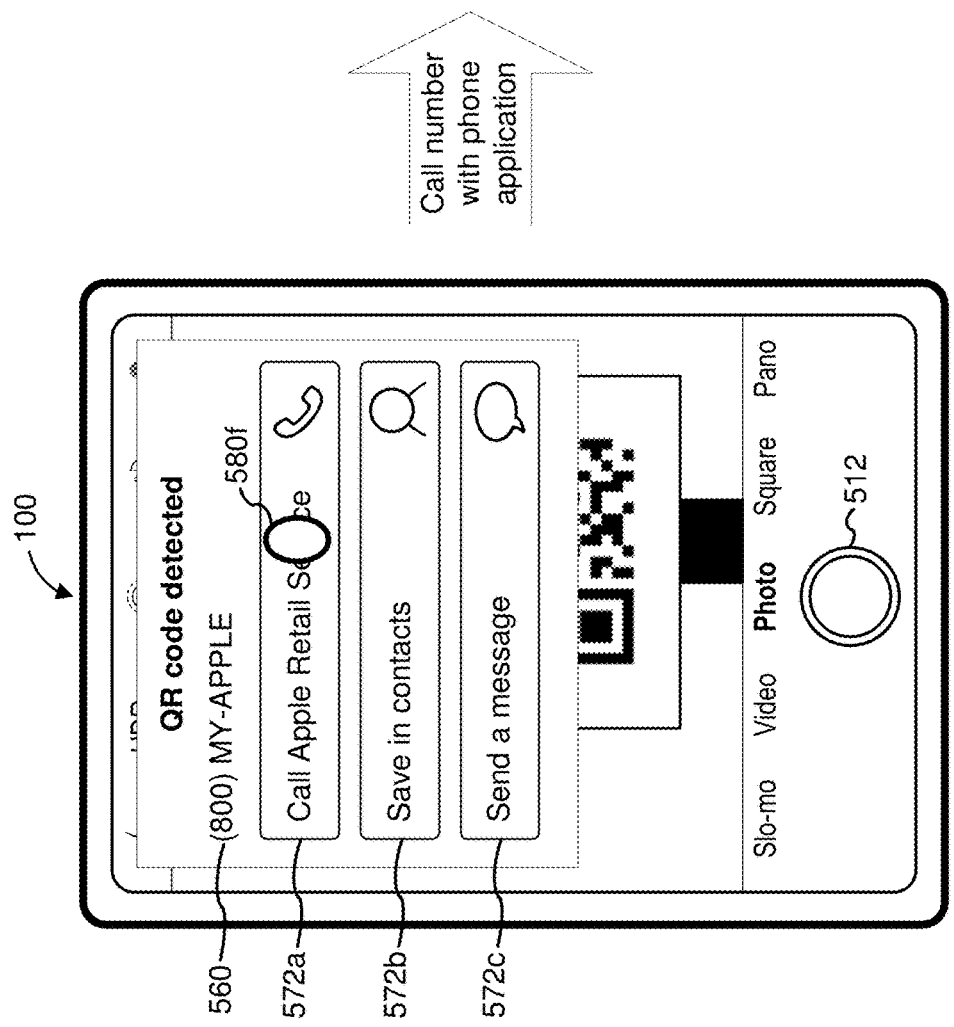
Figure 5Q:
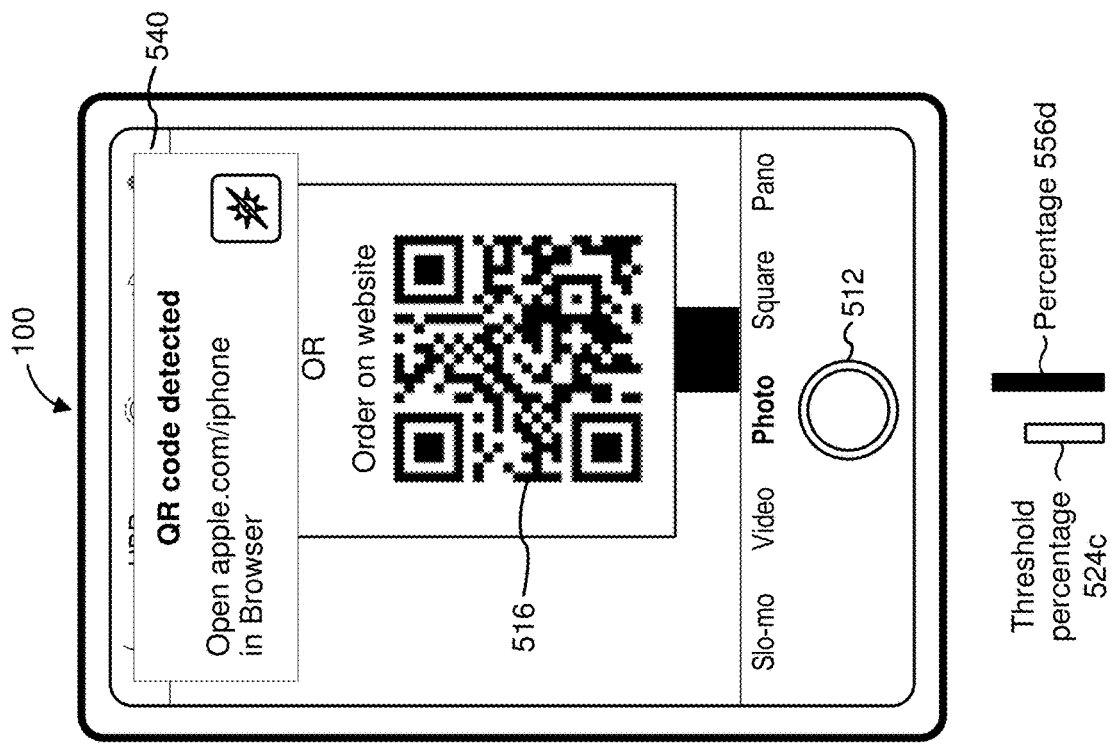
Figure 5P:
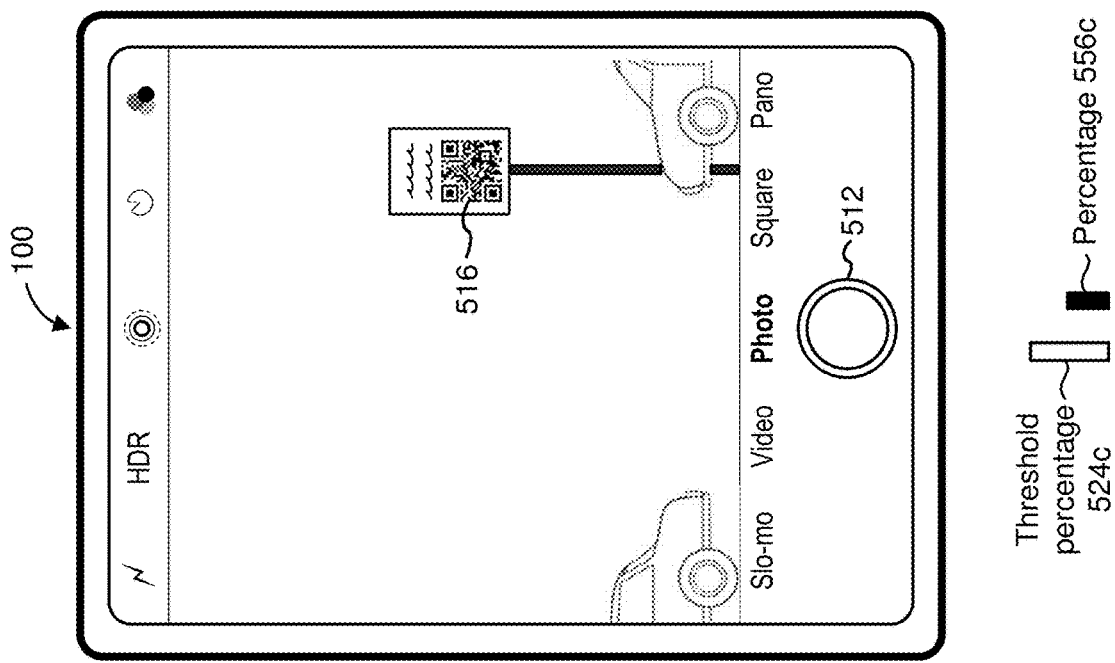
Figure 5S:
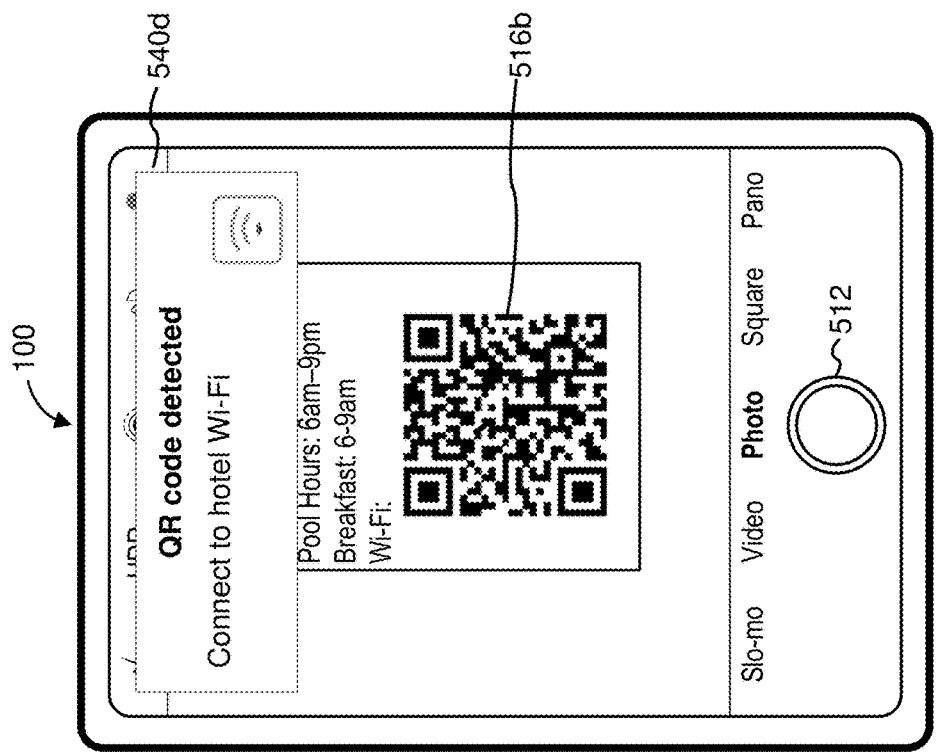
Figure 5R:
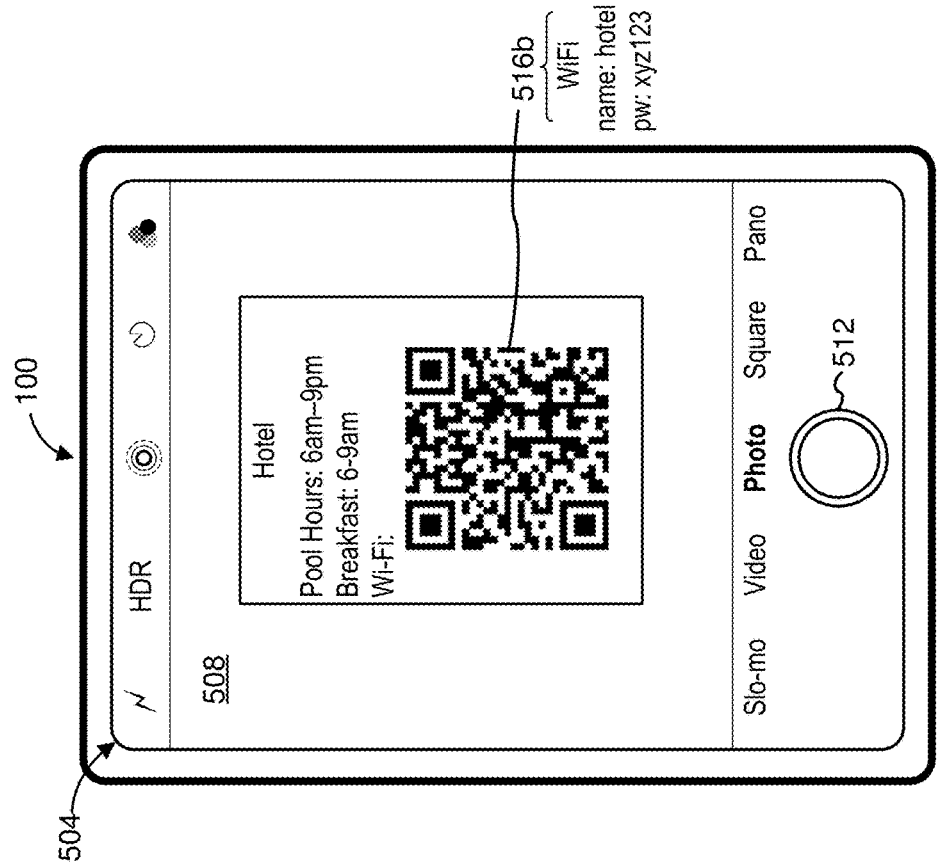
Figure 5U:
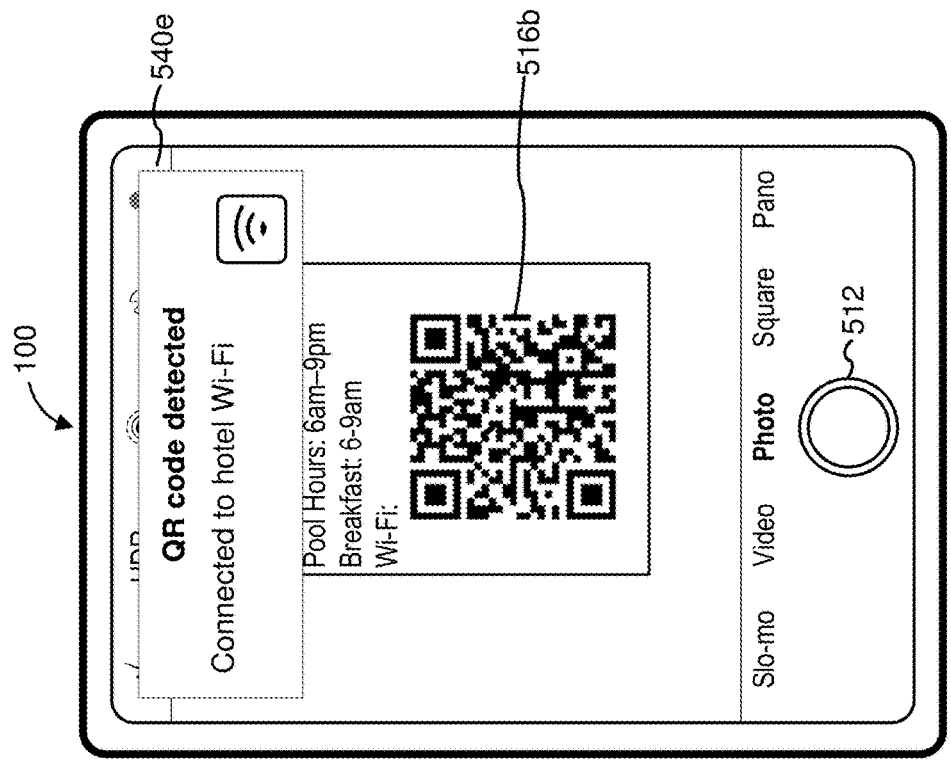
Figure 5T:
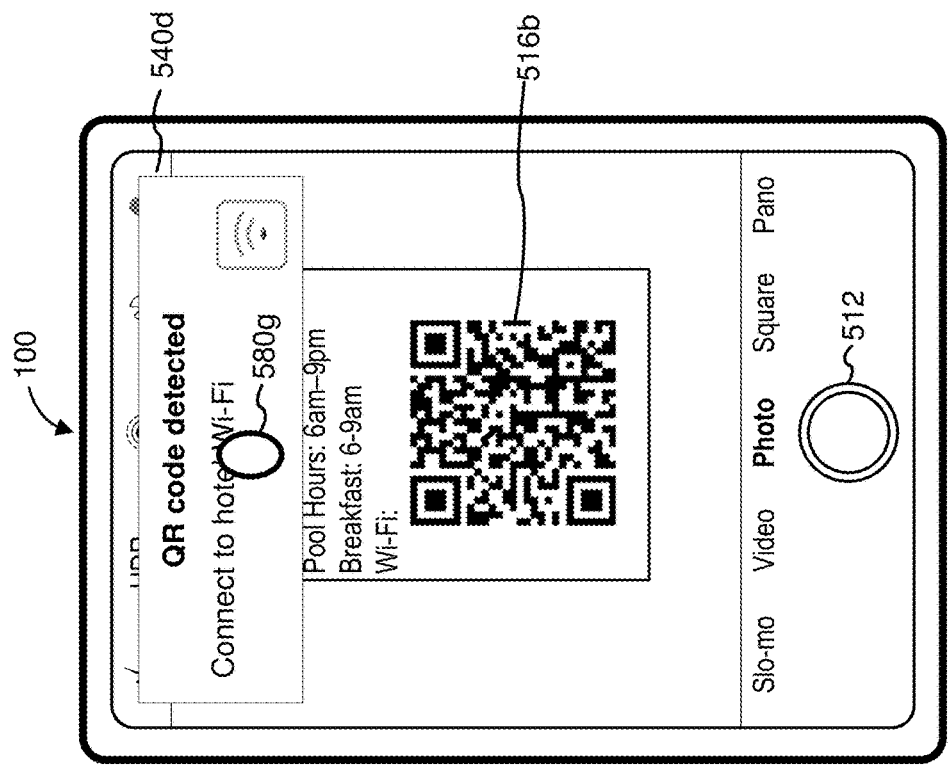
Figure 5W:
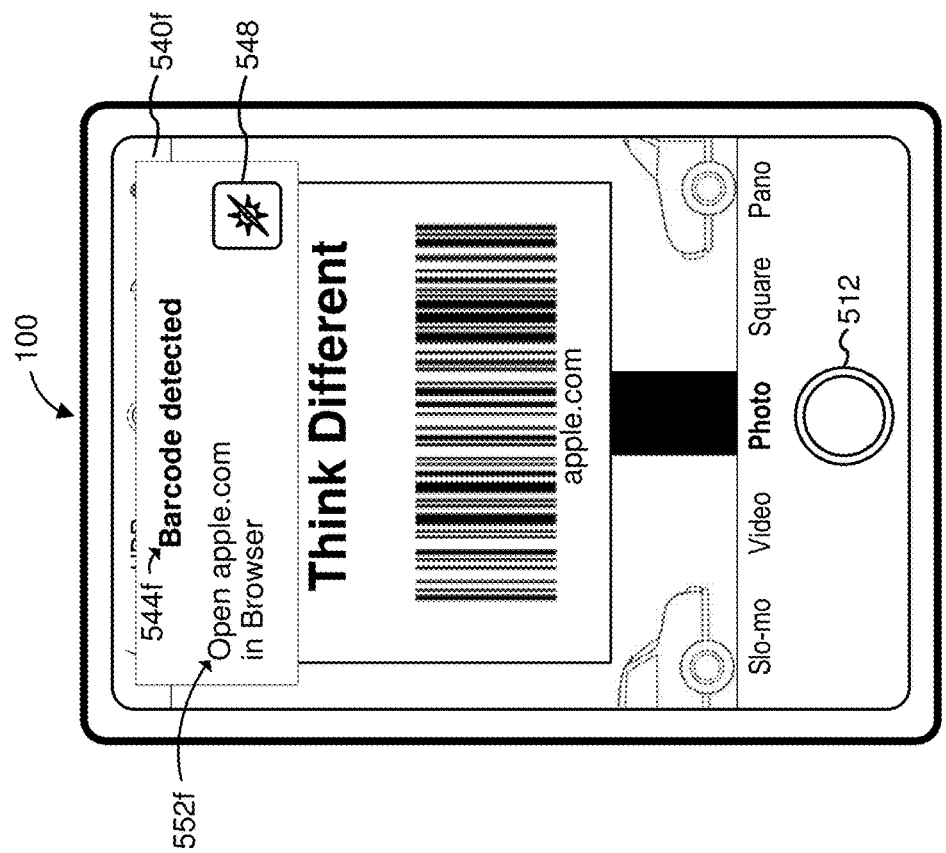

FIGS. 5A-5W illustrate example user interfaces for handling data encoded in optical machine-readable format in accordance with some embodiments. The user interfaces in these figures are used to illustrate the processes described below, including the processes in FIGS. 8A-8E. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIGS. 5A-5D illustrate a sequence in which the device 100 displays a notification indicating that data encoded in optical machine-readable format is in the field of view of a camera (e.g., the camera module 143 shown in FIG. 3) of the device 100. FIG. 5A illustrates a user interface 502 that includes various icons that correspond to respective modules and/or applications. For example, the user interface 502 includes the icon 430 for the camera module 143 (e.g., a camera application). In the example of FIG. 5A, the device 100 receives a user input 580 at a location that corresponds to the icon 430. As illustrated in FIGS. 5A-5B, in response to receiving the user input 580, the device 100 presents a media capture user interface 504 of a camera application. In some embodiments, the media capture user interface 504 is generated by the camera module 143 shown in FIG. 3.

As illustrated in FIG. 5B, in some embodiments, the media capture user interface 504 includes a media capture preview 508 of objects that are in a field of view of the camera. The media capture preview 508 changes as the objects in the field of view of the camera change. For example, as the device 100 is moved around, the objects in the field of view of the camera change. As the objects in the field of view of the camera change, the device 100 refreshes the media capture preview 508 to display representations of the objects that are currently in the field of view of the camera. In the example of FIG. 5B, the media capture user interface 504 includes a media capture affordance 512 (e.g., a shutter button). In various embodiments, when the media capture affordance 512 is activated, the device 100 captures media (e.g., an image or a video) that corresponds to the field of view of the camera. For example, in some embodiments, when the device 100 detects a tap input on the media capture affordance 512, the device 100 captures an image that resembles the media capture preview 508.

Referring to FIG. 5C, in various embodiments, while displaying the media capture user interface 504, the device 100 scans the field of view (e.g., the media capture preview 508) for data encoded in an optical machine-readable format ("encoded data 516", hereinafter for the sake of brevity). In some embodiments, the device 100 scans the field of view by processing pixels in order to identify the encoded data 516. In some embodiments, the encoded data 516 includes a barcode (e.g., a one-dimensional barcode or a two-dimensional barcode such as a QR CODE® (trademark of Denso Corporation)). The device 100 scans the field of view for the encoded data 516 without receiving an explicit request from the user to scan for the encoded data 516. As such, scanning the field of view for the encoded data 516 while displaying the media capture user interface 504 improves the efficiency of the device 100 at detecting the encoded data 516. Moreover, scanning the field of view for the encoded data 516 reduces the need for an explicit request to detect the encoded data 516. Furthermore, scanning the field of view for the encoded data 516 while displaying the media capture user interface 504 reduces the need to launch an application or a module that is dedicated to detecting the encoded data 516. Scanning the field of view for encoded data reduces the need to launch a separate application/module that detects encoded data thereby enhancing the operability of the device and making the user-device interface more efficient (e.g., by reducing the need for a sequence of user inputs corresponding to a request to launch an application and scan the encoded data with the application) which, additionally, reduces power usage and improves battery life of the device by enabling the user to use the device more quickly and efficiently.

Referring to FIG. 5D, the device 100 displays a notification 540 in response to detecting the encoded data 516 in the field of view of the camera. In various embodiments, the notification 540 includes an indication 544 that the device 100 has detected the encoded data 516 in the field of view of the camera. In various embodiments, the encoded data 516 includes actionable data. For example, in some embodiments, the encoded data 516 includes a web address for a website that a browser application can launch. In the example of FIG. 5D, the notification 540 includes an icon 548 for a target application that can act upon the encoded data 516. For example, the icon 548 includes an icon for a browser application that can launch the website referenced by the web address indicated in the encoded data 516. In the example of FIG. 5D, the notification 540 includes a descriptor 552 for the action. For example, the descriptor 552 indicates that the user can launch a particular web site in a browser application by activating (e.g., tapping, swiping-down or swiping-right) the notification 540. The notification 540 provides the user with an option to act upon the encoded data 516 without providing a sequence of user inputs that would typically be required to perform the action. For example, the notification 540 provides the user with an option to launch a website referenced by the encoded data 516 without manually launching the browser application and entering the web address for the website. As such, the notification 540 improves the efficiency of the device 100 and provides a better user experience. Displaying the notification 540 enhances the operability of the device and makes the user-device interface more efficient (e.g., by reducing the need for a sequence of user inputs corresponding to manually launching the browser application and entering the web address into the browser application) which, additionally, reduces power usage and improves battery life of the device by enabling the user to use the device more quickly and efficiently.

Referring to FIGS. 5E-5F, in various embodiments, the device 100 removes the notification 540 when the user captures media. In other words, the device 100 ceases to display the notification 540 when the user captures media. As illustrated in FIG. 5E, the notification 540 is overlaid on the media capture user interface 504. While the notification 540 obscures a portion of the media capture user interface 504, the media capture affordance 512 is visible and can be activated by the user. In the example of FIG. 5E, the device 100 receives a user input 580a at a location corresponding to the media capture affordance 512. As illustrated in FIG. 5F, in response to receiving the user input 580a, the device 100 removes the notification 540 (e.g., by ceasing to display the notification 540) and captures an image 520. In the example of FIG. 5F, the device 100 displays a small version of the image 520 in the bottom-left corner of the touch-sensitive display. After capturing the image 520, the device 100 maintains display of the media capture user interface 504 including the media capture preview 508. Removing the notification 540 when the user activates the media capture affordance 512 allows the user to use the media capture user interface 504 to capture media. As such, displaying the notification 540 does not restrict the ability to capture media through the media capture user interface 504. In other words, most of the functionality provided by the media capture user interface 504 is still available while the notification 540 is displayed.

Referring to FIGS. 5G-5H, in some embodiments, the device 100 maintains display of the notification 540 for a threshold time duration 524a. FIG. 5G illustrates a notification time duration 556a that indicates an amount of time that has passed since the device 100 started displayed the notification 540. In the example of FIG. 5G, the notification time duration 556a is less than the threshold time duration 524a. Since the notification time duration 556a is less than the threshold time duration 524a, the device 100 maintains display of the notification 540. In FIG. 5H, the notification time duration 556a is equal to or greater than the threshold time duration 524a. Since the notification time duration 556a is equal to or greater than the threshold time duration 524a, the device 100 removes the notification 540. In other words, the device 100 ceases display of the notification 540 in response to the notification time duration 556a being equal to or greater than the threshold time duration 524a. Displaying the notification 540 for at least the threshold time duration 524a provides the user sufficient time to view the notification 540 and to decide whether to activate the notification 540. Removing the notification 540 after the notification has been displayed for the threshold time duration 524a likely matches an intent of the user to not engage with the notification 540.

Referring to FIG. 5I, in some embodiments, the device 100 receives a user input 580b at a location that corresponds to the notification 540. In the example of FIG. 5I, the user input 580b corresponds to a request to remove the notification 540. In response to receiving the user input 580b, the device 100 removes the notification 540 (e.g., the device 100 ceases display of the notification 540). In the example of FIG. 5I, the user input 580b is a swipe-up gesture that corresponds to the notification 540 (e.g., the device 100 detects movement of a contact upward at a location on the touch-sensitive surface that corresponds to the notification 540). Removing the notification 540 allows the user to view and utilize the media capture user interface 504 in its entirety.

Referring to FIG. 5J, in some embodiments, the device 100 receives a user input 580c that corresponds to a request to activate the notification 540. In response to receiving the user input 580c, the device 100 performs an action associated with the encoded data 516. In the example of FIG. 5J, the device 100 displays a browser interface 504a that displays a website referenced by the encoded data 516. In the example of FIG. 5J, the user input 580c is a tap input. In some examples, the user input 580c includes a swipe-down gesture (e.g., the device 100 detects movement of a contact downward at a location on the touch-sensitive surface that corresponds to the notification 540) or a swipe-right gesture (e.g., the device 100 detects movement of a contact rightward at a location on the touch-sensitive surface that corresponds to the notification 540). Activating the notification 540 triggers an action associated with the encoded data 516 without requiring the user to provide a sequence of user inputs to perform the action thereby improving the efficiency of the device 100. Triggering the action associated with the encoded data 516 without requiring the user to provide a sequence of user inputs corresponding to a request to perform the action enhances the operability of the device and makes the user-device interface more efficient (e.g., by reducing the need for a sequence of user inputs corresponding to a request to perform the action associated with the encoded data 516) which, additionally, reduces power usage and improves battery life of the device by enabling the user to use the device more quickly and efficiently.

Referring to FIG. 5K, in some embodiments, the device 100 receives a user input 580d that corresponds to a request to expand the notification 540. In response to receiving the user input 580d, the device 100 displays an expanded view 540a of the notification 540. In some embodiments, the expanded view 540a includes information 541 stored in the encoded data 516, and affordances 542a, 542b and 542c. In the example of FIG. 5K, the information 541 includes a web address. The affordance 542a, when activated, launches a browser interface (e.g., the browser interface 504a shown in FIG. 5J) that displays a website corresponding to the web address. The affordance 542b, when activated, copies the information 541, so that the information 541 can be pasted elsewhere (e.g., in response to a paste input). The affordance 542c, when activated, displays additional affordances. In some embodiments, the user input 580d is associated with an input intensity 556b. In some embodiments, the device 100 displays the expanded view 540a in response to the input intensity 556b being greater than an intensity threshold 524b. Expanding the notification 540 provides the user with additional options (e.g., options other than launching the browser interface 504a) thereby expanding the functionality of the device 100 and providing a better user experience.

FIGS. 5L-5O illustrate a sequence in which the device 100 displays an expanded notification that includes various affordances for effectuating respective operations. FIG. 5L illustrates an example notification 540b. The notification 540b indicates that the device 100 has detected data encoded in an optical machine-readable format 516a ("encoded data 516a", hereinafter for the sake of brevity). The notification 540b includes a phone number 560. The notification 540b also includes an affordance 564 that, when activated, expands the notification 540b. In the example of FIG. 5L, the device 100 receives a user input 580e selecting the affordance 564. As such, the user input 580e corresponds with a request to expand the notification 540b. The affordance 564 allows the user to expand the notification 540b and view options to perform various operations.

Referring to FIG. 5M, in response to receiving the user input 580e, the device 100 displays an expanded view 540c of the notification 540b. The expanded view 540c displays options to perform various operations. In the example of FIG. 5M, the expanded view 540c includes a call affordance 572a, a contacts affordance 572b and a messaging affordance 572c. The call affordance 572a, when activated, causes a phone application to initiate a phone call to the phone number 560. The contacts affordance 572b, when activated, causes a contacts application to save the phone number 560 in an address book. The messaging affordance 572c, when activated, causes a messaging application to create a new message and populate the phone number 560 in an addressee field of the new message. The call affordance 572a includes a phone icon 574a to indicate that the call affordance 572a can initiate a phone call to the phone number 560. The contacts affordance 572b includes a contacts icon 574b to indicate that the contacts affordance 572a can effectuate the phone number 560 to be saved in an address book. The messaging affordance 572c includes a messaging icon 574c to indicate that the messaging affordance 572c can effectuate the messaging application to send a message to the phone number 560. The affordances in the expanded view 540c are based on the information stored in the encoded data 516a. As such, the affordances in the expanded view 540c can trigger different applications based on the information stored in the encoded data 516a. Presenting the expanded view 540c allows the user to perform various operations associated with the encoded data 516a thereby improving the operability of the device 100. Providing the user with options to perform various operations enhances the operability of the device and makes the user-device interface more efficient (e.g., by reducing the need for a sequence of user inputs corresponding to manually performing the various operations) which, additionally, reduces power usage and improves battery life of the device by enabling the user to use the device more quickly and efficiently.

Referring to FIGS. 5N-5O, the device 100 receives a user input 580f at a location corresponding to the call affordance 572a. In some embodiments, the user input 580f corresponds to a request to initiate a phone call with the phone number 560. In the example of FIG. 5N, the user input 580f is a tap input. In response to receiving the user input 580f, the device 100 causes the phone application to initiate a phone call to the phone number 560. In the example of FIG. 5O, the device 100 displays a phone user interface 504b. The phone user interface 504b indicates that the phone application has initiated a phone call to the phone number 560. Initiating the phone call to the phone number 560 eliminates the need for the user to manually launch the phone user interface 504b and provide a sequence of user inputs corresponding to entering the phone number 560. Initiating the phone call to the phone number 560 enhances the operability of the device and makes the user-device interface more efficient (e.g., by reducing the need for a sequence of user inputs corresponding to manually entering the phone number 560 into the device) which, additionally, reduces power usage and improves battery life of the device by enabling the user to use the device more quickly and efficiently.

Referring to FIGS. 5P-5Q, in some embodiments, the device 100 displays the notification 540 in response to the encoded data 516 meeting a notification criterion, and the device 100 forgoes display of the notification 540 in response to the encoded data 516 not meeting the notification criteria. In the example of FIGS. 5P-5Q, the notification criterion includes a requirement that the encoded data 516 occupy at least a threshold percentage 524c (e.g., 25%, 30%, 50%, or 75%) of the field of view. In the example of FIG. 5P, the encoded data 516 occupies a first percentage 556c of the field of view. Since the first percentage 556c is less than the threshold percentage 524c, in the example of FIG. 5P, the encoded data 516 does not meet the notification criterion. As such, in the example of FIG. 5P, the device 100 forgoes display of the notification 540. In the example of FIG. 5Q, the encoded data 516 occupies a second percentage 556d of the field of view. Since the second percentage 556d is greater than the threshold percentage 524c, in the example of FIG. 5Q, the encoded data 516 meets the notification criteria. As such, in the example of FIG. 5Q, the device 100 displays the notification 540. Forgoing display of the notification 540 when the encoded data 516 does not meet the notification criteria likely matches an intent of the user to not act upon the encoded data 516. For example, when the encoded data 516 occupies less than the threshold percentage 524c of the field of view, the presence of the encoded data 516 is likely incidental and not purposeful.

FIGS. 5R-5U illustrate a sequence in which the device 100 connects to a network based on data encoded in an optical machine-readable format 516*b* ("encoded data 516*b*", hereinafter for the sake of brevity). In the example of FIG. 5R, the media capture preview 508 includes the encoded data 516*b*. The encoded data 516*b* includes authentication information for a network (e.g., a wireless network such as a Wireless Fidelity (Wi-Fi) network). For example, the encoded data 516*b* includes a network name and a password. As illustrated in FIG. 5S, the device 100 displays a notification 540*d* indicating that the user has the option to connect to a Wi-Fi network. In the example of FIG. 5T, the device 100 receives a user input 580*g* activating the notification 540*d*. The user input 580*g* corresponds to a request to connect to the Wi-Fi network. In response to receiving the user input 580*g*, the device 100 utilizes the authentication information stored in the encoded data 516*b* to connect to the Wi-Fi network. In the example of FIG. 5U, the device displays a notification 540*e* indicating that the device 100 has connected to the Wi-Fi network. The notification 540*d* allows the user to connect to the Wi-Fi network without providing a sequence of user inputs that correspond to manually entering the authentication information for the Wi-Fi network. As such, connecting to the network based on the authentication information stored in the encoded data 516*b* improves the efficiency of the device 100 and provides an improved user experience. Connecting to the network based on the authentication information stored in the encoded data 516*b* enhances the operability of the device and makes the user-device interface more efficient (e.g., by reducing the need for a sequence of user inputs corresponding to manually entering the authentication information for the Wi-Fi network) which, additionally, reduces power usage and improves battery life of the device by enabling the user to use the device more quickly and efficiently.

Figure 5V:
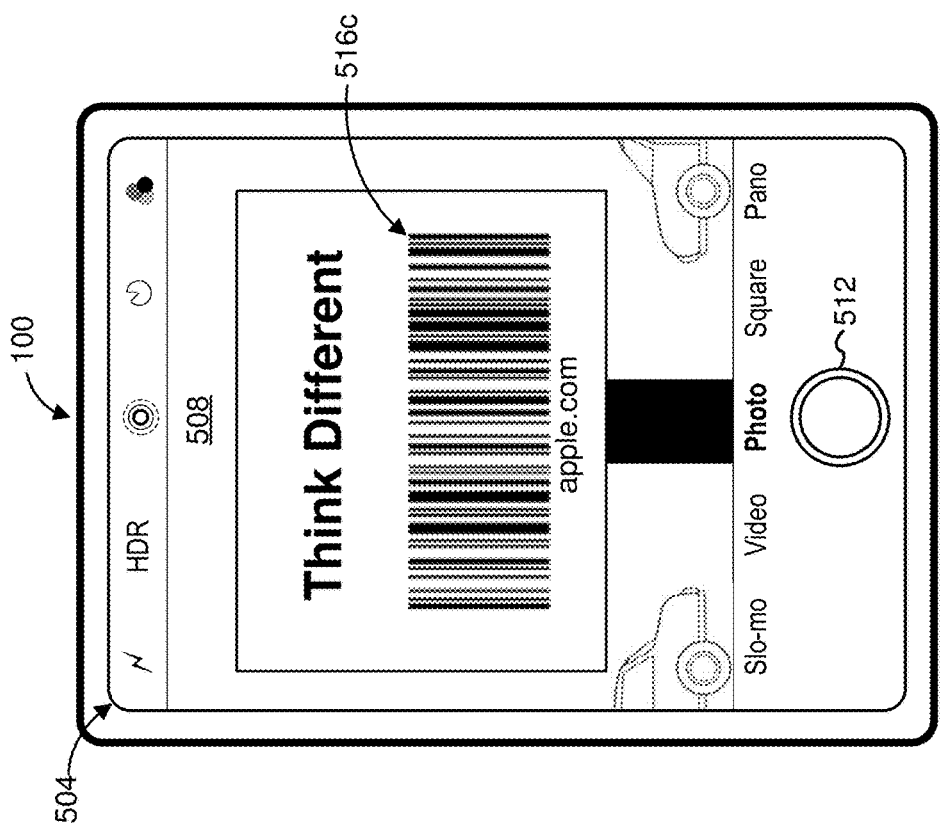

FIGS. 5V-5W illustrate a sequence in which the media capture preview 508 includes data encoded in an optical machine-readable format 516*c* ("encoded data 516*c*", hereinafter for the sake of brevity). In the example of FIGS. 5V-5W, the encoded data 516*c* is a one-dimensional barcode (e.g., instead of the two-dimensional barcode illustrated in FIGS. 5B-5N and FIGS. 5P-5U). In the example of FIGS. 5V-5W, the encoded data 516*c* includes a web address for a web page. As illustrated in FIG. 5W, the device 100 displays a notification 540*f* indicating that the field of view includes the encoded data 516*c*. In the example of FIG. 5W, the notification 540*f* includes an indication 544*f* that the device 100 has detected the encoded data 516*c*. In some examples, the indication 544*f* indicates a type of the encoded data 516*c*. For example, the indication 544*f* specifies that the encoded data 516*c* is a one-dimensional (1-D) barcode. The notification 540*f* includes a descriptor 552*f* that indicates an action (e.g., an operation) associated with the encoded data 516*c*. For example, the descriptor 552*f* indicates that activating the notification 540*f* triggers a browser interface to display the website referenced by the encoded data 516*c*. The example of FIGS. 5V-5W illustrates that the device 100 scans for different types of encoded data (e.g., 1-D barcodes, or 2-D barcodes). Scanning for different types of encoded data improves the operability of the device 100 by enabling the device 100 to recognize different types of encoded data and providing the user with options to act upon the encoded data. Recognizing different types of encoded data and providing the user with options to act upon the different types of encoded data enhances the operability of the device and makes the user-device interface more efficient (e.g., by reducing the need for a sequence of user inputs corresponding to manually entering the information stored in the encoded data into the device) which, additionally, reduces power usage and improves battery life of the device by enabling the user to use the device more quickly and efficiently.

FIGS. 6A-6R illustrate example user interfaces for handling data encoded in optical machine-readable format in accordance with some embodiments. The user interfaces in these figures are used to illustrate the processes described below, including the processes in FIGS. 9A-9D. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Figure 6D:
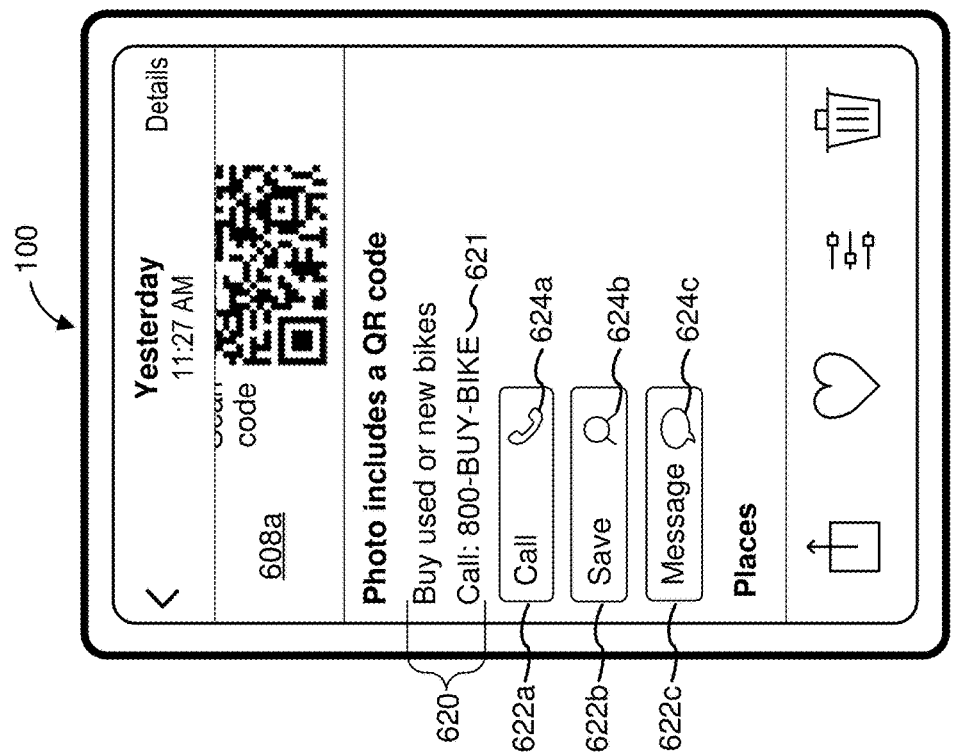
FIGS. 6A-6R illustrate example user interfaces for handling images that include data encoded in optical machine-readable format in accordance with some embodiments.

FIGS. 6A-6D illustrate a sequence in which the device 100 displays an image that includes data encoded in an optical machine-readable format ("encoded data", hereinafter for the sake of brevity), and information corresponding to the encoded data. FIG. 6A illustrates a user interface 602 that includes various icons that correspond to respective modules and/or applications. For example, the user interface 602 includes the icon 428 for the image management module 144 shown in FIG. 3 (e.g., a photos application). In the example of FIG. 6A, the device 100 receives a user input 680 at a location that corresponds to the icon 428. As illustrated in FIGS. 6A-6B, in response to receiving the user input 680, the device 100 presents a photos user interface 604 of a photos application. In some embodiments, the photos user interface 604 is generated by the image management module 144 shown in FIG. 3.

Referring to FIG. 6B, the photos user interface 604 includes representations for various images. In the example of FIG. 6B, the photos user interface 640 includes representations for images 608*a* and 608*b*. As illustrated in FIG. 6B, the device 100 receives a user input 680*a* at a location corresponding with the image 608*a*. In some embodiments, the user input 680*a* corresponds to a request to view the image 608*a* (e.g., a request to view an enlarged version of the image 608*a*). In some embodiments, the user input 680*a* is a tap input.

Figure 6C:
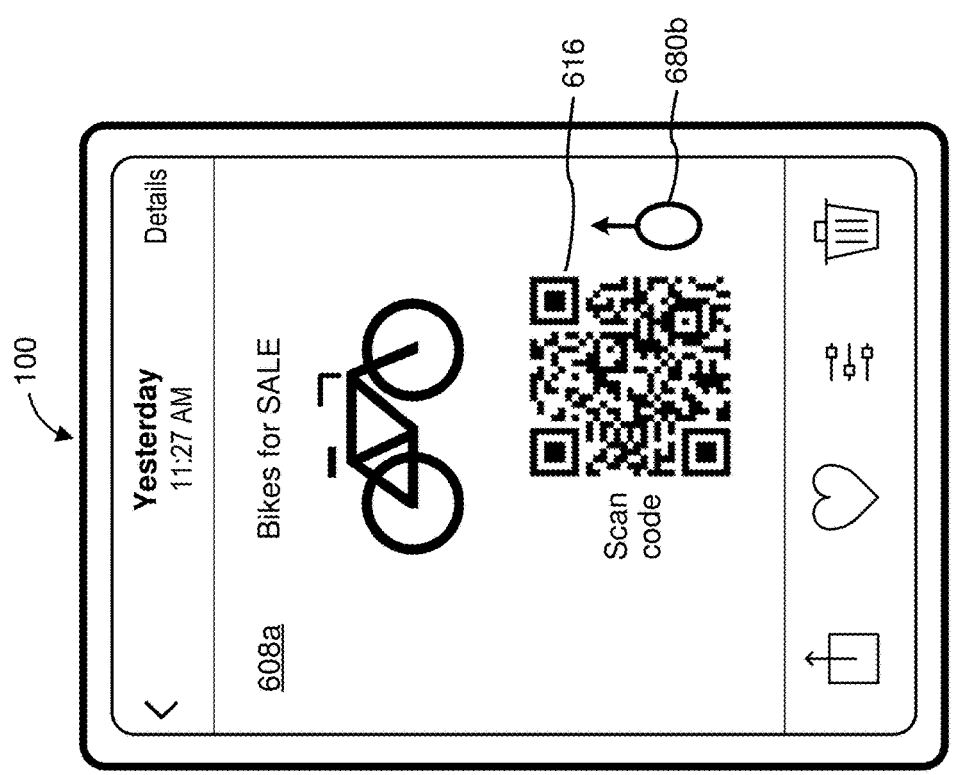

Referring to FIG. 6C, in response to receiving the user input 680*a* shown in FIG. 6B, the device 100 displays the image 608*a*. In the example of FIG. 6C, the image 608*a* includes data encoded in an optical machine-readable format 616 ("encoded data 616", hereinafter for the sake of brevity). In some embodiments, the encoded data 616 includes a barcode (e.g., a one-dimensional barcode, or a two-dimensional barcode such as a QR CODE® (trademark of Denso Corporation)). In some embodiments, the encoded data 616 stores information (e.g., a phone number, a web address, GPS coordinates, etc.). In the example of FIG. 6C, the device 100 receives a user input 680*b* that corresponds to a request to display additional information corresponding to the image 608*a*. In some embodiments, the device 100 detects the user input 680*b* by detecting movement of a contact upward at a location on the touch-sensitive surface that corresponds to the image 608*a*. In some embodiments, the user input 680*b* includes a swipe-up gesture.

Referring to FIG. 6D, in response to receiving the user input 680*b* shown in FIG. 6C, the device 100 displays information 620 corresponding to the encoded data 616. In the example of FIG. 6D, the information 620 includes text (e.g., "Buy used or new bikes"), and a phone number 621 (e.g., 800-BUY-BIKE). In some embodiments, the device 100 retrieves the information 620 from the encoded data 616. For example, the device 100 decodes the encoded data 616 to identify the information 620. Displaying the information 620 corresponding to the encoded data 616 allows the user to view the information 620 thereby providing a better user experience. Displaying the information 620 corresponding to the encoded data 616 enhances the operability of the device and makes the user-device interface more efficient (e.g., by reducing the need for a sequence of user inputs corresponding to requesting the information from another source) which, additionally, reduces power usage and improves battery life of the device by enabling the user to use the device more quickly and efficiently.

In some embodiments, the information 620 is actionable. In other words, the device 100 can utilize the information 620 to perform one or more operations (e.g., the device 100 can initiate a phone call to the phone number 621). In the example of FIG. 6D, the device 100 displays a call affordance 622a, a contacts affordance 622b and a messaging affordance 622c. The call affordance 622a, when activated, causes a phone application to initiate a phone call to the phone number 621. The contacts affordance 622b, when activated, causes a contacts application to save the phone number 621 in an address book. The messaging affordance 622c, when activated, causes a messaging application to create a new message and populate the phone number 621 in an addressee field of the new message. The call affordance 622a includes a phone icon 624a to indicate that activating the call affordance 622a initiates a phone call to the phone number 621. The contacts affordance 622b includes a contacts icon 624b to indicate that activating the contacts affordance 622a saves the phone number 621 in an address book. The messaging affordance 622c includes a messaging icon 624c to indicate that activating the messaging affordance 622c triggers sending a message to the phone number 621. The device 100 presents affordances (e.g., the call affordance 622a, the contacts affordance 622b and the messaging affordance 622c) based on the information 620 stored in the encoded data 616. For example, in some embodiments, the device 100 presents a browser affordance in response to the information 620 including a web address. Presenting the affordances (e.g., the call affordance 622a, the contacts affordance 622b and the messaging affordance 622c) allows the user to perform various operations associated with the encoded data 616 thereby improving the operability of the device 100. Presenting the affordances enhances the operability of the device and makes the user-device interface more efficient (e.g., by reducing the need for a sequence of user inputs corresponding to manually effectuating the operations triggered by the affordances) which, additionally, reduces power usage and improves battery life of the device by enabling the user to use the device more quickly and efficiently.

Figure 6E:
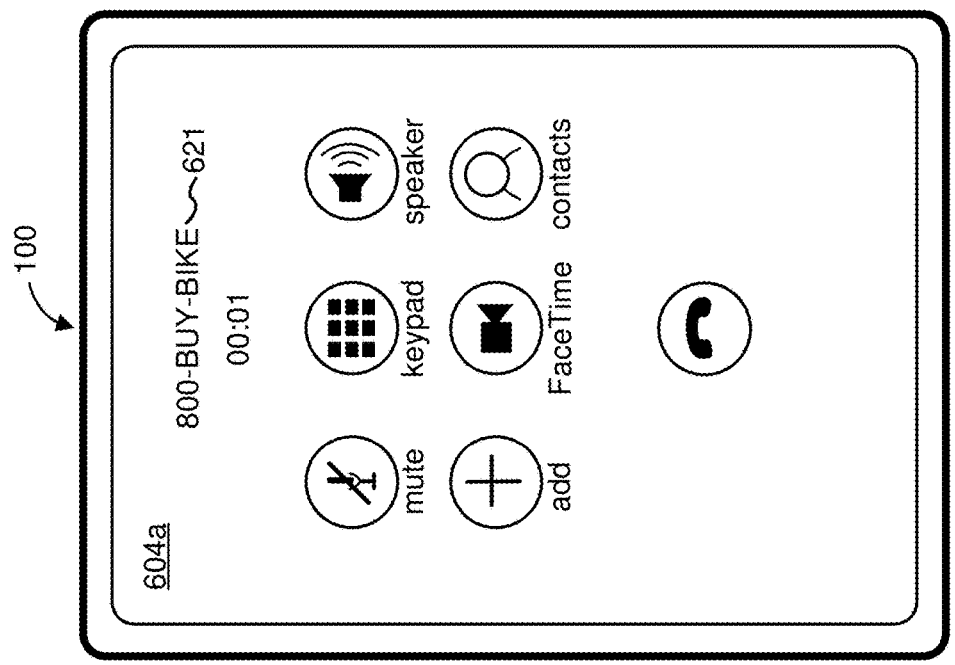
Figure 6E:
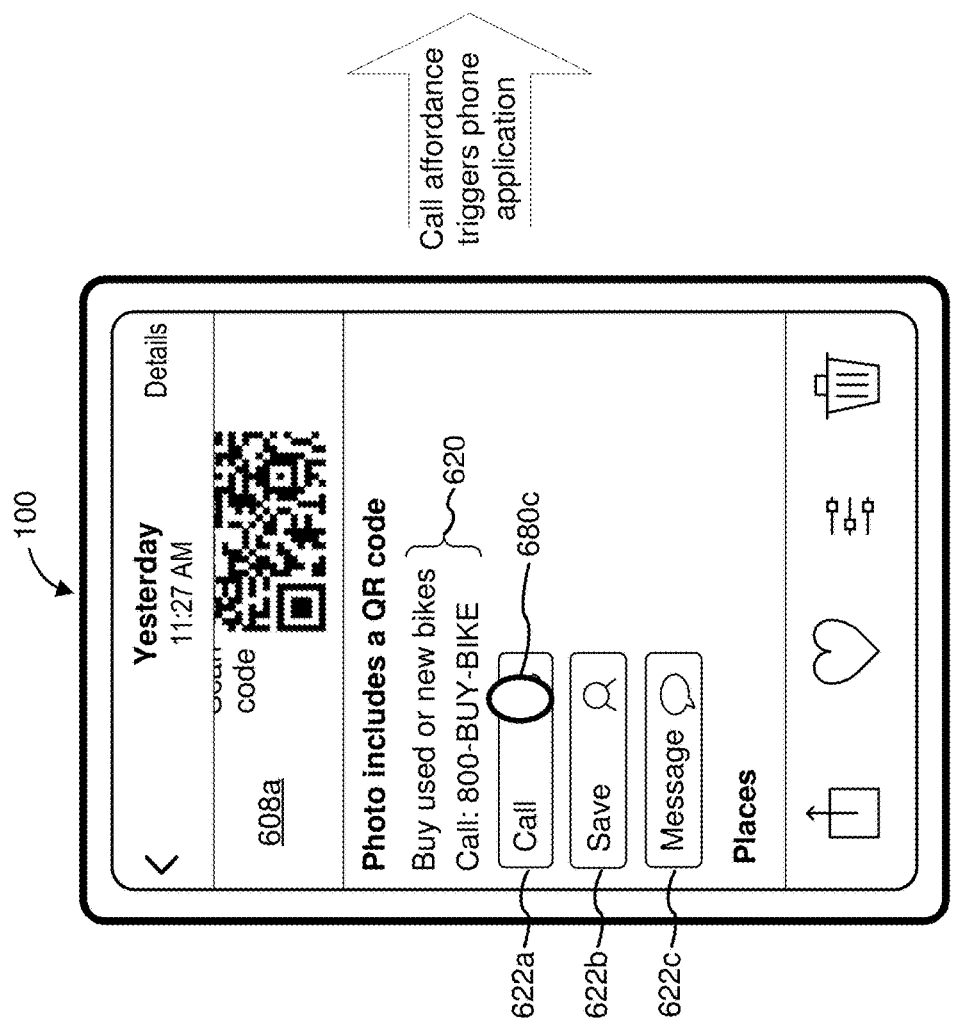

Referring to FIG. 6E, the device 100 receives a user input 680c at a location corresponding to the call affordance 622a. In some embodiments, the user input 680c corresponds to a request to initiate a phone call with the phone number 621. In the example of FIG. 6E, the user input 680c is a tap input. In response to receiving the user input 680c, the device 100 causes the phone application to initiate a phone call to the phone number 621. In the example of FIG. 6E, the device 100 displays a phone user interface 604a. The phone user interface 604a indicates that the phone application has initiated a phone call to the phone number 621. Initiating the phone call to the phone number 621 eliminates the need for the user to manually launch the phone user interface 604a and provide a sequence of user inputs corresponding to entering the phone number 621. Initiating the phone call to the phone number 621 enhances the operability of the device and makes the user-device interface more efficient (e.g., by reducing the need for a sequence of user inputs corresponding to manually entering the phone number 621 into the device) which, additionally, reduces power usage and improves battery life of the device by enabling the user to use the device more quickly and efficiently.

Figure 6G:
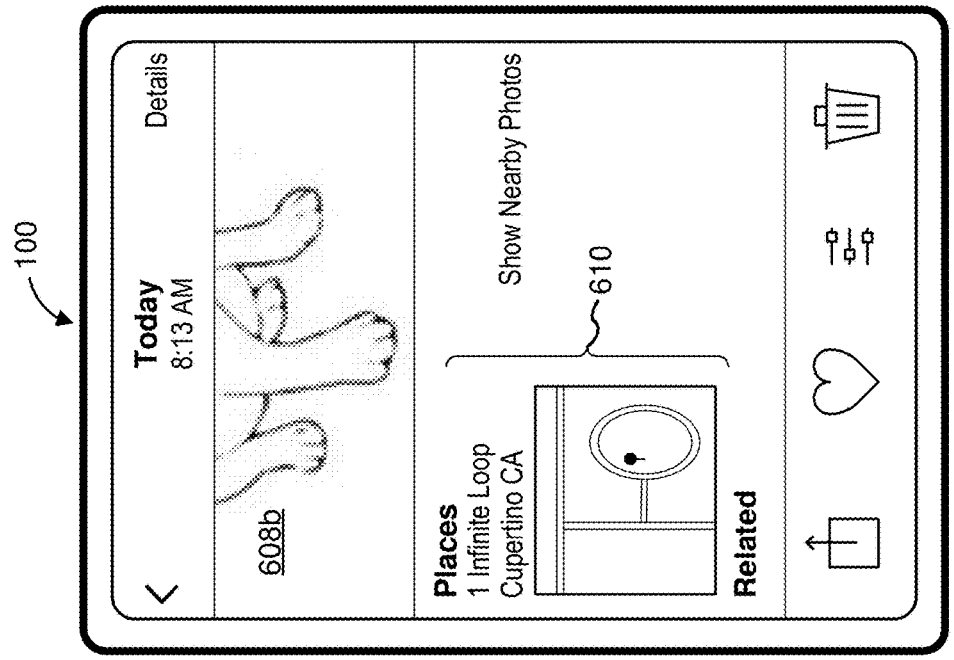
Figure 6F:
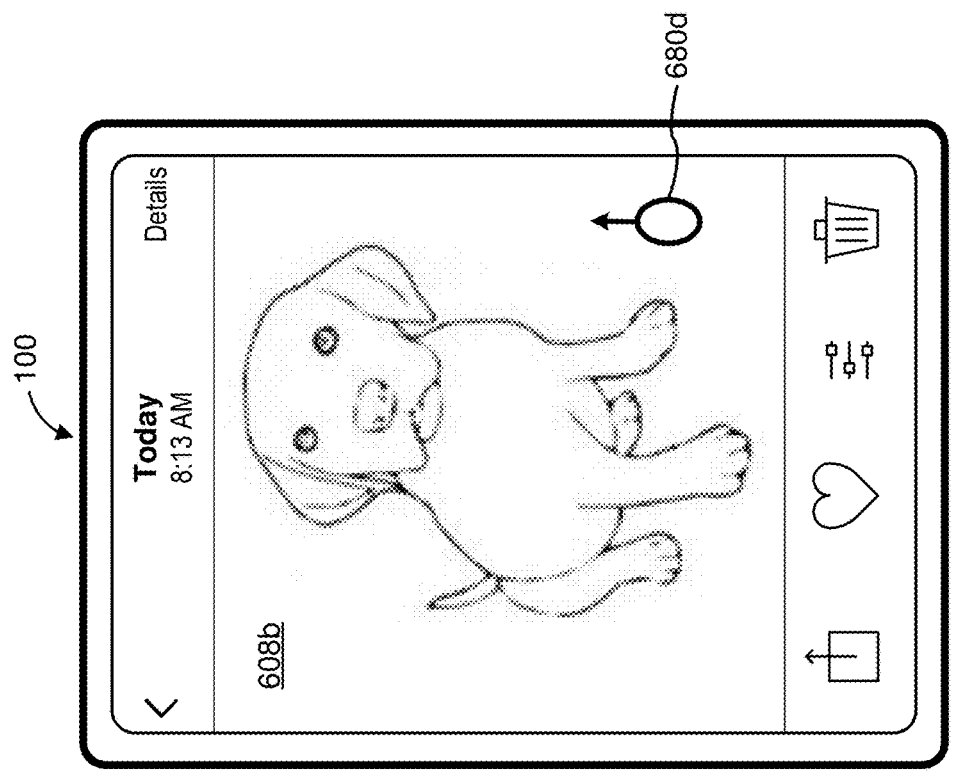

FIGS. 6F-6G illustrate a sequence in which the device 100 displays additional information about an image that does not include encoded data. In the example of FIG. 6F, the device 100 displays the image 608b. As illustrated in FIG. 6F, the image 608b does not include encoded data. The device 100 receives a user input 680d that corresponds with a request to display additional information about the image 608b. In the example of FIG. 6F, the user input 680d includes a swipe-up gesture. In other words, in the example of FIG. 6F, the device 100 detects the user input 680d by detecting movement of a contact upward at a location on the touch-sensitive surface that corresponds to the image 608b. As illustrated in FIG. 6G, in response to receiving the user input 680d shown in FIG. 6F, the device 100 displays additional information 610 about the image 608b. In the example of FIG. 6G, the additional information 610 includes location information associated with the image 608b. For example, the additional information 610 includes a location where the image 608b was captured. Displaying the additional information 610 allows the user to learn more about the image 608b thereby providing a better user experience.

FIGS. 6H-6L illustrate a sequence in which the device 100 displays a share sheet that includes options to perform operations associated with the encoded data. In the example of FIG. 6H, the device 100 displays the image 608a. As described herein, the image 608a includes the encoded data 616. In the example of FIG. 6H, the device 100 includes a share affordance 630. In some embodiments, the share affordance 630, when activated, causes the device 100 to display a share sheet 632 (shown in FIG. 6I) that includes various options to share the image 608a. In the example of FIG. 6H, the device 100 receives a user input 680e selecting the share affordance 630. In some embodiments, the user input 680e is a tap input.

As illustrated in FIG. 6I, in some embodiments, the device 100 displays the share sheet 632 in response to receiving the user input 680e shown in FIG. 6H. The share sheet 632 includes various options for sharing the image 608a. In the example of FIG. 6I, the share sheet 632 includes affordances 634 that, when activated, allow the user to share the image 608a in respective manners. In some embodiments, the share sheet 632 includes affordances that, when activated, trigger respective operations associated with the encoded data 616. In the example of FIG. 6I, the share sheet 632 includes a call affordance 638a, a contacts affordance 638b and a messaging affordance 638c. The call affordance 638a, when activated, causes a phone application to initiate a phone call to the phone number 621. The contacts affordance 638b, when activated, causes a contacts application to save the phone number 621 in an address book. The messaging affordance 638c, when activated, causes a messaging application to create a new message and populate the phone number 621 in an addressee field of the new message. In the example of FIG. 6I, the call affordance 638a, the contacts affordance 638b and the messaging affordance 638c include a symbol 640 indicating that the call affordance 638a, the contacts affordance 638b and the messaging affordance 638c trigger operations associated with the encoded data 616. In some examples, the symbol 640 includes the encoded data 616. Displaying the affordances 638a, 638b and 638c in the share sheet 632 allows the user to perform various operations associated with the encoded data 616 thereby improving the operability of the device 100 and providing a better user experience. Displaying the affordances in the share sheet enhances the operability of the device and makes the user-device interface more efficient (e.g., by reducing the need for a sequence of user inputs corresponding to manually effectuating the operations triggered by the affordances) which, additionally, reduces power usage and improves battery life of the device by enabling the user to use the device more quickly and efficiently.

Figure 6J:
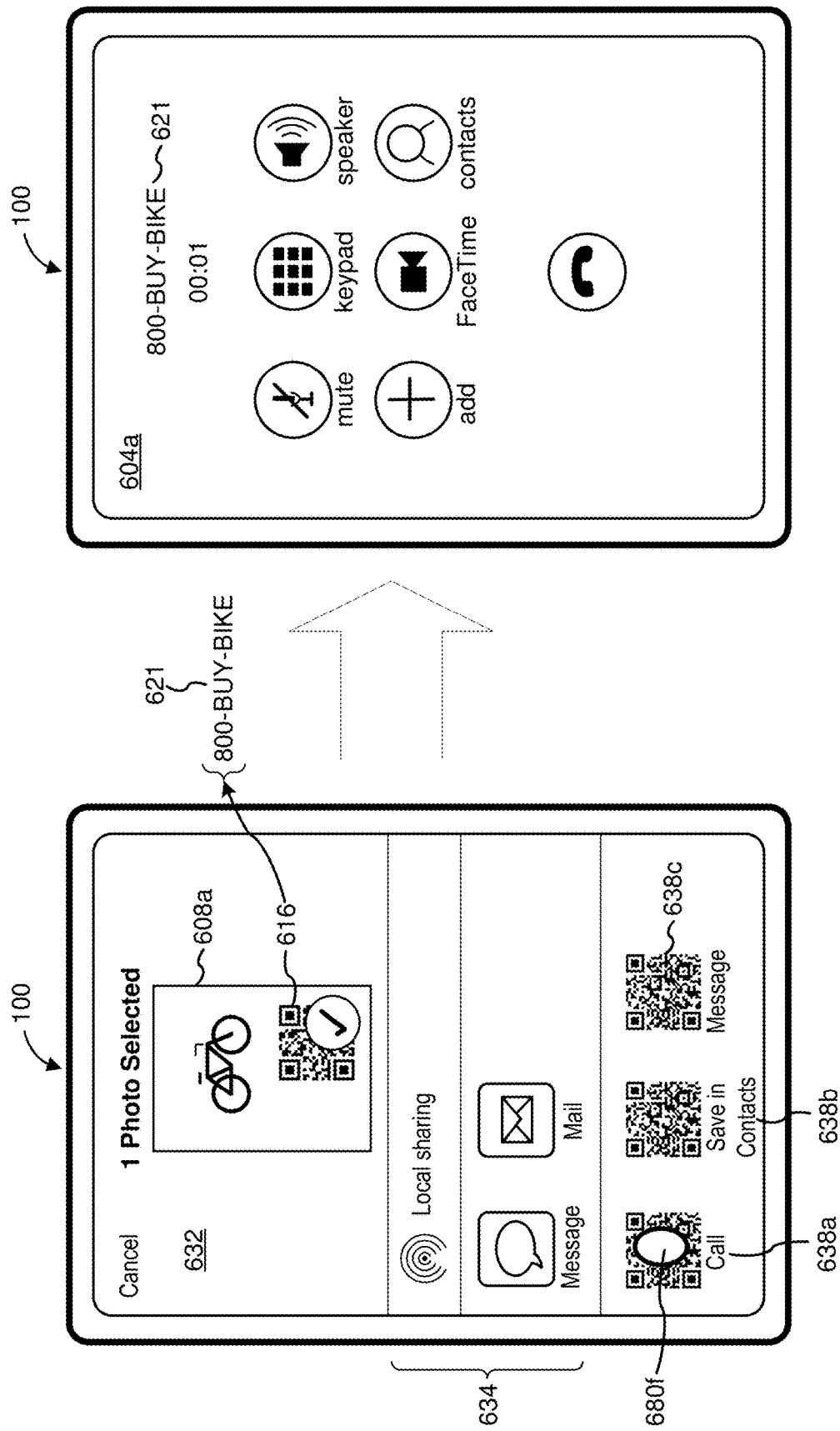

Referring to FIG. 6J, the device 100 receives a user input 680*f* at a location corresponding to the call affordance 638*a*. In some embodiments, the user input 680*f* corresponds to a request to initiate a phone call with the phone number 621. In the example of FIG. 6J, the user input 680*f* is a tap input. In response to receiving the user input 680*f*, the device 100 causes the phone application (e.g., the telephone module 138 shown in FIG. 3) to initiate a phone call to the phone number 621. In the example of FIG. 6J, the device 100 displays a phone user interface 604*a*. The phone user interface 604*a* indicates that the phone application has initiated a phone call to the phone number 621. Initiating the phone call to the phone number 621 eliminates the need for the user to manually launch the phone user interface 604*a* and provide a sequence of user inputs corresponding to entering the phone number 621 thereby providing a better user experience.

Figure 6K:
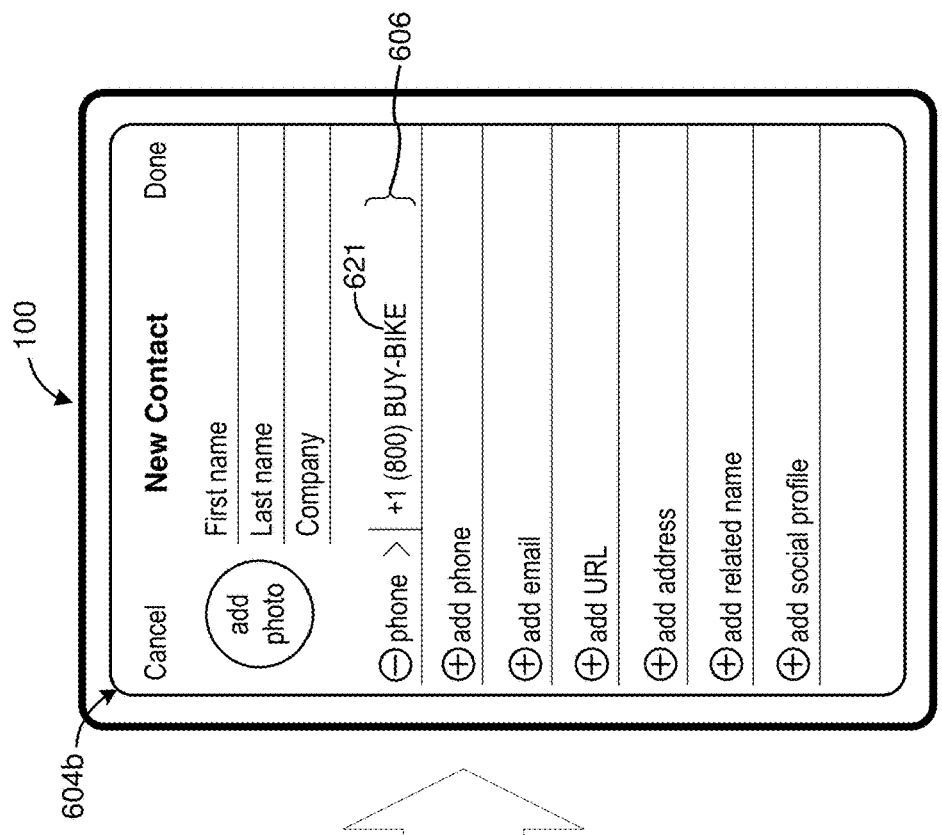
Figure 6K:
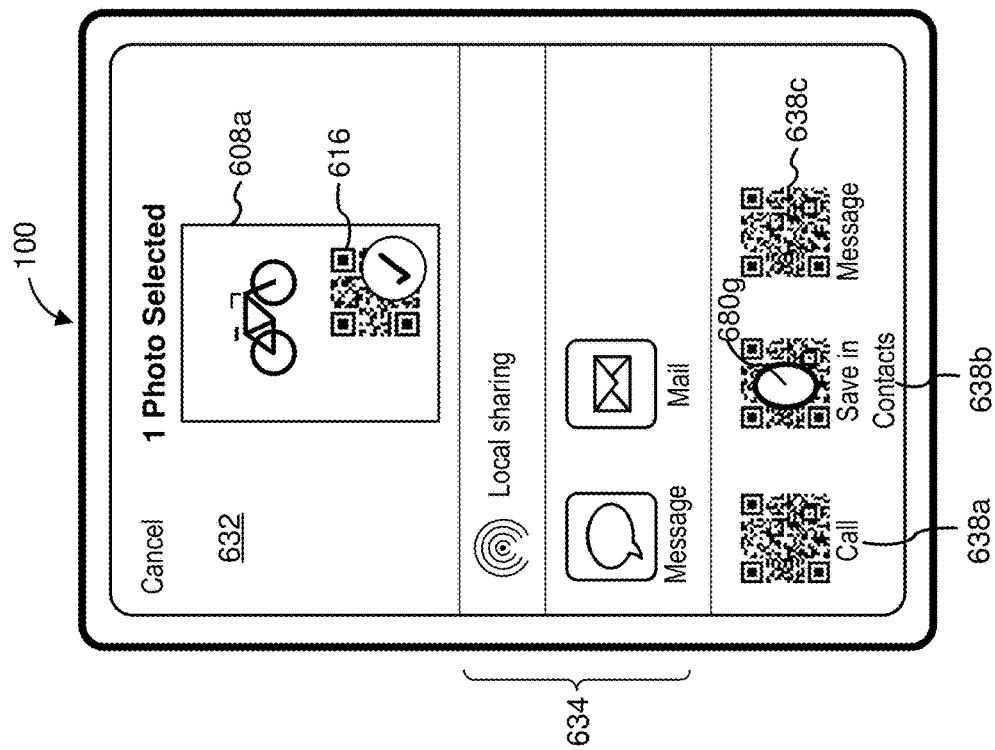

Referring to FIG. 6K, the device 100 receives a user input 680*g* at a location corresponding to the contacts affordance 638*b*. In some embodiments, the user input 680*g* corresponds to a request to save the phone number 621 in an address book. In the example of FIG. 6K, the user input 680*g* is a tap input. In response to receiving the user input 680*g*, the device 100 causes the contacts application (e.g., the contacts module 137 shown in FIG. 3) to generate a new contact entry and populate the phone number 621 in a phone number field of the contact entry. In the example of FIG. 6K, the device 100 displays a contacts user interface 604*b*. The contacts user interface 604*b* indicates that the contacts application has created a new contact entry and populated the phone number 621 in a phone number field 606 of the contact entry. Generating the new contact entry and populating the phone number 621 in the phone number field 606 of the contact entry reduces the need for the user to manually launch the contacts user interface 604*b* and provide a sequence of user inputs corresponding to entering the phone number 621 in the phone number field 606 thereby providing a better user experience. Generating the new contact entry and populating the phone number 621 in the phone number field 606 enhances the operability of the device and makes the user-device interface more efficient (e.g., by reducing the need for a sequence of user inputs corresponding to manually creating the new contact entry and entering the phone number 621 into the phone number field 606) which, additionally, reduces power usage and improves battery life of the device by enabling the user to use the device more quickly and efficiently.

Figure 6L:
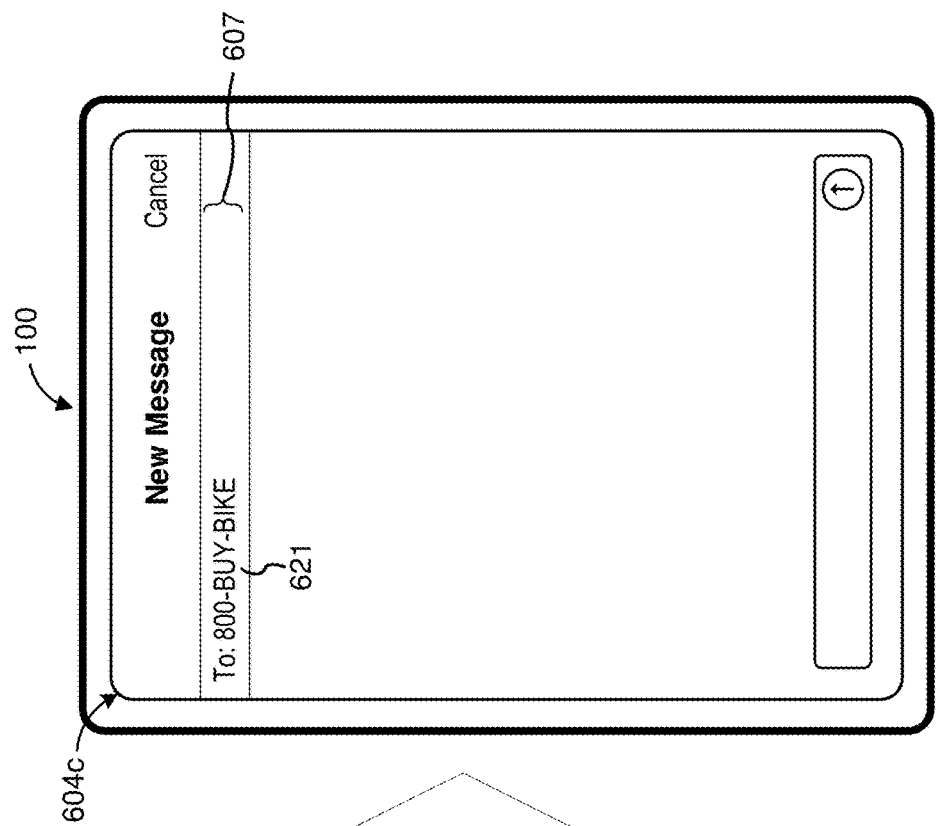
Figure 6L:
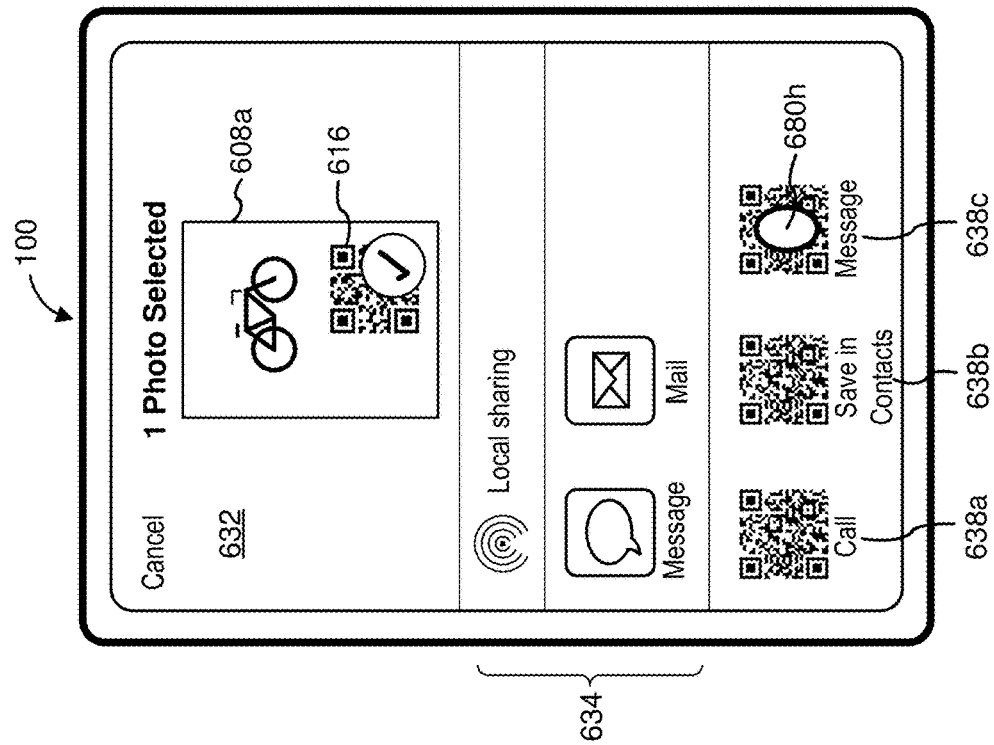

Referring to FIG. 6L, the device 100 receives a user input 680*h* at a location corresponding to the messaging affordance 638*c*. In some embodiments, the user input 680*h* corresponds to a request to send a message to a recipient associated with the phone number 621. In the example of FIG. 6L, the user input 680*h* is a tap input. In response to receiving the user input 680*h*, the device 100 causes the messaging application (e.g., the instant messaging module 141 shown in FIG. 3) to generate a new message and populate the phone number 621 in an addressee field new message. In the example of FIG. 6L, the device 100 displays a messaging user interface 604*c*. The messaging user interface 604*c* indicates that the messaging application has created a new message and populated the phone number 621 in an addressee field 607 of the new message. Generating the new message and populating the phone number 621 in the addressee field 607 of the new message eliminates the need for the user to manually launch the messaging user interface 604*c* and provide a sequence of user inputs corresponding to creating a new message and entering the phone number 621 in the addressee field 607 of the new message thereby providing a better user experience. Generating the new message and populating the phone number 621 in the addressee field 607 enhances the operability of the device and makes the user-device interface more efficient (e.g., by reducing the need for a sequence of user inputs corresponding to manually creating the new message and entering the phone number 621 into the addressee field 607) which, additionally, reduces power usage and improves battery life of the device by enabling the user to use the device more quickly and efficiently.

Figure 6N:
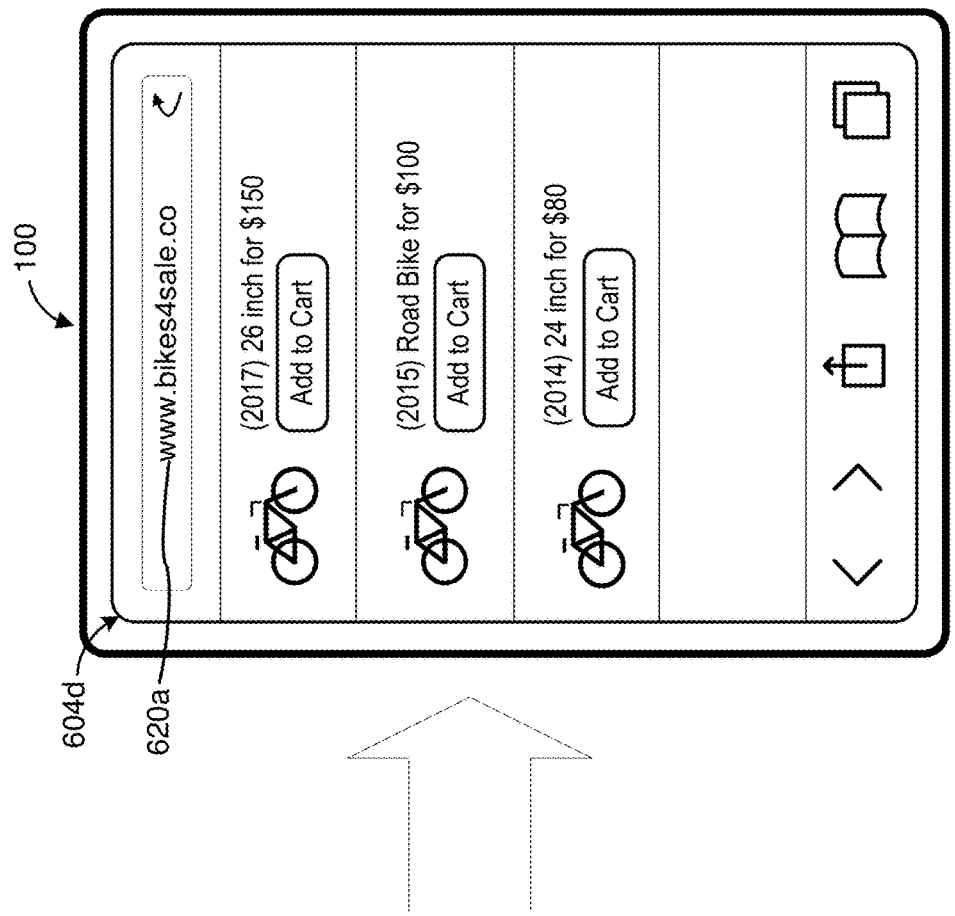
Figure 6M:
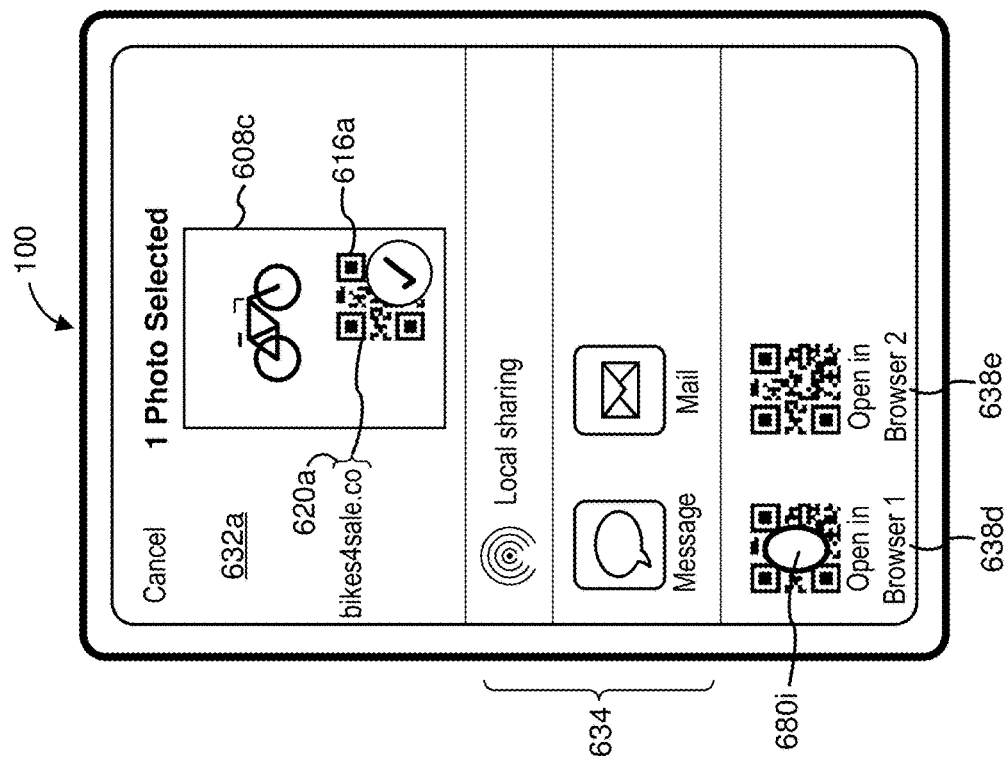

FIGS. 6M-6N illustrate a sequence in which the device 100 displays affordances for an operation that can be performed by several applications of the same type (e.g., affordances for different browser applications). In the example of FIG. 6M, the device 100 displays a share sheet 632*a* that includes sharing options for an image 608*c* that includes encoded data 616*a*. In the example of FIG. 6M, the encoded data 616*a* includes a web address 620*a*. As illustrated in FIG. 6M, in addition to the affordances 634 that allow the user to share the image 608*c*, the share sheet 632*a* includes a first browser affordance 638*d* and a second browser affordance 638*e*. In some examples, the first browser affordance 638*d*, when activated, launches a first browser application and causes the first browser application to display a web page corresponding to the web address 620*a*. In some examples, the second browser affordance 638*e*, when activated, launched a second browser application and causes the second browser application to display the web page corresponding to the web address 620*a*. In some examples, the first browser application is a default browser application (e.g., a browser application provided by a manufacturer of the device 100), and the second browser application is a non-default browser application (e.g., a third-party browser application that the user downloaded). More generally, in various embodiments, the share sheet 632*a* includes a first affordance that causes a default application to perform an operation associated with the encoded data 616*a*, and a second affordance that causes a non-default application to perform the operation. Presenting affordances for different applications of the same type provides the user with an option to perform the same operation with different applications thereby enhancing the user experience. Presenting affordances that trigger different applications for effectuating the same operation enhances the operability of the device and makes the user-device interface more efficient (e.g., by reducing the need for a sequence of user inputs corresponding to manually launching one of the applications and effectuating the operation with the launched application) which, additionally, reduces power usage and improves battery life of the device by enabling the user to use the device more quickly and efficiently.

In the example of FIG. 6M, the device 100 receives a user input 680*i* at a location corresponding to the first browser affordance 638*d*. In some embodiments, the user input 680*i* corresponds to a request to perform the operation associated with the encoded data 616*a*. In other words, the user input 680*i* corresponds to a request to view the web page referenced by the web address 620a. As illustrated in FIG. 6N, in response to receiving the user input 680i shown in FIG. 6M, the device 100 displays a browser user interface 604d that displays the web page corresponding to the web address 620a. Displaying the web page reduces the need for the user to provide a sequence of user inputs corresponding to manually launching the browser user interface 604d and entering the web address 620a thereby improving an operability of the device 100 and providing a better user experience. Displaying the web page enhances the operability of the device and makes the user-device interface more efficient (e.g., by reducing the need for a sequence of user inputs corresponding to manually launching a browser application and entering the web address 620a into the browser application to open the web page) which, additionally, reduces power usage and improves battery life of the device by enabling the user to use the device more quickly and efficiently.

FIGS. 6O-6P illustrate a sequence in which the device 100 receives the image 608a via a message. FIG. 6P illustrates a messaging user interface 604e generated by a messaging application (e.g., the instant messaging module 141 shown in FIG. 3). In the example of FIG. 6O, the device 100 receives the image 608a as a message. The device 100 displays the image 608a in the messaging user interface 604e. For example, the device 100 displays the image 608a in-line with other messages. In the example of FIG. 6O, the device 100 receives a user input 680j at a location corresponding to the image 608a. In some embodiments, the user input 680j corresponds to a request to display additional information about the image 608a. In some embodiments, the user input 680j corresponds to a request to view information corresponding to the encoded data 616 included in the image 608a. In some embodiments, the user input 680j corresponds to a request to view an option to perform an operation associated with the encoded data 616. In the example of FIG. 6O, the user input 680j is associated with a time duration 682a that is greater than a time threshold 650a. In other words, the user input 680j is a long press.

As illustrated in FIG. 6P, in response to receiving the user input 680j, the device 100 displays various affordances 690 that, when activated, allow the user to perform respective operations related to the image 608a (e.g., send a predefined reply message). Some of the affordances 690 allow the user to perform operations associated with the encoded data 616 included in the image 608a. In the example of FIG. 6P, the device 100 displays a browser affordance 690a that, when activated, launches a browser user interface (e.g., the browser user interface 604d shown in FIG. 6N) and displays a web page referenced by the encoded data in the browser user interface (e.g., as illustrated in FIG. 6N). Displaying an option to perform an operation associated with the encoded data within the messaging user interface 604e improves the operability of the device 100 by allowing the user to perform the operation without requiring a sequence of additional user inputs. Displaying, within the messaging interface 604e, options to perform operations enhances the operability of the device and makes the user-device interface more efficient (e.g., by reducing the need for a sequence of user inputs corresponding to switching to an interface generated by another application in order to effectuate the operations) which, additionally, reduces power usage and improves battery life of the device by enabling the user to use the device more quickly and efficiently.

Figure 6Q:
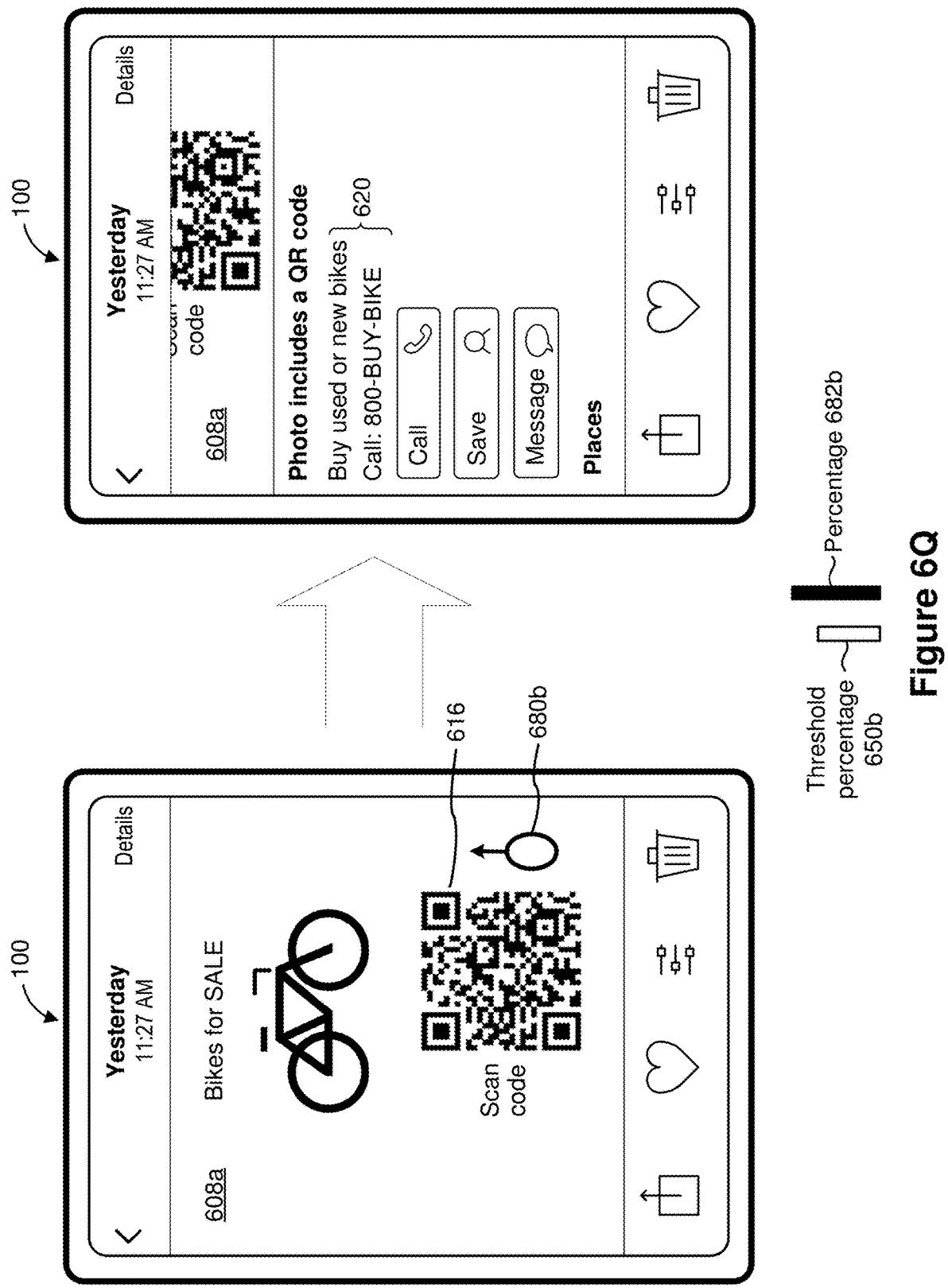

FIGS. 6Q-6R illustrate a sequence in which the device 100 displays information 620 corresponding to encoded data 616 in response to the encoded data 616 meeting a threshold criterion, and the device 100 forgoes display of the information corresponding to the encoded data 616 in response to the encoded data 616 not meeting the threshold criterion. In the example of FIGS. 6Q-6R, the threshold criterion includes a requirement that the encoded data 616 occupy at least a threshold percentage 650b of the image being displayed. In the example of FIG. 6Q, the encoded data 616 occupies a percentage 682b that is greater than the threshold percentage 650b. Since the percentage 682b is greater than the threshold percentage 650b, the device 100 displays the information 620 corresponding to the encoded data 616 in response to receiving the user input 680b. In the example of FIG. 6R, the device 100 displays an image 608d that, among other objects, includes the encoded data 616. As illustrated in FIG. 6R, the encoded data 616 occupies a percentage 682c of the image 608d. Since the percentage 682c is smaller than the threshold percentage 650b, the device 100 forgoes display of the information 620 corresponding to the encoded data 616 in response to receiving a user input 680k. By forgoing display of the information corresponding to the encoded data when the encoded data does not meet the threshold criteria, the device 100 likely matches an intent of the user to not act on encoded data that was included in the image incidentally.

FIGS. 7A-7P illustrate example user interfaces for handling encoded features in accordance with some embodiments. In various embodiments, an encoded feature includes encoded information (e.g., an image, and/or text such as a web address, a phone number, etc.). In some embodiments, the device detects various types of encoded features. For example, in some embodiments, the device 100 detects an encoded feature that includes a Near Field Communications (NFC) tag, a beacon, and/or data encoded in an optical machine-readable format (e.g., a barcode, for example, a one-dimensional barcode or a two-dimensional barcode such as a QR code). The user interfaces in these figures are used to illustrate the processes described below, including the processes in FIGS. 10A-10D. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Figure 7B:
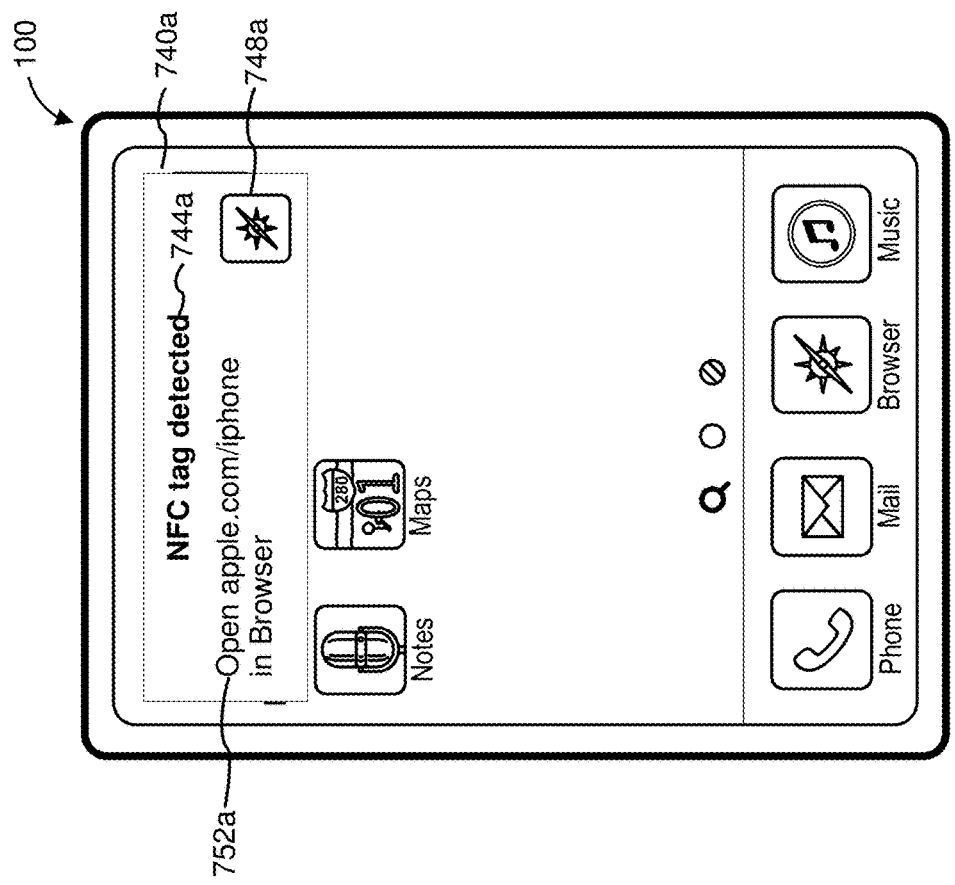
FIGS. 7A-7P illustrate example user interfaces for handling encoded features that trigger notifications in accordance with some embodiments.
Figure 7A:
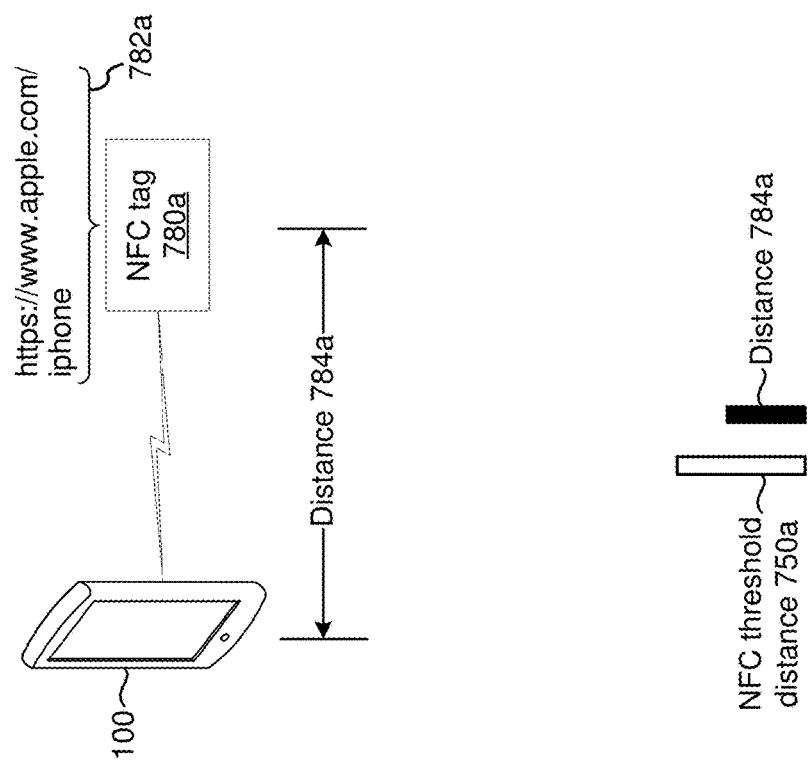

FIGS. 7A-7B illustrate a sequence in which the device 100 displays a notification indicating that the device is in proximity to a first type of encoded feature. In the example of FIG. 7A, the device 100 is in proximity of a Near Field Communications tag 780a ("NFC tag 780a", hereinafter for the sake of brevity). As illustrated in FIG. 7A, the NFC tag 780a includes encoded information 782a. In the example of FIG. 7A, the encoded information 782a includes a web address. In various embodiments, the encoded information 782a is actionable. In other words, in various embodiments, the device 100 can perform one or more operations based on the encoded information 782a. In some embodiments, the device 100 detects that the device 100 is in proximity of the NFC tag 780a when a distance 784a between the device 100 and the NFC tag 780a is less than an NFC threshold 750a.

As illustrated in FIG. 7B, in some embodiments, the device 100 displays a notification 740a in response to detecting that the device 100 is in proximity of the NFC tag 780a. In some embodiments, the notification 740a includes an indication 744a indicating that the device 100 is in proximity of the NFC tag 780a. In the example of FIG. 7B, the indication 744a includes a text string (e.g., NFC tag detected). In some examples, the indication 744a includes a symbol (e.g., a symbol for NFC, for example, an image or a logo for NFC). In some embodiments, the notification 740*a* includes an icon 748*a* for an application that can operate on the encoded information 782*a*. In some embodiments, the notification 740*a* includes the icon 748*a* for an application that can utilize the encoded information 782*a* to perform an operation. In the example of FIG. 7B, the notification 740*a* includes the icon 748*a* for a browser application (e.g., the browser module 147 shown in FIG. 3). In some embodiments, the notification 740*a* includes a descriptor 752*a* that indicates an operation that the user can perform by activating the notification 740*a*. Displaying the notification 740*a* in response to the device 100 being in proximity of the NFC tag 780*a* provides the user with an option to act on the encoded information 782*a* stored in the NFC tag 780*a* thereby improving the operability of the device 100 and providing a better user experience. Providing the user with an option to act on the encoded information 782*a* stored in the NFC tag 780*a* enhances the operability of the device and makes the user-device interface more efficient (e.g., by reducing the need for a sequence of user inputs corresponding to manually effectuating an action indicated by the encoded information 782*a*) which, additionally, reduces power usage and improves battery life of the device by enabling the user to use the device more quickly and efficiently.

Figure 7D:
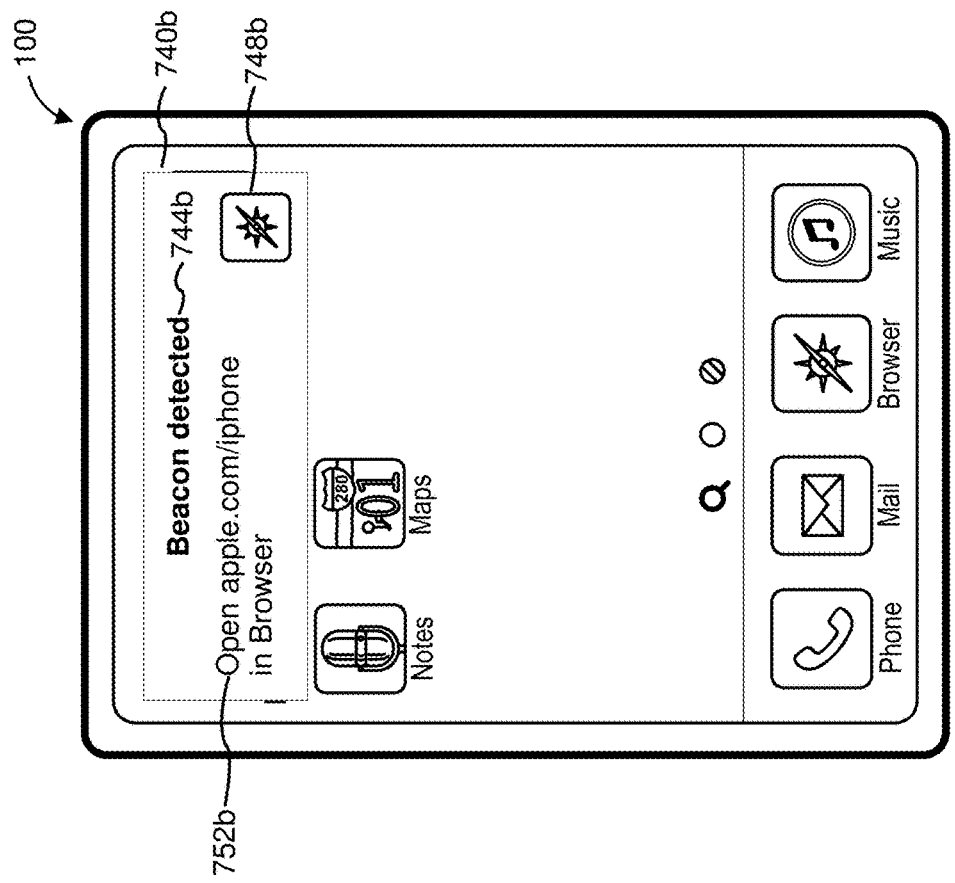
Figure 7C:
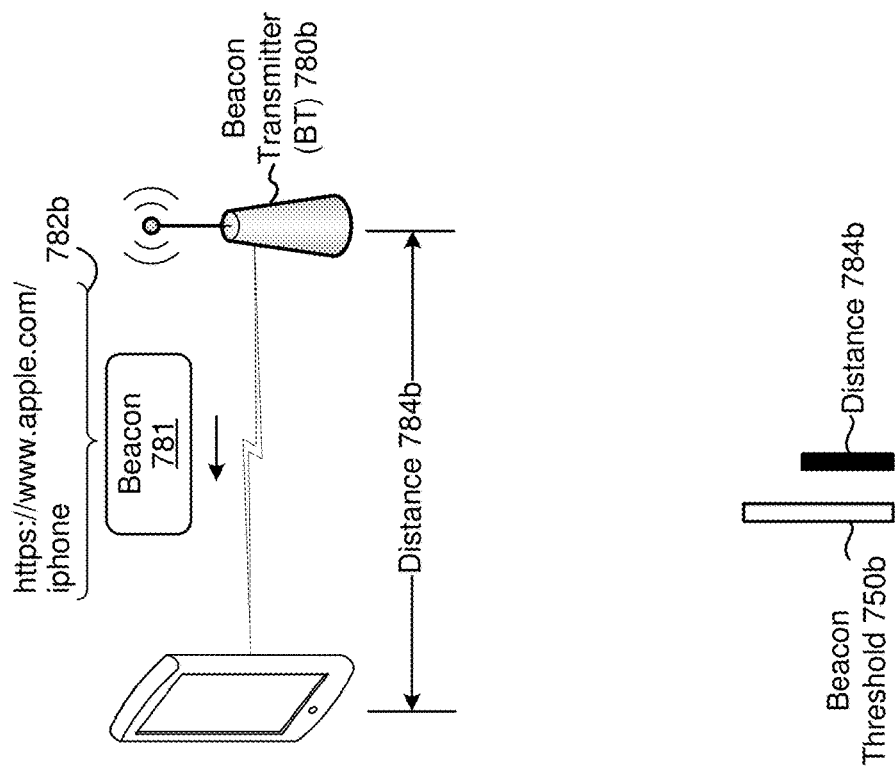

FIGS. 7C-7D illustrate a sequence in which the device 100 displays a notification indicating that the device is in proximity to a second type of encoded feature. In the example of FIG. 7C, the device 100 is in proximity of a beacon transmitter 780*b* that transmits a beacon 781. As illustrated in FIG. 7C, the beacon 781 includes encoded information 782*b*. In the example of FIG. 7C, the encoded information 782*b* includes a web address. In various embodiments, the encoded information 782*b* is actionable. In various embodiments, the device 100 can perform one or more operations based on the encoded information 782*b*. In some embodiments, the device 100 detects that the device 100 is in proximity of the beacon transmitter 780*b* when the device 100 receives the beacon 781. In some embodiments, the device 100 receives the beacon 781 when a distance 784*b* between the device 100 and the beacon transmitter 780*b* is less than a beacon threshold 750*b*. As such, in some embodiments, the device 100 determines that the device 100 is in proximity of the beacon transmitter 780*b* when the distance 784*b* between the device 100 and the beacon transmitter 780*b* is less than the beacon threshold 750*b*.

As illustrated in FIG. 7D, in some embodiments, the device 100 displays a notification 740*b* in response to detecting that the device 100 is in proximity of the beacon transmitter 780*b*. In some embodiments, the notification 740*b* includes an indication 744*b* indicating that the device 100 is in proximity of the beacon transmitter 780*b*. In the example of FIG. 7D, the indication 744*b* includes a text string (e.g., Beacon detected). In some examples, the indication 744*b* includes a symbol (e.g., a symbol for beacons, for example, an image or a logo for beacons). In some embodiments, the notification 740*b* includes an icon 748*b* for an application that can operate on the encoded information 782*b*. In some embodiments, the notification 740*b* includes the icon 748*b* for an application that can utilize the encoded information 782*b* to perform an operation. In the example of FIG. 7D, the notification 740*b* includes the icon 748*b* for a browser application (e.g., the browser module 147 shown in FIG. 3). In some embodiments, the notification 740*b* includes a descriptor 752*b* that indicates an operation that the user can perform by activating the notification 740*b*. Displaying the notification 740*b* in response to the device 100 being in proximity of the beacon transmitter 780*b* provides the user with an option to act on the encoded information 782*b* stored in the beacon 781 thereby improving the operability of the device 100 and providing a better user experience. Providing the user with an option to act on the encoded information 782*b* stored in the beacon 781 enhances the operability of the device and makes the user-device interface more efficient (e.g., by reducing the need for a sequence of user inputs corresponding to manually effectuating an action indicated by the encoded information 782*b*) which, additionally, reduces power usage and improves battery life of the device by enabling the user to use the device more quickly and efficiently.

Figures 7E, 7F:
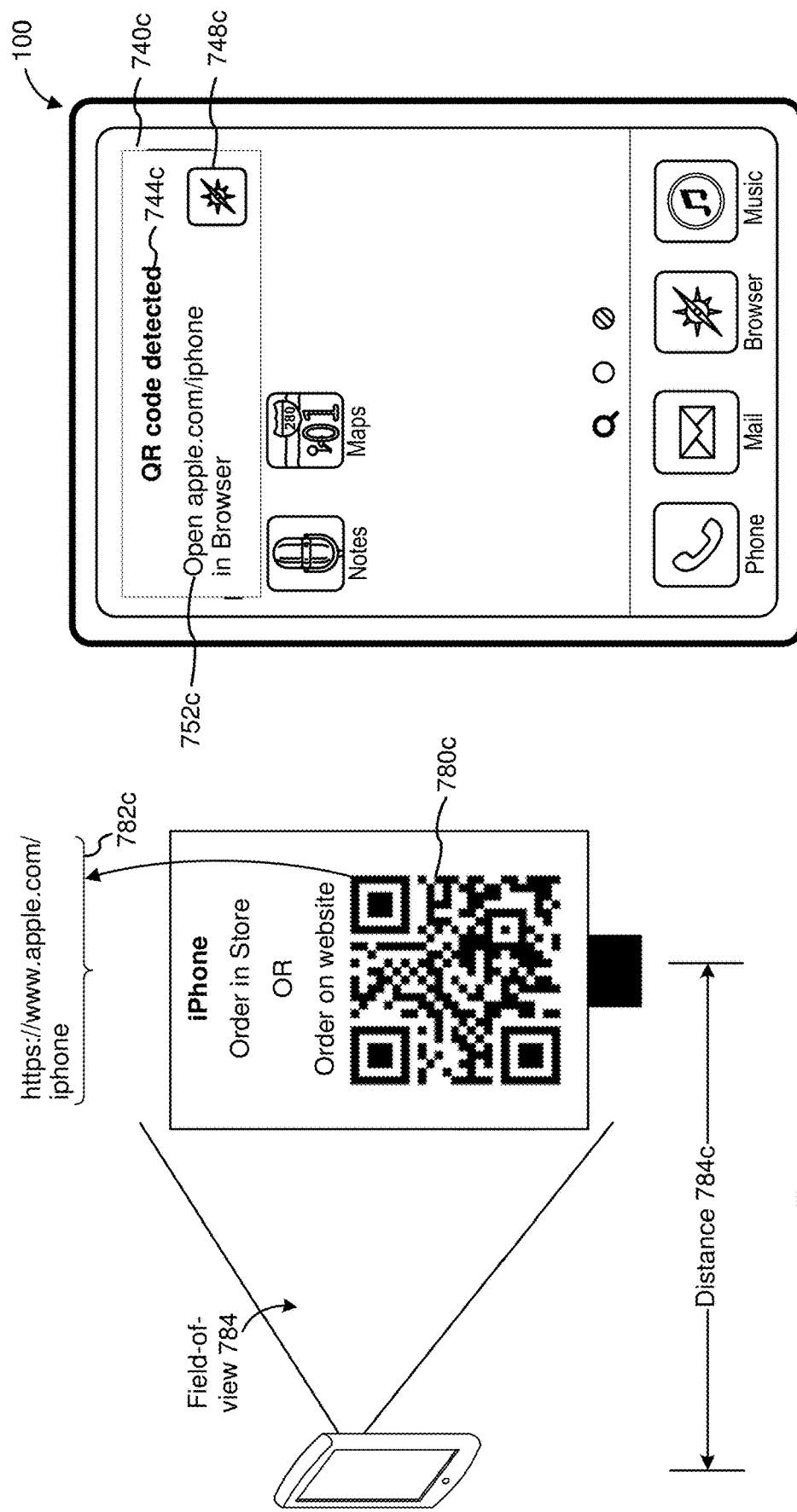

FIGS. 7E-7F illustrate a sequence in which the device 100 displays a notification indicating that the device is in proximity to a third type of encoded feature. In the example of FIG. 7E, the device 100 is in proximity of data encoded in an optical machine-readable format 780*c* ("encoded data 780*c*", hereinafter for the sake of brevity). As illustrated in FIG. 7E, the encoded data 780*c* includes encoded information 782*c*. In the example of FIG. 7E, the encoded information 782*c* includes a web address. In various embodiments, the encoded information 782*c* is actionable. In other words, in various embodiments, the device 100 can perform one or more operations based on the encoded information 782*c*. In some embodiments, the device 100 detects that the device 100 is in proximity of the encoded data 780*c* when the encoded data 780*c* is in a field of view 784 of a camera of the device 100. In some embodiments, the encoded data 780*c* is in the field of view 784 when a distance 784*c* between the device 100 and the encoded data 780*c* is less than a threshold 750*c*. In some embodiments, the threshold 750*c* is a function of the camera of the device 100. For example, the threshold 750*c* is based on a number of effective pixels in the camera and/or a zoom lens of the camera (e.g., more pixels and/or a higher zoom lens increase the threshold 750*c*).

As illustrated in FIG. 7F, in some embodiments, the device 100 displays a notification 740*c* in response to detecting that the device 100 is in proximity of the encoded data 780*c*. As described herein, the device 100 is in proximity of the encoded data 780*c* when the encoded data 780*c* is in the field of view 784. In some embodiments, the notification 740*c* includes an indication 744*c* indicating that the device 100 is in proximity of the encoded data 780*c*. In the example of FIG. 7F, the indication 744*c* includes a text string (e.g., QR code detected). In some examples, the indication 744*c* includes a symbol (e.g., a symbol for QR codes, for example, an image or a logo for QR codes). In some embodiments, the notification 740*c* includes an icon 748*c* for an application that can operate on the encoded information 782*c*. In other words, in some embodiments, the notification 740*c* includes the icon 748*c* for an application that can utilize the encoded information 782*c* to perform an operation. In the example of FIG. 7F, the notification 740*c* includes the icon 748*c* for a browser application (e.g., the browser module 147 shown in FIG. 3). In some embodiments, the notification 740*c* includes a descriptor 752*c* that indicates an operation that the user can perform by activating the notification 740*c*. Displaying the notification 740*c* in response to the device 100 being in proximity of the encoded data 780*c* (e.g., in response to the encoded data 780*c* being in the field of view 784) provides the user with an option to act on the encoded information 782*c* stored in the encoded data 780*c* thereby improving the operability of the device 100 and providing a better user experience. Providing the user with an option to act on the encoded information 782c enhances the operability of the device and makes the user-device interface more efficient (e.g., by reducing the need for a sequence of user inputs corresponding to manually effectuating an action indicated by the encoded information 782c) which, additionally, reduces power usage and improves battery life of the device by enabling the user to use the device more quickly and efficiently.

Figure 7G:
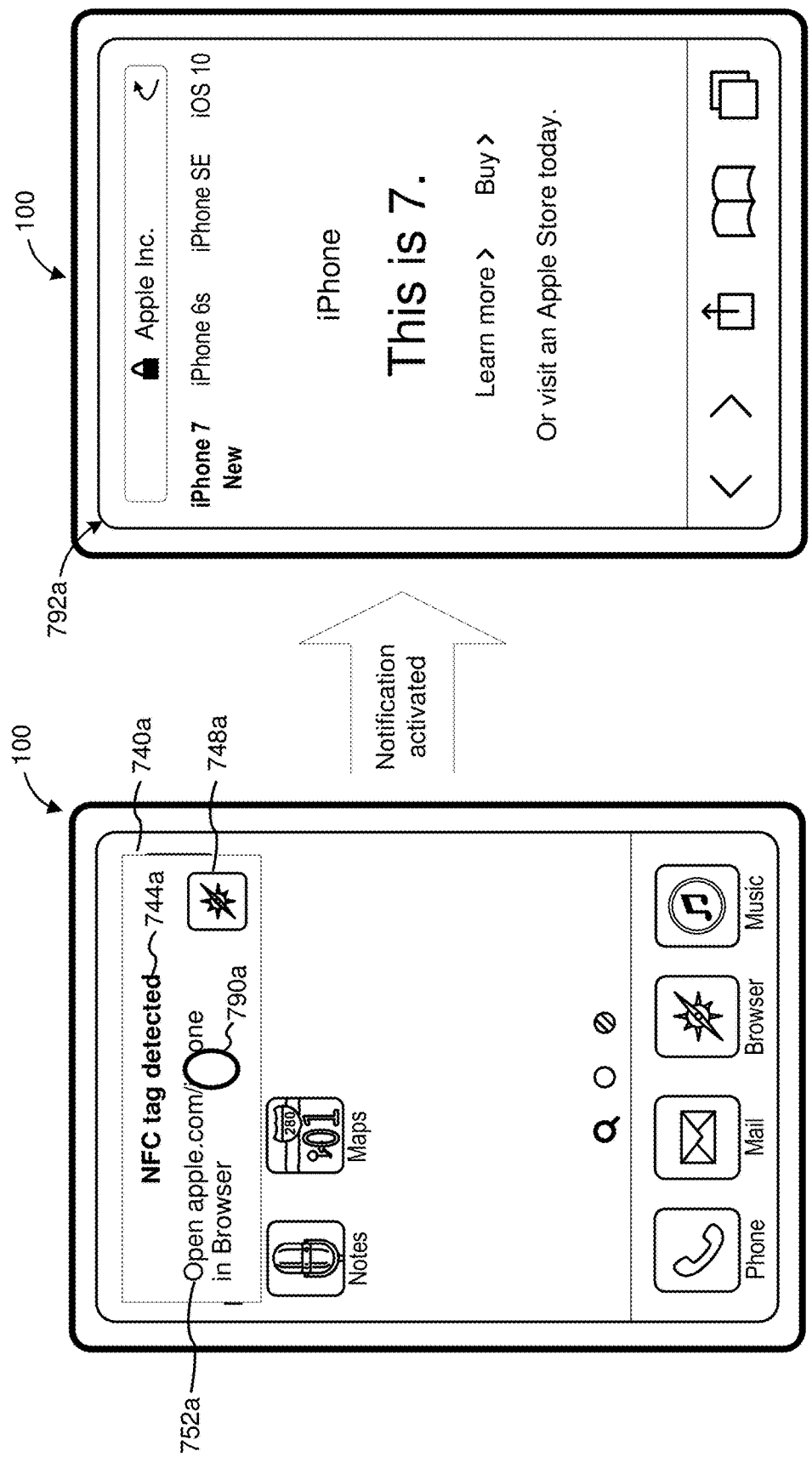

Referring to FIG. 7G, in some embodiments, the device 100 performs an operation in response to the notification 740a being activated. In the example of FIG. 7G, the device 100 receives a user input 790a activating the notification 740a. In some embodiments, the user input 790a includes a tap input at a location corresponding to the notification 740a. In response to receiving the user input 790a, the device 100 performs an operation associated with the encoded feature that triggered the notification 740a. In the example of FIG. 7G, the device 100 presents a browser user interface 792a that displays a web page indicated by the encoded feature (e.g., the device 100 displays a web page corresponding to the web address included in the encoded information 782a that was stored in the NFC tag 780a shown in FIG. 7A). Displaying the browser user interface 792a in response to the notification 740a being activated reduces the need for the user to provide a sequence of user inputs corresponding to manually launching the browser user interface 792a and manually entering the web address thereby improving the operability of the device 100 and providing a better user experience. Displaying the browser user interface 792a enhances the operability of the device and makes the user-device interface more efficient (e.g., by reducing the need for a sequence of user inputs corresponding to manually launching the browser user interface 792a and manually entering the web address into the browser user interface 792a) which, additionally, reduces power usage and improves battery life of the device by enabling the user to use the device more quickly and efficiently.

Figure 7H:
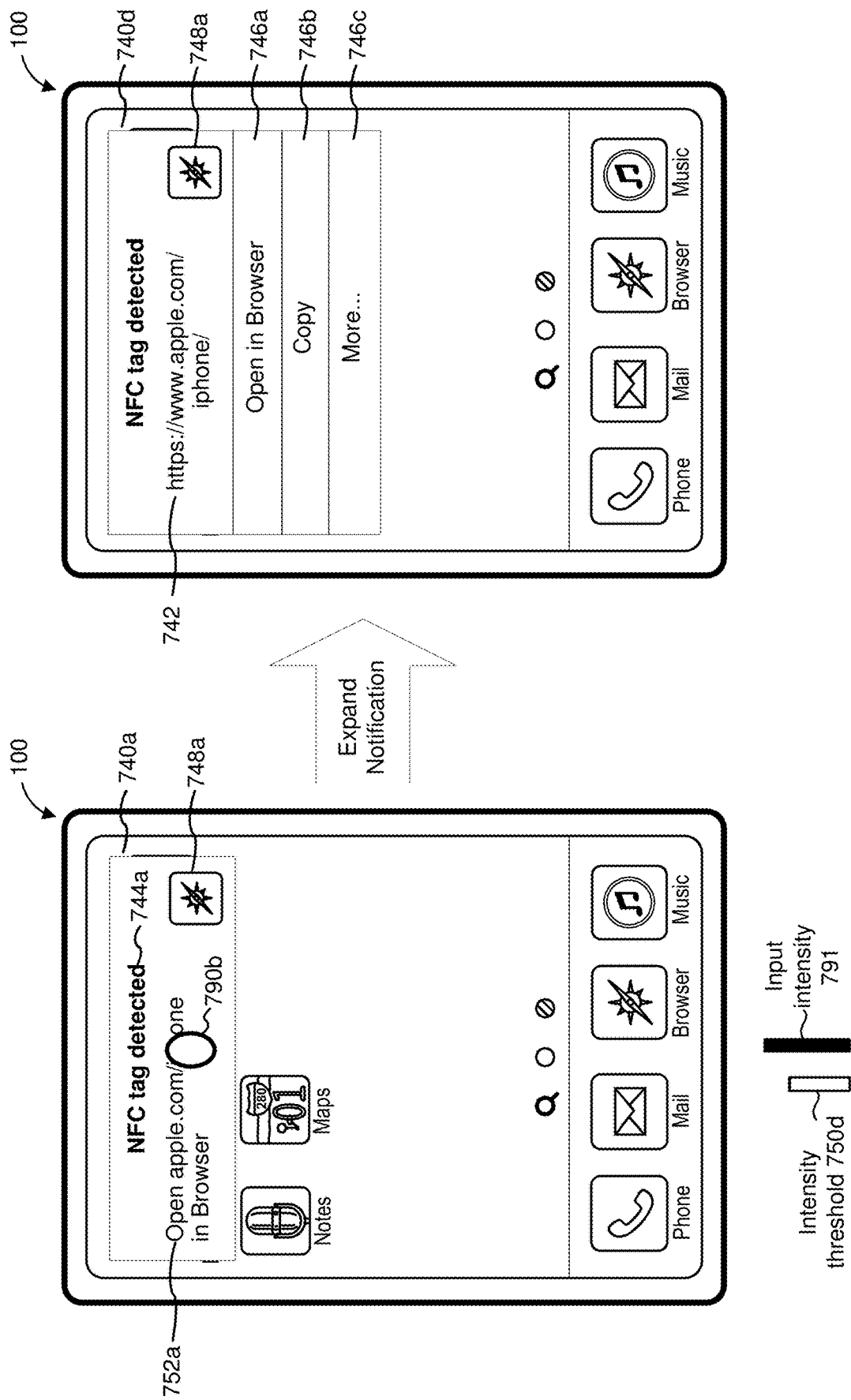

Referring to FIG. 7H, in some embodiments, the device 100 receives a user input 790b that corresponds to a request to expand the notification 740a. In response to receiving the user input 790b, the device 100 displays an expanded view 740d of the notification 740a. In some embodiments, the expanded view 740d includes the icon 748a, a web address 742 and affordances 746a, 746b and 746c. The affordances 746a, 746b and 746c, when activated, cause the device 100 to perform a respective operation in associated with the web address 742. For example, the affordance 746a, when activated, launches a browser interface (e.g., the browser user interface 792a shown in FIG. 7G) that displays a website corresponding to the web address 742. The affordance 746b, when activated, copies the web address 742, so that the web address 742 can be pasted elsewhere. The affordance 746c, when activated, displays additional affordances. In some embodiments, the user input 790b is associated with an input intensity 791. In some examples, the input intensity 791 is a function of an amount of force that the user applies at the location corresponding to the user input 790b. In some embodiments, the device 100 displays the expanded view 740d in response to the input intensity 791 being greater than an intensity threshold 750d. Expanding the notification 740a provides the user with additional options (e.g., options other than launching the browser interface 792a) thereby expanding the functionality of the device 100 and providing a better user experience. Providing the user with additional options enhances the operability of the device and makes the user-device interface more efficient (e.g., by reducing the need for a sequence of user inputs corresponding to manually effectuating operations associated with the additional options) which, additionally, reduces power usage and improves battery life of the device by enabling the user to use the device more quickly and efficiently.

Figure 7J:
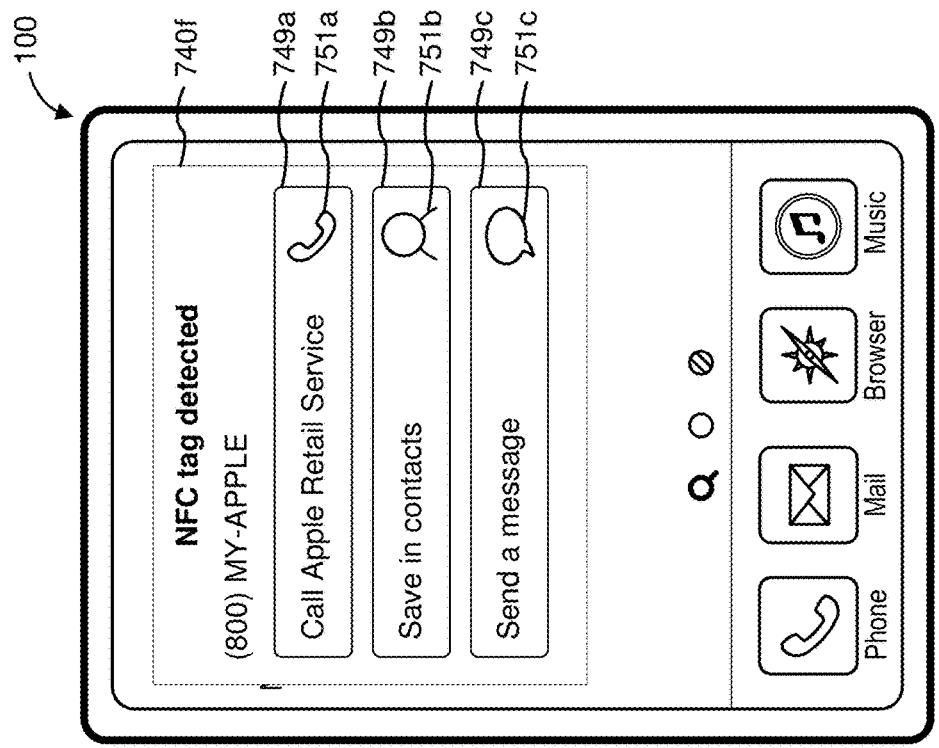
Figure 7I:
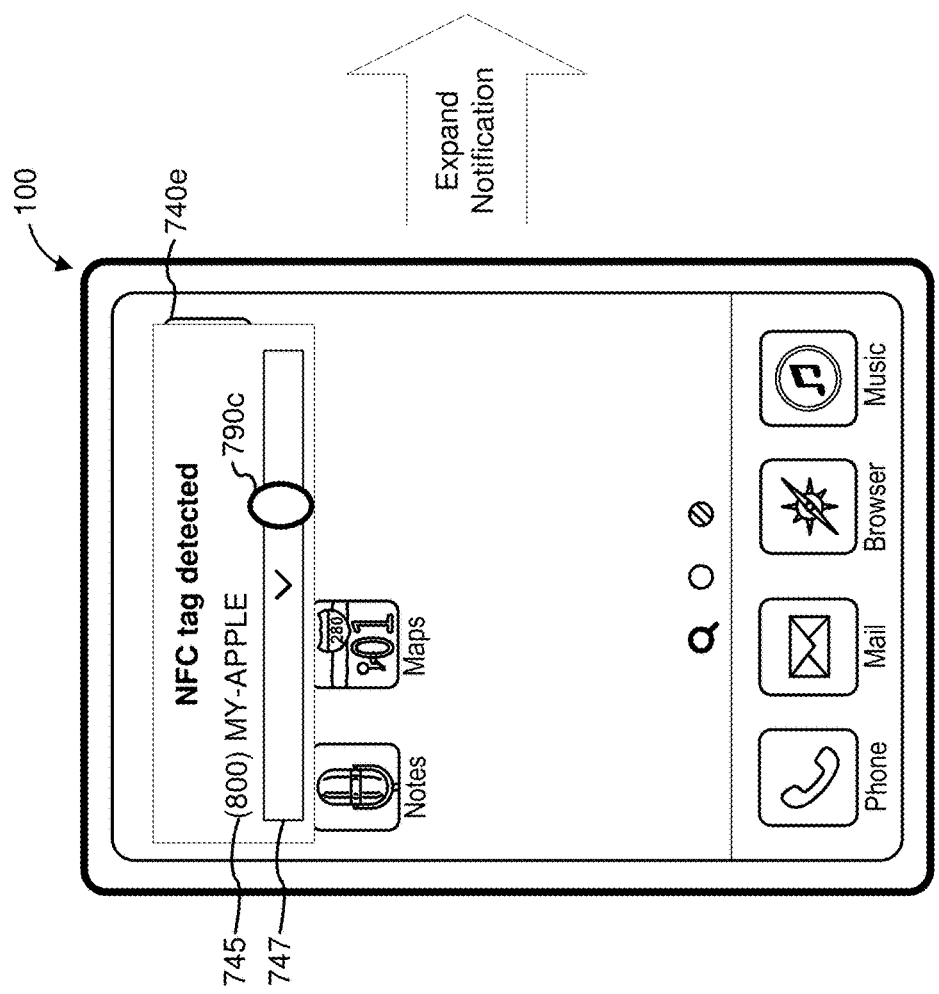

FIGS. 7I-7J illustrate a sequence in which the device 100 displays an expanded notification that includes various affordances for effectuating respective operations. FIG. 7I illustrates an example notification 740e. The notification 740e indicates that the device 100 is in proximity of an encoded feature (e.g., an NFC tag, for example, the NFC tag 780a shown in FIG. 7A). The notification 740e includes a phone number 745. In some examples, the encoded feature in proximity of the device 100 included encoded information that indicates the phone number 745. In the example of FIG. 7I, the notification 740e includes an affordance 747 that, when activated, expands the notification 740e. In the example of FIG. 7I, the device 100 receives a user input 790c selecting the affordance 747. As such, the receiving the user input 790c corresponds to a request to expand the notification 740e. Displaying the affordance 747 provides the user with an option to expand the notification 740e and view options to perform various operations.

Referring to FIG. 7J, in response to receiving the user input 790c, the device 100 displays an expanded view 740f of the notification 740e. The expanded view 740f displays options to perform various operations. In the example of FIG. 7J, the expanded view 740f includes a call affordance 749a, a contacts affordance 749b and a messaging affordance 749c. The call affordance 749a, when activated, causes a phone application to initiate a phone call to the phone number 745. The contacts affordance 749a, when activated, causes a contacts application to save the phone number 745 in an address book. The messaging affordance 749c, when activated, causes a messaging application to create a new message and populate the phone number 745 in an addressee field of the new message. The call affordance 749a includes a phone icon 751a to indicate that the call affordance 749a can initiate a phone call to the phone number 745. The contacts affordance 749b includes a contacts icon 751b to indicate that the contacts affordance 749b can effectuate the phone number 745 to be saved in an address book. The messaging affordance 749c includes a messaging icon 751c to indicate that the messaging affordance 749c can effectuate the messaging application to send a message to the phone number 745. Presenting the expanded view 740f allows the user to perform various operations associated with the phone number 745 without providing a sequence of user inputs corresponding to manually entering the phone number 745 thereby improving the operability of the device 100. Presenting the expanded view 740f enhances the operability of the device and makes the user-device interface more efficient (e.g., by reducing the need for a sequence of user inputs corresponding to manually entering the phone number 745 into the device) which, additionally, reduces power usage and improves battery life of the device by enabling the user to use the device more quickly and efficiently.

Figures 7K, 7L:
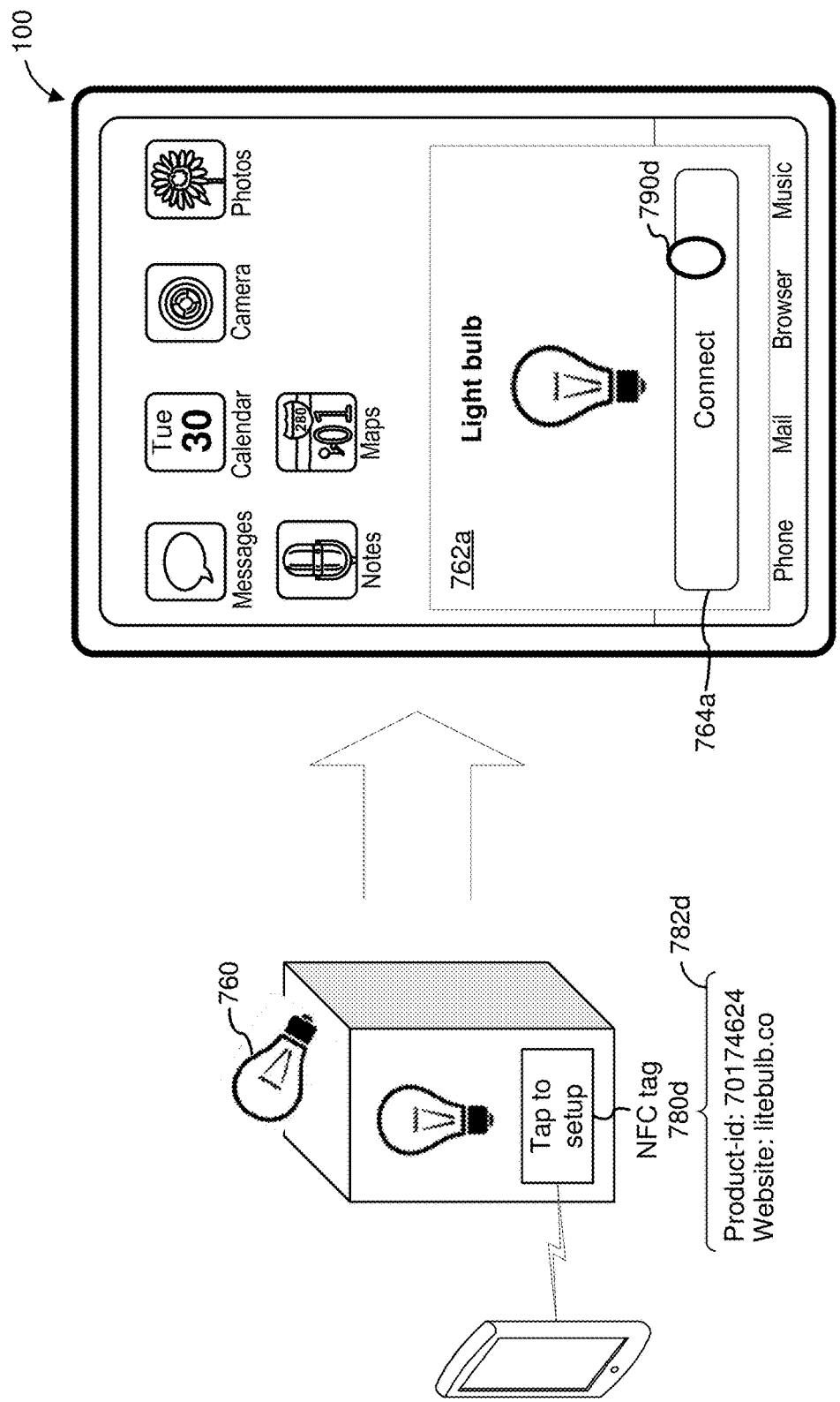
Figure 7M:
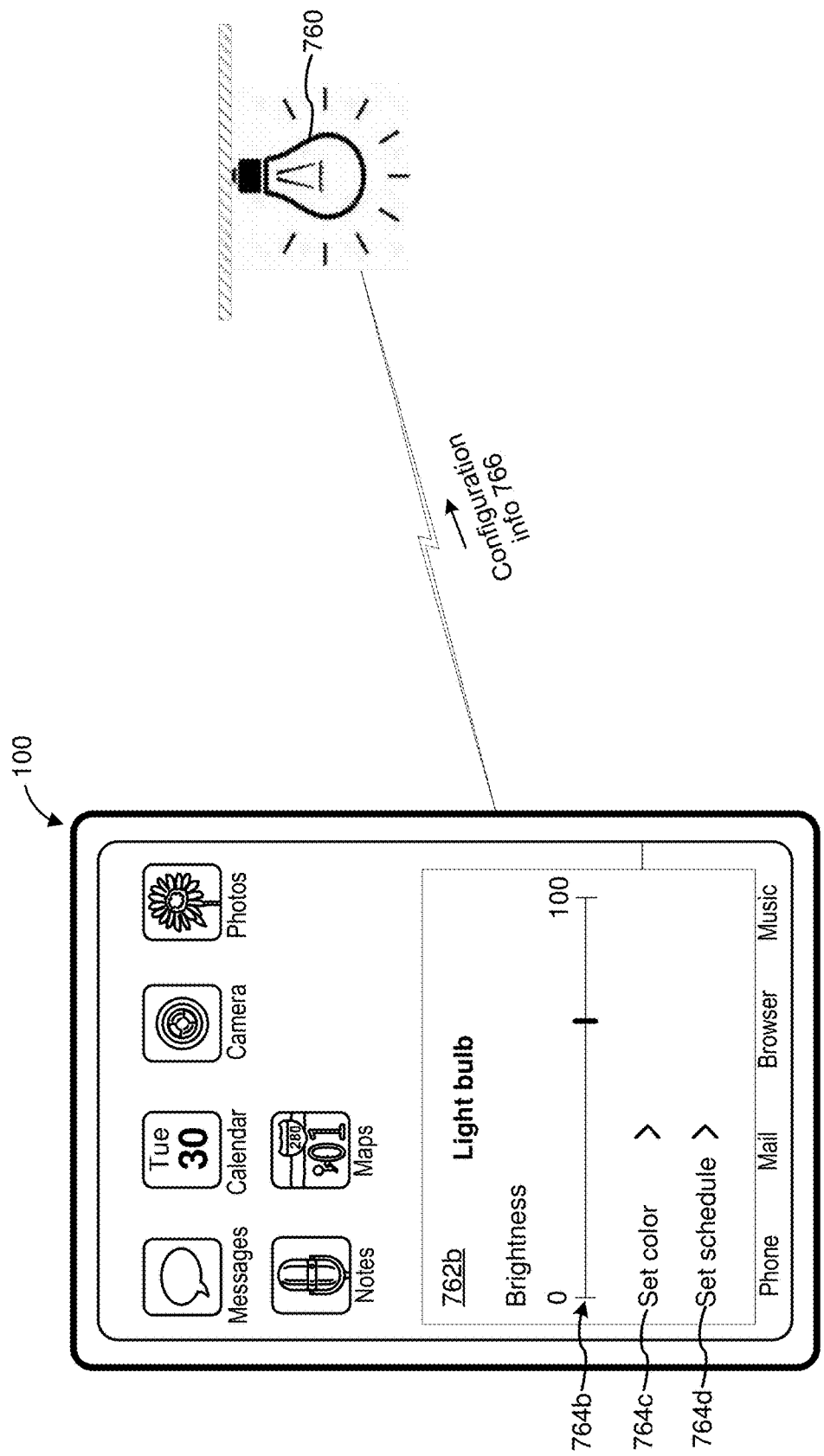

FIGS. 7K-7M illustrate a sequence in which the encoded feature is associated with an electronic device, and the device 100 displays a setup card 762a providing a guided setup to configure the electronic device. In some embodiments, the electronic device includes a light bulb 760, wireless headphones, or an electrical appliance such as a refrigerator, a stove, a microwave, a washer, a dryer, or the like. In some embodiments, the electronic device includes an infotainment system of an automobile. In the example of FIGS. 7K-7M, the electronic device includes a light bulb

760. As illustrated in FIG. 7K, the device 100 is in proximity of an NFC tag 780*d* that corresponds to the light bulb 760. The NFC tag 780*d* includes encoded information 782*d* about the light bulb 760. In the example of FIG. 7K, the encoded information 782*d* includes a product ID for the light bulb 760, and a website that corresponds to the light bulb 760.

As illustrated in FIG. 7L, in response to being in proximity of the NFC tag 780*d,* the device 100 displays a setup card 762*a*. In some embodiments, the setup card 762*a* allows the user to connect with the light bulb 760. In some embodiments, connecting with the light bulb 760 allows the device 100 to control the light bulb 760. For example, upon connecting with the light bulb 760, the device 100 can provide the user with options to turn OFF the light bulb 760, turn ON the light bulb 760, adjust a brightness of the light bulb 760, and/or change a color of a light being emitted by the light bulb 760. In the example of FIG. 7L the setup card 762*a* includes a connect affordance 764*a* for connecting with the light bulb 760. In the example of FIG. 7L, the device 100 receives a user input 790*d* selecting the connect affordance 764*a*. In response to receiving the user input 790*d,* the device 100 establishes a connection with the light bulb 760. In response to receiving the user input 790*d*, the device 100 provides the user with the option to remotely control the light bulb 760 thereby reducing the need for the user to physically go to a physical light bulb controller (e.g., a light bulb switch). Presenting the setup card 762*a* enhances the operability of the device (e.g., by expanding the functionality of the device).

Referring to FIG. 7M, in some embodiments, the device 100 displays a card 762*b* that allows the user to remotely control the light bulb 760. In some embodiments, the device 100 displays the card 762*b* after the device 100 has connected with the light bulb 760 (e.g., after receiving the user input 790*d* shown in FIG. 7L). In the example of FIG. 7M, the card 762*b* includes a brightness affordance 764*b,* a color affordance 764*c,* and a schedule affordance 764*d.* In the example of FIG. 7M, the brightness affordance 764*b* includes a slider that allows the user to adjust a brightness of the light bulb 760. The color affordance 764*c* allows the user to change a color of the light that the light bulb 760 emits (e.g., change the color from white to yellow, etc.). In some embodiments, the schedule affordance 764*d* allows the user to schedule when the light bulb 760 turns ON and/or turns OFF. As illustrated in FIG. 7M, the device 100 transmits configuration information 766 to the light bulb 760. In some embodiments, the configuration information 766 includes a brightness value for the light bulb 760, a color for the light being emitted by the light bulb 760, and/or a schedule for the light bulb 760.

Figure 7N:
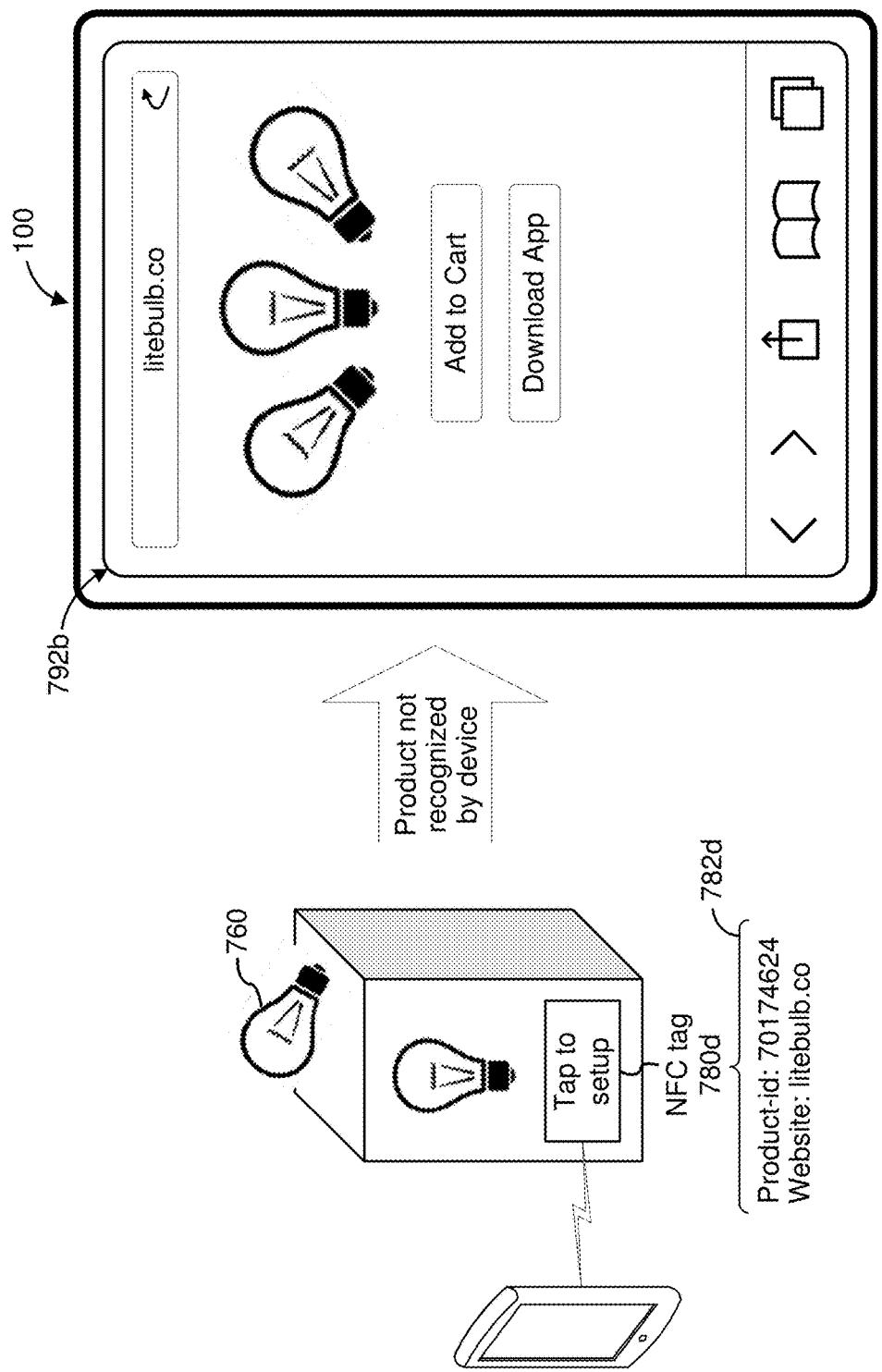
Figure 7P:
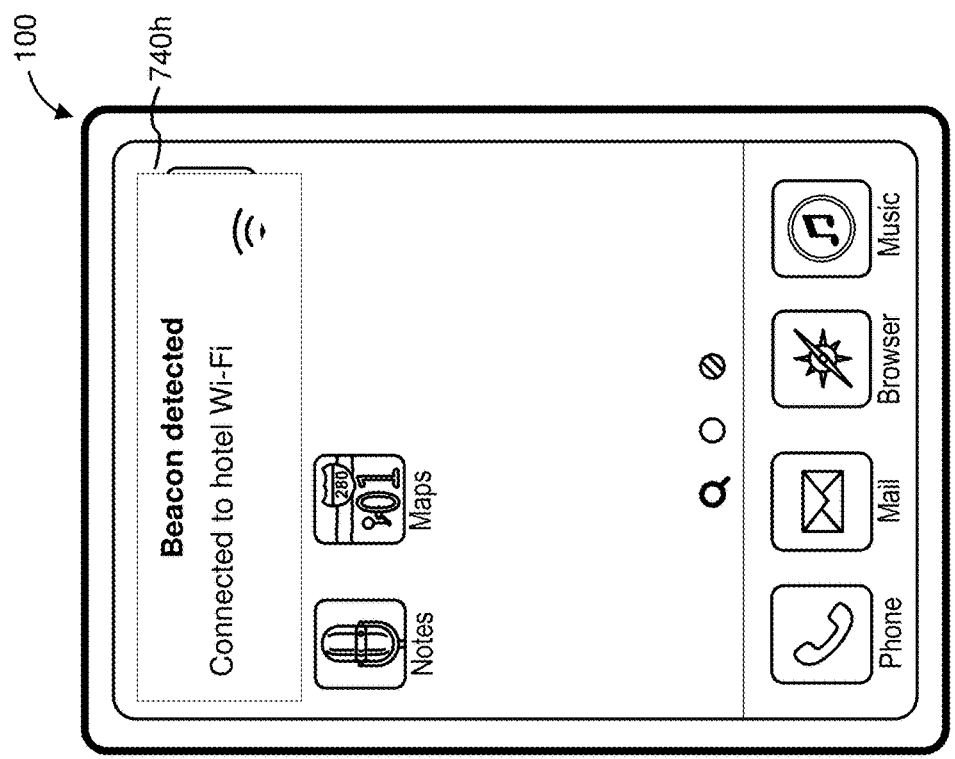

In some embodiments, the device 100 displays a setup card for an electronic device (e.g., the setup card 762*a* shown in FIG. 7K) in response to recognizing the electronic device (e.g., in response to recognizing the light bulb 760). In some embodiments, the device 100 displays a setup card for an electronic device (e.g., the setup card 762*a* shown in FIG. 7K) in response to the electronic device (e.g., the light bulb 760) and the device 100 being part of a shared ecosystem. In some embodiments, the electronic device and the device 100 are in the same ecosystem if the electronic device and the device 100 are operating (e.g., connected to) the same network (e.g., an infotainment system, a Wi-Fi network, etc.). In some embodiments, the device 100 forgoes display of the setup card in response to not recognizing the electronic device. In some embodiments, the device 100 forgoes display of the setup card in response to the electronic device and the device 100 not being part of a shared ecosystem. In the example of FIG. 7N, the device 100 forgoes display of the setup card, and the device 100 presents a browser user interface 792*b* that displays a web page corresponding to the light bulb 760. In the example of FIG. 7N, the device forgoes display of the setup card in response to the device 100 not recognizing the light bulb 760 (e.g., the product ID of the light bulb 760). In the example of FIG. 7N, the device forgoes display of the setup card in response to the device 100 and the light bulb 760 not being in the same ecosystem. Displaying setup cards for electronic devices that the device 100 recognizes allows the device 100 to present a different user experience for electronic devices that are in the same ecosystem as the device 100.

Figure 7O:
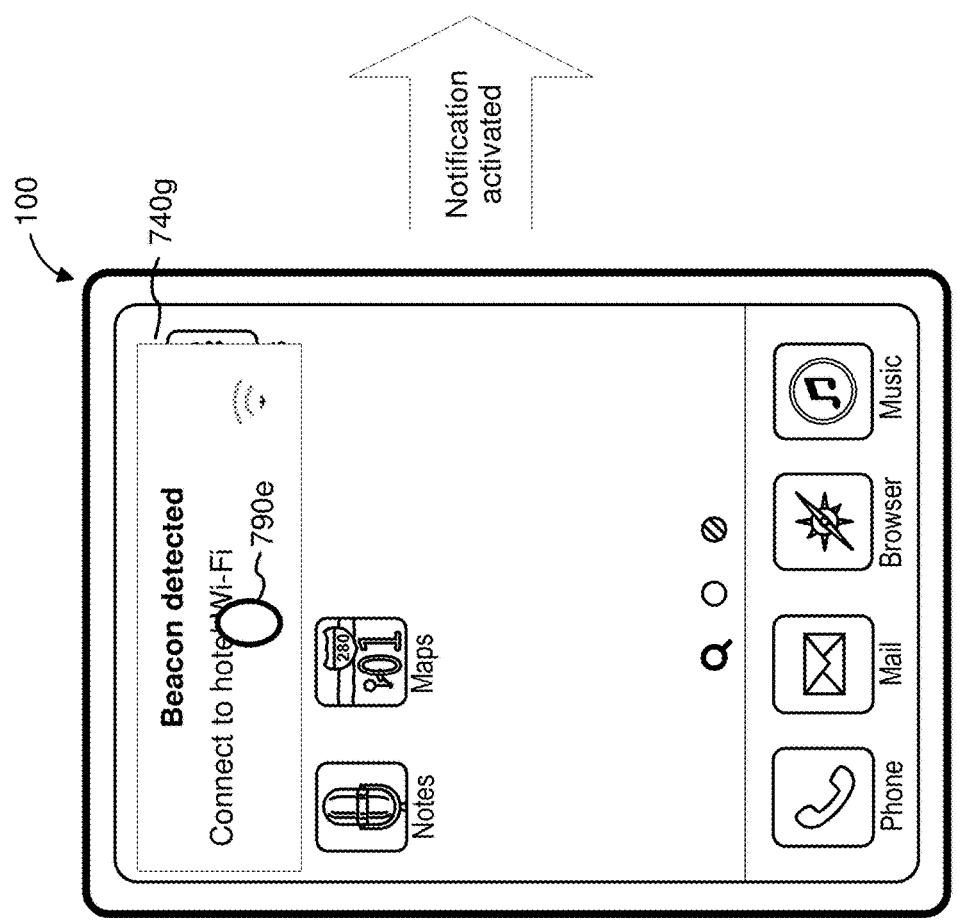

FIGS. 7O-7P illustrates a sequence in which the device 100 is in proximity of an encoded feature that allows the device 100 to connect to a network (e.g., a wireless network, for example, a Wi-Fi network such as a permissioned Wi-Fi network). In the example of FIG. 7O, the device 100 displays a notification 740*g* indicating that the device 100 is in proximity of an encoded feature (e.g., a beacon) that includes authentication information for a Wi-Fi network. As illustrated in FIG. 7O, the device 100 receives a user input 790*e* at a location corresponding to the notification 740*g*. In the example of FIG. 7O, the user input 790*e* corresponds to a request to connect to the Wi-Fi network. In response to receiving the user input 790*e*, the device triggers an automatic process for joining the Wi-Fi network and authenticating the device 100 with the Wi-Fi network. As illustrated in FIG. 7P, in some embodiments, the device 100 presents a notification 740*h* indicating that the device 100 has successfully connected to the Wi-Fi network. In some examples, the encoded feature includes authentication information (e.g., a password) for the Wi-Fi network. In such examples, during the process for joining the Wi-Fi network, the device 100 provides the authentication information to the network without requiring the user to provide a sequence of user inputs corresponding to manually entering the authentication information thereby improving the efficiency of the device 100 and providing a better user experience for the user. Providing the authentication information to the network enhances the operability of the device and makes the user-device interface more efficient (e.g., by reducing the need for a sequence of user inputs corresponding to manually entering the authentication information into the device in order to connect to the network) which, additionally, reduces power usage and improves battery life of the device by enabling the user to use the device more quickly and efficiently.

FIGS. 8A-8E illustrate a flow diagram of a method 800 of handling data encoded in an optical machine-readable format ("encoded data", hereinafter for the sake of brevity) in accordance with some embodiments. The method 800 is performed at an electronic device (e.g., the device 100 in FIG. 1A, or the device 300 in FIG. 3) with one or more processors, non-transitory memory, a display, and an input device. In some embodiments, the display is a touch-screen display and the input device is on or integrated with the display. In some embodiments, the display is separate from the input device. Some operations in method 800 are, optionally, combined and/or the order of some operations is, optionally, changed.

As described below, the method 800 provides an intuitive way to detect encoded data in a media capture preview of a media capture user interface. The method improves the operability of the device by notifying the user that the device has detected the encoded data within the media capture preview of the media capture user interface. For battery-operated electronic devices, detecting the encoded data reduces the need for the user to manually enter information corresponding to the encoded data into the device thereby conserving power and increasing the time between battery charges.

The device displays (802), on the display, a media capture user interface of a camera application that allows a user to capture media (e.g., the media capture user interface 504 shown in FIG. 5C). In some embodiments, the media capture user interface of the camera application includes a media capture preview of objects in a field of view of the camera that changes as the objects in the field of view of the camera change (e.g., the media capture preview 508 shown in FIG. 5C). In some embodiments, the media capture user interface includes a media capture affordance that, when activated, captures media that corresponds to the field of view of the camera (e.g., the media capture affordance 512 shown in FIG. 5C).

While displaying the media capture user interface of the camera, the device scans (804) the field of view of the camera for data encoded in an optical machine-readable format. Scanning the field of view for the data encoded in the optical machine-readable format while displaying the media capture user interface improves the efficiency of the device at detecting the data encoded in the optical machine-readable format. Moreover, scanning the field of view for the encoded data reduces the need for an explicit request to detect the encoded data. Furthermore, scanning the field of view for the encoded data while displaying the media capture user interface reduces the need to launch an application or a module that is dedicated to detecting the encoded data. Scanning the field of view for encoded data reduces the need to launch a separate application/module that detects encoded data thereby enhancing the operability of the device and making the user-device interface more efficient (e.g., by reducing the need for a sequence of user inputs corresponding to a request to launch an application and scan the encoded data with the application) which, additionally, reduces power usage and improves battery life of the device by enabling the user to use the device more quickly and efficiently.

In accordance with a determination that the field of view of the camera includes data encoded in the optical machine-readable format that meets respective notification criteria, the device displays (806) a notification that indicates that the camera application has detected data encoded in the optical machine-readable format (e.g., the notification 540 shown in FIG. 5D). As an example, in FIG. 5Q, the device 100 displays the notification 540 when the encoded data 516 occupies a second percentage 556d of the field of view that is greater than the threshold percentage 524c. Displaying the notification 540 provides the user with an option to act upon the encoded data 516 without requiring a sequence of user inputs that would typically be required to perform the action. Displaying the notification enhances the operability of the device and makes the user-device interface more efficient (e.g., by reducing the need for a sequence of user inputs corresponding to manually effectuating an action associated with the encoded data) which, additionally, reduces power usage and improves battery life of the device by enabling the user to use the device more quickly and efficiently.

In accordance with a determination that the field of view of the camera does not include data encoded in the optical machine-readable format that meets the respective notification criteria, the device maintains (808) display of the media capture user interface of the camera application without displaying the notification. As an example, in FIG. 5P, the device 100 maintains the display of the media capture user interface without displaying the notification when the encoded data 516 occupies a first percentage 556c of the field of view that is smaller than the threshold percentage 524c.

Referring to FIG. 8B, in some embodiments, while displaying the notification, the device receives (810) a user input that activates the media capture affordance (e.g., the user input 580a shown in FIG. 5E). In response to receiving the user input, the device removes the notification, captures media via the camera, and displays the captured media on the display. As an example, in the sequence illustrated in FIGS. 5E-5F, the device 100 removes the notification 540, captures the image 520, and displays the captured image 520 on the display. As such, displaying the notification does not restrict the ability to capture media through the media capture user interface. In other words, most of the functionality provided by the media capture user interface is still available while the notification is displayed.

In some embodiments, the optical machine-readable format includes (812) a barcode. In such embodiments, scanning the field of view includes scanning the field of view for the barcode. In some embodiments, the barcode includes (814) a one-dimensional barcode (e.g., the encoded data 516c shown in FIGS. 5V-5W). In such embodiments, scanning the field of view includes scanning the field of view for the one-dimensional barcode. In some embodiments, the barcode includes (816) a two-dimensional barcode (e.g., the encoded data 516 shown in FIGS. 5C-5K). In such embodiments, scanning the field of view includes scanning the field of view for the two-dimensional barcode. As such, the device is capable of identifying data encoded in a variety of different types of optical machine-readable formats.

Figure 8C:
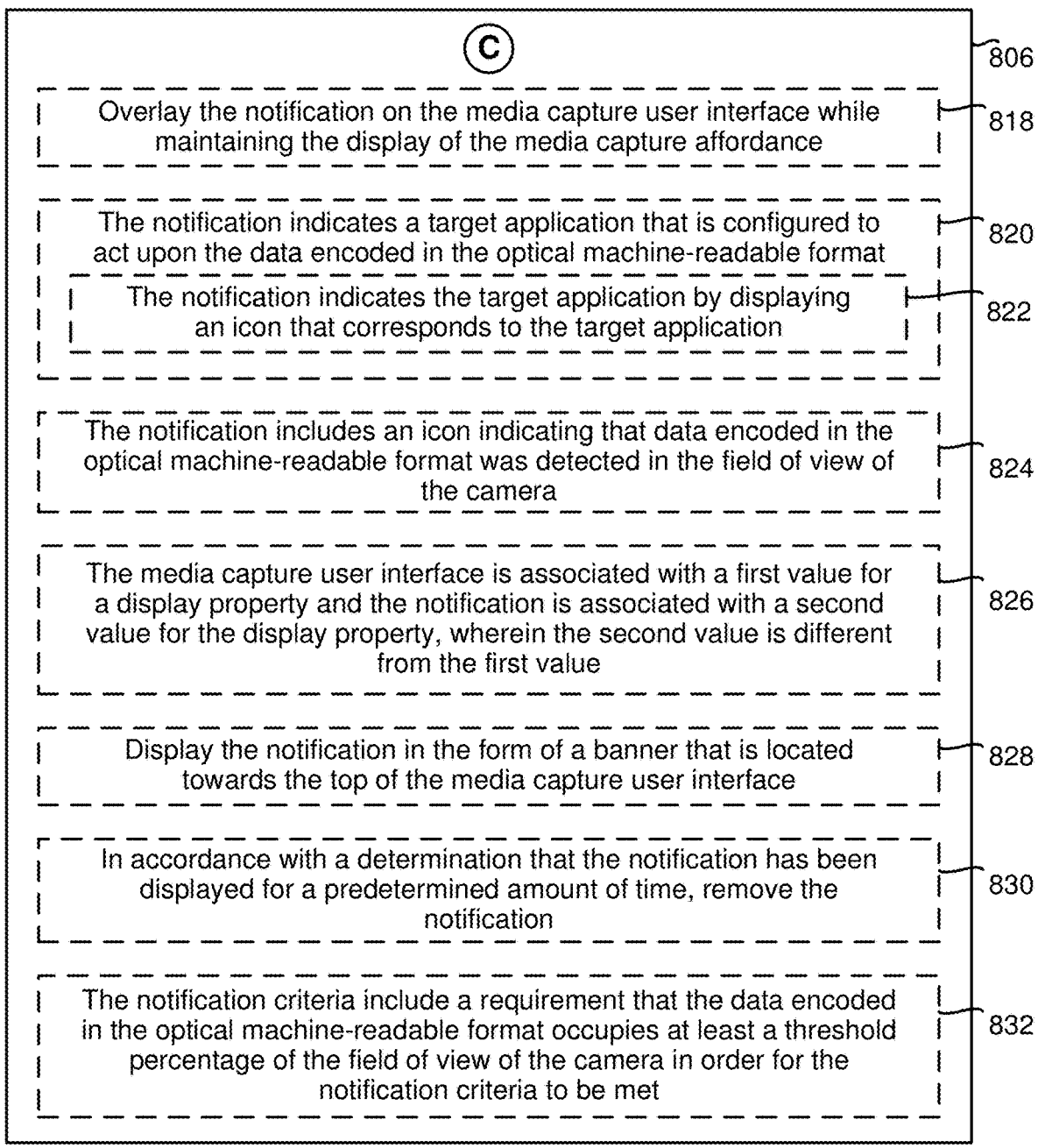

Referring to FIG. 8C, in some embodiments, the device overlays (818) the notification on the media capture user interface while maintaining the display of the media capture affordance. As an example, in FIG. 5D, the device 100 overlays the notification 540 on the media capture user interface 504 while maintaining the display of the media capture affordance 512. Maintaining the display of the media capture affordance allows the user to capture media while the notification is being display. Maintaining the display of the media capture affordance enhances the operability of the device and makes the user-device interface more efficient (e.g., by reducing the need for a subsequence user input corresponding to a request to display the media capture affordance) which, additionally, reduces power usage and improves battery life of the device by enabling the user to use the device more quickly and efficiently.

In some embodiments, the notification indicates (820) a target application that is configured to act upon the data encoded in the optical machine-readable format. In some embodiments, the notification indicates (822) the target application by displaying an icon that corresponds to the target application. As an example, in FIG. 5D, the notification 540 includes the icon 548 for a target application that can act upon the encoded data 516. Indicating the target application lets the user know that the data encoded in the optical machine-readable format is actionable.

The notification includes (824) an icon indicating that data encoded in the optical machine-readable format was detected in the field of view of the camera. In some embodiments, the icon indicates a type of the optical machine-readable format. For example, the icon indicates that the optical machine-readable format is a barcode (e.g., a 1-D barcode, or a 2-D barcode). Including the icon in the notification improves the visibility of the notification (e.g., by making the notification more recognizable). Including the icon in the notification indicates an application that is triggered when the notification is activated thereby enhancing the operability of the device and making the user-device interface more efficient (e.g., by reducing the need for a sequence of user inputs corresponding to navigating to a home screen that displays an icon for the application and launching the application by selecting the icon) which, additionally, reduces power usage and improves battery life of the device by enabling the user to use the device more quickly and efficiently.

The media capture user interface is associated (826) with a first value for a display property and the notification is associated with a second value for the display property, where the second value is different from the first value. In some embodiments, the display property includes a contrast setting, brightness level, a background color, a font type, or the like. Differing values for the media capture user interface and the notification improve the visibility of the notification.

In some embodiments, the device displays (828) the notification in the form of a banner that is located towards the top of the media capture user interface. As an example, in FIG. 5D, the device 100 displays the notification 540 in the form of a banner that is located towards the top of the media capture user interface 504. Displaying the notification in the form of a banner towards the top of the media capture user interface prevents the media capture affordance from being obstructed by the notification thereby allowing the user to capture media while the device displays the notification. Preventing obstruction of the media capture affordance enhances the operability of the device and makes the user-device interface more efficient (e.g., by reducing the need for a sequence of user inputs corresponding to a request to display the media capture affordance) which, additionally, reduces power usage and improves battery life of the device by enabling the user to use the device more quickly and efficiently.

In accordance with a determination that the notification has been displayed for a predetermined amount of time, the device removes (830) the notification. As an example, in FIGS. 5G-5H, the device 100 removes the notification 540 after the notification has been displayed for the threshold time duration 524*a*. Removing the notification provides the user with an unobstructed view of the media capture user interface thereby allowing the user to utilize the media capture user interface in its entirety.

The notification criteria includes (832) a requirement that the data encoded in the optical machine-readable format occupies at least a threshold percentage of the field of view of the camera in order for the notification criteria to be met. As an example, in FIG. 5Q, the device 100 displays the notification 540 when the encoded data 516 occupies a second percentage 556*d* of the field of view that is greater than the threshold percentage 524*c*. Forgoing display of the notification when the encoded data does not meet the notification criteria likely matches an intent of the user to not act upon the encoded data. For example, when the encoded data occupies less than the threshold percentage of the field of view, the presence of the encoded data is likely incidental and not purposeful.

Figure 8D:
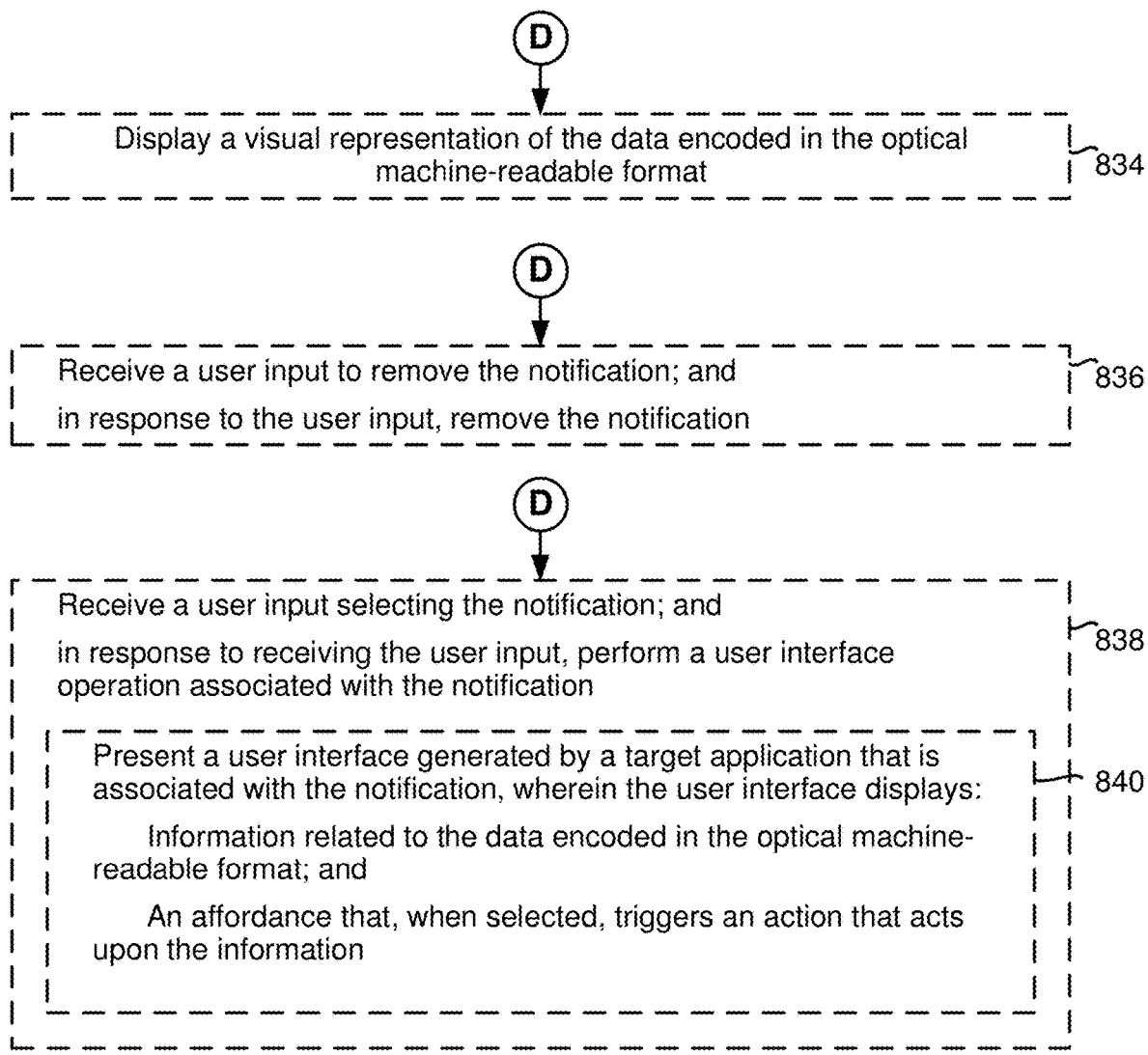

Referring to FIG. 8D, in some embodiments, the device displays (834) a visual representation of the data encoded in the optical machine-readable format. As an example, in FIG. 5D, the device 100 displays the descriptor 552 that visually represents the encoded data 516. Displaying the visual representation of the encoded data allows the user to decide whether to act upon the encoded data (e.g., whether to perform an operation, for example, whether to launch a web page indicated by the encoded data).

In some embodiments, the device receives (836) a user input to remove the notification, and in response to the user input, the device removes the notification. As an example, in FIG. 5I, the device 100 removes the notification 540 in response to receiving the user input 580*b*. Removing the notification allows the user to view and utilize the media capture user interface in its entirety.

In some embodiments, the device receives (838) a user input selecting the notification, and in response to receiving the user input, the device performs a user interface operation associated with the notification. As an example, in FIG. 5J, the device 100 receives the user input 580*c* selecting the notification 540, and the device 100 launches the browser interface 504*a* that displays a web site corresponding with the notification 540. Activating the notification triggers an action associated with the encoded data without requiring the user to provide a sequence of user inputs to perform the action thereby improving the efficiency of the device. Triggering an action associated with the encoded data enhances the operability of the device and makes the user-device interface more efficient (e.g., by reducing the need for a sequence of user inputs corresponding to manually effectuating the action associated with the encoded data) which, additionally, reduces power usage and improves battery life of the device by enabling the user to use the device more quickly and efficiently.

In some embodiments, the device presents (840) a user interface generated by a target application that is associated with the notification. In some embodiments, the user interface displays information related to the data encoded in the optical machine-readable format, and an affordance that, when selected, triggers an action that acts upon the information. As an example, in FIG. 5O, the device 100 presents the phone user interface 504*b* that displays the phone number 560. Presenting the user interface allows the user to act upon the information without providing a sequence of user inputs corresponding to manually launching the user interface. Presenting the user interface enhances the operability of the device and makes the user-device interface more efficient (e.g., by reducing the need for a sequence of user inputs corresponding to manually launching the user interface) which, additionally, reduces power usage and improves battery life of the device by enabling the user to use the device more quickly and efficiently.

Referring to FIG. 8E, in some embodiments, the device detects (842) a user input (e.g., the user input 580*d* shown in FIG. 5K). In response to detecting the user input and in accordance with a determination that the user input meets intensity criteria, the device displays an expanded view of the notification (e.g., the expanded view 540*a* shown in FIG. 5K). In some embodiments, intensity criteria includes a requirement that a characteristic intensity of the user input increase above a respective intensity threshold in order for the intensity criteria to be met. As an example, in FIG. 5K, the input intensity 556*b* is greater than the intensity threshold 524*b* thereby satisfying the intensity criteria. In accordance with a determination that the user input does not meet the intensity criteria, the device forgoes displaying the expanded view of the notification. Expanding the notification provides the user additional options (e.g., options other than activating the notification by tapping the notification) thereby improving the operability of the device and providing a better user experience.

In some embodiments, the device presents (844), a number of affordances within the notification (e.g., the call affordance 572a, the contacts affordance 572b and the messaging affordance 572c shown in FIG. 5M). Each affordance is associated with a respective user interface operation (e.g., the call affordance 572a, when activated, causes the device 100 to present the phone user interface 504b shown in FIG. 5O). In response to a selection of a first affordance of the plurality of affordances, the device performs the respective user interface operation associated with the first affordance (e.g., the device 100 presents the phone user interface 504b in response to receiving the user input 580f shown in FIG. 5N). Presenting affordances that, when activated, trigger different user interface operations reduces the need for a sequence of user inputs corresponding to manually trigger the user interface operations thereby improving the efficiency of the device and providing a better user experience. Presenting affordances that trigger different user interface operations enhances the operability of the device and makes the user-device interface more efficient (e.g., by reducing the need for a sequence of user inputs corresponding to manually effectuating the user interface operations) which, additionally, reduces power usage and improves battery life of the device by enabling the user to use the device more quickly and efficiently.

In some embodiments, the device receives (846) a user input selecting the notification. In response to receiving the user input, the device connects with a network using the authentication information included in the data encoded in the optical machine-readable format. As an example, in FIGS. 5T-5U, the device 100 connects to a network in response to receiving the user input 580g. The notification allows the user to connect to the network without providing a sequence of user inputs that correspond to manually entering the authentication information for the network thereby improving the efficiency of the device and improving the user experience. Connecting to the network enhances the operability of the device and makes the user-device interface more efficient (e.g., by reducing the need for a sequence of user inputs corresponding to manually entering authentication information for the network into the device) which, additionally, reduces power usage and improves battery life of the device by enabling the user to use the device more quickly and efficiently.

It should be understood that the particular order in which the operations in FIGS. 8A-8E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900 and 1000) are also applicable in an analogous manner to method 800 described above with respect to FIGS. 8A-8E. For example, the user interfaces, user interface elements, camera application, data encoded in an optical machine-readable format, notifications, notification criteria etc., described above with reference to method 800 optionally have one or more of the characteristics of the user interfaces, user interface elements, camera application, data encoded in an optical machine-readable format, notifications, notification criteria, etc. described herein with reference to other methods described herein (e.g., methods 900 and 1000). For brevity, these details are not repeated here.

The operations in the information processing methods described above are, optionally implemented by running one or more functional modules in information processing apparatus such as general purpose processors (e.g., as described above with respect to FIGS. 1A and 3) or application-specific chips. The operations described above with reference to FIGS. 8A-8E are, optionally, implemented by components depicted in FIGS. 1A-1B, or FIG. 3. For example, the scan operation 804 is, optionally, implemented by event sorter 170, event recognizer 180, and event handler 190. Event monitor 171 in event sorter 170 detects data encoded in an optical machine-readable format on a touch-sensitive display 112, and event dispatcher module 174 delivers the event information to application 136-1. A respective event recognizer 180 of application 136-1 compares the event information to respective event definitions 186, and determines whether the data encoded in the optical machine-readable format corresponds to a predefined event or sub-event, such as meeting respective notification criteria. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 9A-9D illustrate a flow diagram of a method 900 of handling images that include data encoded in an optical machine-readable format ("encoded data", hereinafter for the sake of brevity) in accordance with some embodiments. The method 900 is performed at an electronic device (e.g., the device 100 in FIG. 1A, or the device 300 in FIG. 3) with one or more processors, non-transitory memory, a display, and an input device. In some embodiments, the display is a touch-screen display and the input device is on or integrated with the display. In some embodiments, the display is separate from the input device. Some operations in method 900 are, optionally, combined and/or the order of some operations is, optionally, changed.

As described below, the method 900 provides an intuitive way to handle encoded data detected in an image. The method improves the operability of the device by displaying information corresponding to the encoded data in response to receiving a request to display additional information corresponding to the image. For battery-operated electronic devices, displaying information corresponding to the encoded data reduces the need for the user to manually enter the information corresponding to the encoded data into the device thereby conserving power and increasing the time between battery charges.

The device displays (902), on the display, an image. As an example, in FIG. 6C, the device 100 displays the image 608a. In some embodiments, the image is stored in the non-transitory memory. As such, in some embodiments, the device 100 retrieves the image from the non-transitory memory.

While displaying the image, the device receives (904) an input indicative of a request for additional information corresponding to the image (e.g., the user input 680b shown in FIG. 6C).

In response to receiving the request for additional information corresponding to the image and in accordance with a determination that the image includes data encoded in an optical machine-readable format that meets respective threshold criteria, the device displays (906) information corresponding to the data encoded in the optical machine-readable format. As an example, in FIG. 6D, the device 100 displays the information 620 in response to receiving the user input 680b. Displaying the information corresponding to the encoded data allows the user to view the information thereby providing a better user experience. Displaying the information corresponding to the encoded data enhances the operability of the device and makes the user-device interface more efficient (e.g., by reducing the need for a sequence of user inputs corresponding to requesting the information from another source) which, additionally, reduces power usage and improves battery life of the device by enabling the user to use the device more quickly and efficiently.

In accordance with a determination that the image does not include data encoded in the optical machine-readable format that meets respective threshold criteria, the device displays (908) additional information about the image without displaying information corresponding to data encoded in the optical machine-readable format. As an example, in FIG. 6G, the device 100 displays additional information 610 about the image 608b. Displaying the additional information allows the user to learn more about the image thereby providing a better user experience.

Figure 9B:
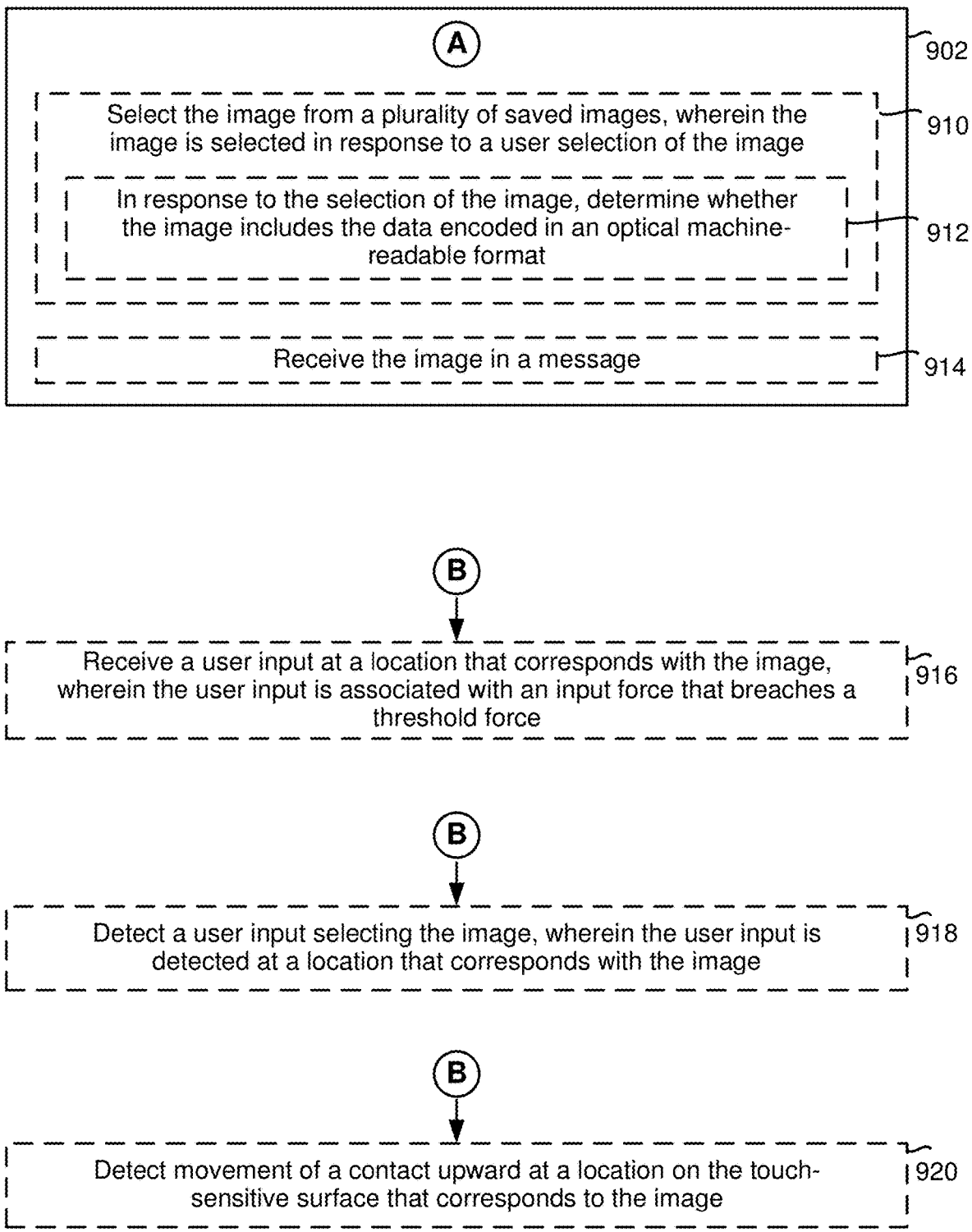

Referring to FIG. 9B, in some embodiments, the device selects (910) the image from a plurality of saved images, where the image is selected in response to a user selection of the image. As an example, in FIG. 6B, the device 100 selects the image 608a in response to the user input 680a.

In response to the selection of the image, the device determines (912) whether the image includes the data encoded in an optical machine-readable format. As an example, in FIG. 6C, the device 100 determines whether the image 608a includes the encoded data 616. Determining whether the image includes the encoded data improves the efficiency of the device by reducing the need for an explicit request to detect the encoded data thereby providing a better user experience. Determining whether the image includes the encoded data enhances the operability of the device and makes the user-device interface more efficient (e.g., by reducing the need for a subsequent user input corresponding to a request to detect the encoded data in the image) which, additionally, reduces power usage and improves battery life of the device by enabling the user to use the device more quickly and efficiently.

In some embodiments, the device receives (914) the image in a message. As an example, in FIG. 6O, the device 100 receives the image 608a via a message.

In some embodiments, the device receives (916) a user input at a location that corresponds with the image, where the user input is associated with an input intensity that increases above a threshold intensity. As an example, in FIG. 6O, the device 100 receives the user input 680j at a location corresponding with the image 608a.

In some embodiments, the device detects (918) a user input selecting the image, where the user input is detected at a location that corresponds with the image. In some embodiments, the device detects (920) movement of a contact upward at a location on the touch-sensitive surface that corresponds to the image. As an example, in FIG. 6C, the device 100 detects the user input 680b.

Figure 9C:
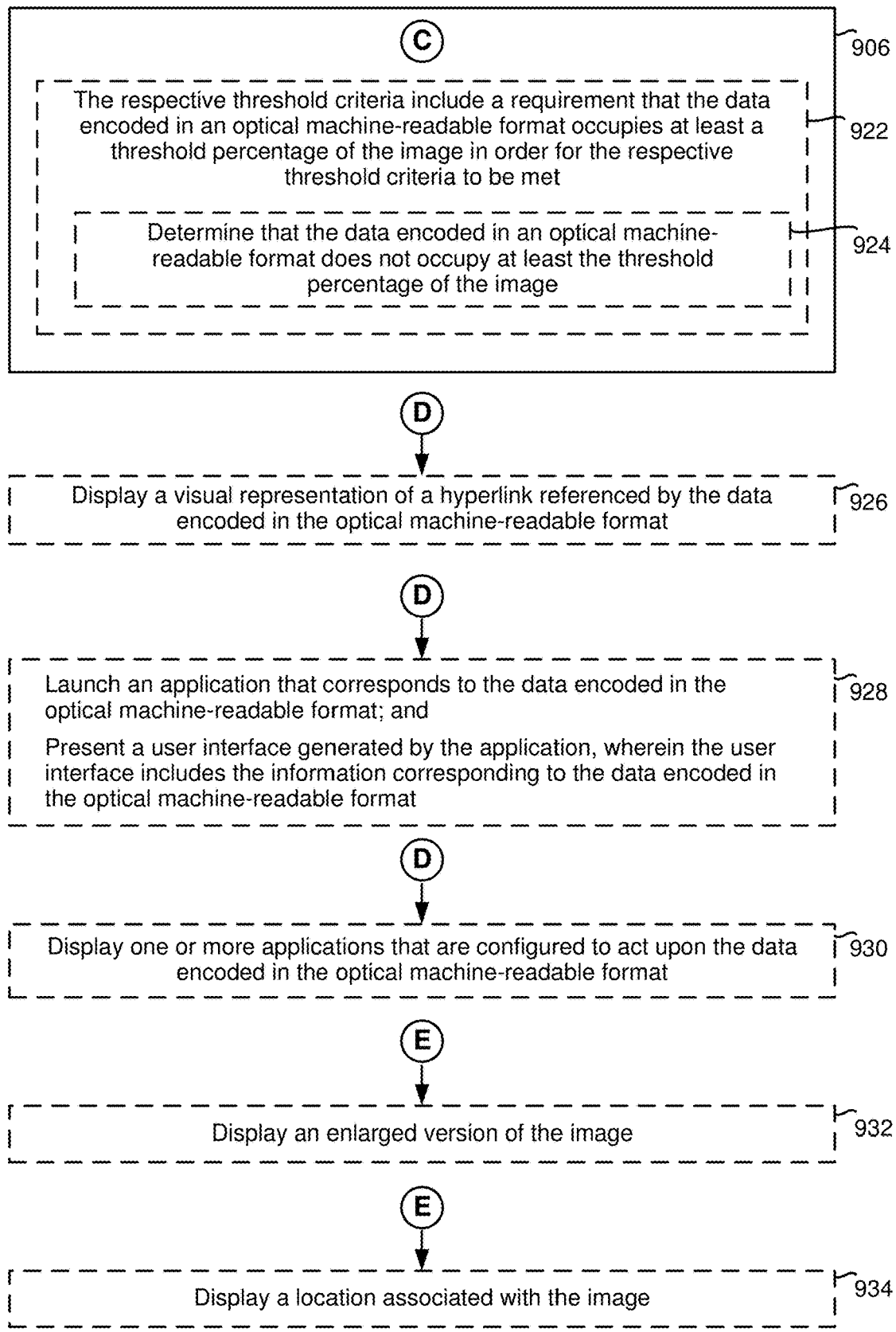

Referring to FIG. 9C, in some embodiments, the respective threshold criteria includes (922) a requirement that the data encoded in an optical machine-readable format occupies at least a threshold percentage of the image in order for the respective threshold criteria to be met. As an example, in FIG. 6Q, the device 100 determines that the encoded data 616 occupies a percentage 682b that is greater than the threshold percentage 650b. As such, in the example of FIG. 6Q, the threshold criteria is met. In some embodiments, the device determines (924) that the data encoded in an optical machine-readable format does not occupy at least the threshold percentage of the image. As an example, in FIG. 6R, the device 100 determines that the encoded data 616 occupies a percentage 682c that is less than the threshold percentage 650b. As such, in the example of FIG. 6R, the threshold criteria is not met.

In some embodiments, the device displays (926) a visual representation of a hyperlink referenced by the data encoded in the optical machine-readable format. As an example, in FIG. 6M, the device 100 displays the first browser affordance 638d that, when activated, launches the browser user interface 604d. Presenting the visual representation of the hyperlink allows the user to view a web page corresponding with the hyperlink without requiring a sequence of user inputs that corresponds to manually launching the browser user interface 604d and entering the hyperlink in the browser user interface 604d. Displaying the visual representation of the hyperlink enhances the operability of the device and makes the user-device interface more efficient (e.g., by indicating to the user that there is no need for a sequence of user inputs corresponding to manually entering the web address associated with hyperlink into the device) which, additionally, reduces power usage and improves battery life of the device by enabling the user to use the device more quickly and efficiently.

In some embodiments, the device launches (928) an application that corresponds to the data encoded in the optical machine-readable format, and presents a user interface generated by the application that includes the information corresponding to the data encoded in the optical machine-readable format. As an example, in FIGS. 6M-6N, the device 100 launches the browser user interface 604d generated by the browser application, and the browser user interface 604d displays information corresponding to the encoded data 616a (e.g., the browser user interface 604d displays information about bikes that are on sale). Displaying the user interface eliminates the need for the user to provide a sequence of user inputs corresponding to manually launching the user interface thereby improving an operability of the device and providing a better user experience. Displaying the user interface enhances the operability of the device and makes the user-device interface more efficient (e.g., by reducing the need for a sequence of user inputs corresponding to manually navigating to the user interface) which, additionally, reduces power usage and improves battery life of the device by enabling the user to use the device more quickly and efficiently.

In some embodiments, the device displays (930) one or more applications that are configured to act upon the data encoded in the optical machine-readable format. As an example, in FIGS. 6J-6L, the device 100 displays the phone user interface 604a, the contacts user interface 604b, or the messaging user interface 604c. Displaying the application(s) allows the user to perform a respective operation associated with the data encoded in the optical machine-readable format.

In some embodiments, the device displays (932) an enlarged version of the image. In some embodiments, the device displays (934) a location associated with the image. As an example, in FIG. 6G, the device 100 displays additional information 610 about that image 608b that includes location information associated with the image 608b. Displaying the location information allows the user to learn more about the image thereby providing a better user experience.

Figure 9D:
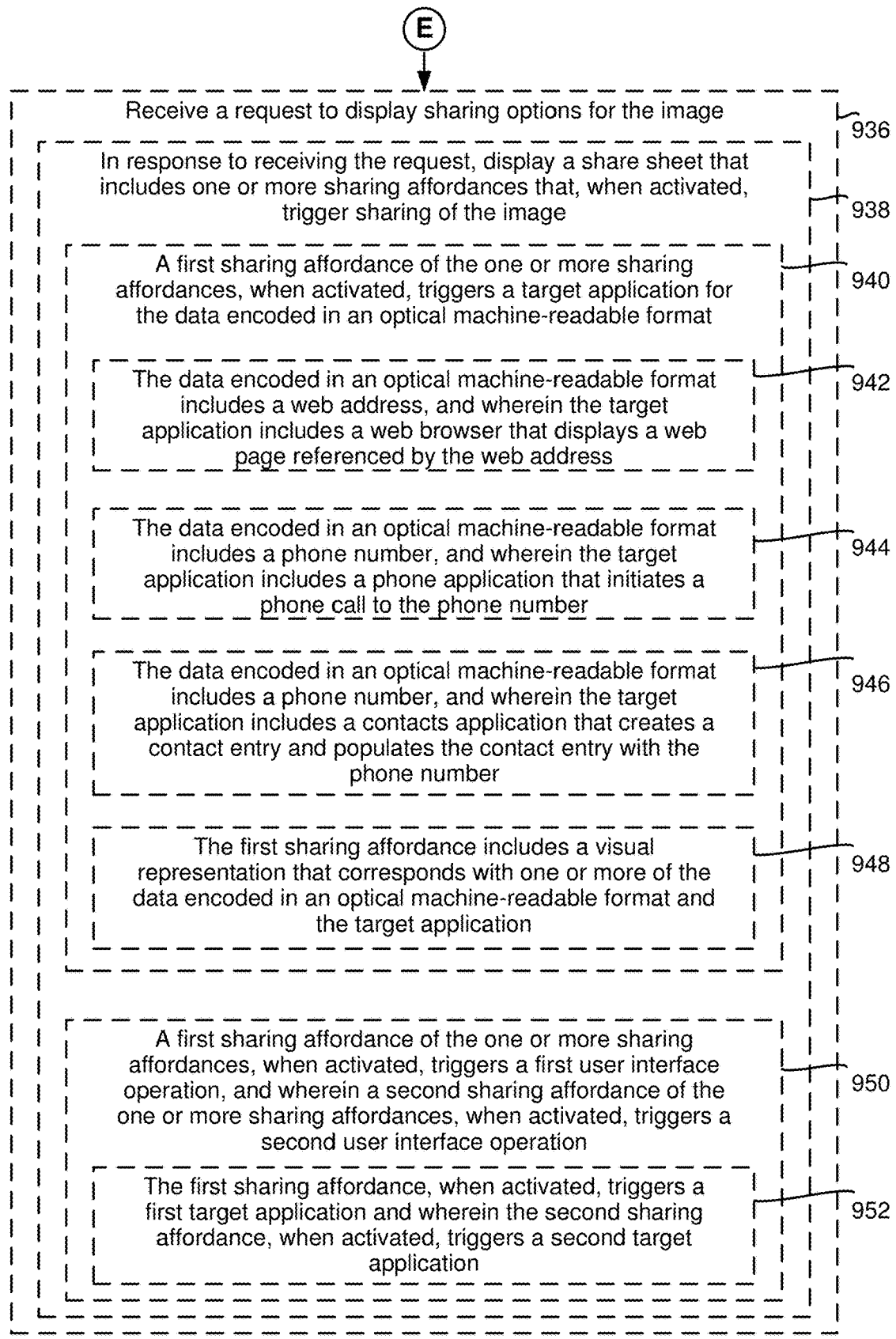

Referring to FIG. 9D, in some embodiments, the device receives (936) a request to display sharing options for the image. As an example, in FIG. 6H, the device 100 receives the user input 680e selecting the share affordance 630. In response to receiving the request, the device displays (938) a share sheet (e.g., the share sheet 632 shown in FIG. 6I) that includes one or more sharing affordances that, when activated, trigger sharing of the image.

In some embodiments, a first sharing affordance of the one or more sharing affordances, when activated, triggers (940) a target application for the data encoded in an optical machine-readable format. As an example, in FIG. 6J, the call affordance 638a, when activated, causes the phone application to initiate phone call to a phone number indicated by the encoded data. Displaying the first sharing affordance allows the user to perform an operation associated with the encoded data thereby improving the operability of the device and providing a better user experience. Allowing the user to perform an operation associated with the encoded data enhances the operability of the device and makes the user-device interface more efficient (e.g., by reducing the need for a sequence of user inputs corresponding to manually configuring the device to perform the operation) which, additionally, reduces power usage and improves battery life of the device by enabling the user to use the device more quickly and efficiently.

In some embodiments, the data encoded in an optical machine-readable format includes (942) a web address, and the target application includes a web browser that displays a web page referenced by the web address. As an example, in FIGS. 6M-6N, the encoded data 616a includes a web address, and the device presents a browser user interface 604d that displays a website corresponding to the web address. Displaying the web page eliminates the need for the user to provide a sequence of user inputs corresponding to manually launching the browser user interface and entering the web address thereby improving an operability of the device and providing a better user experience.

In some embodiments, the data encoded in an optical machine-readable format includes (944) a phone number, and the target application includes a phone application that initiates a phone call to the phone number. As an example, in FIG. 6J, the encoded data 616 includes a phone number 621 and the device 100 presents a phone user interface 604a that initiates a phone call to the phone number 621. Initiating the phone call to the phone number eliminates the need for the user to manually launch the phone user interface and provide a sequence of user inputs corresponding to entering the phone number thereby providing a better user experience.

In some embodiments, the data encoded in an optical machine-readable format includes (946) a phone number, and the target application includes a contacts application that creates a contact entry and populates the contact entry with the phone number. As an example, in FIG. 6K, the encoded data 616 includes a phone number 621 and the device presents a contacts user interface 604b that creates a contact entry and populates the contact entry with the phone number 621. Generating the new contact entry and populating the phone number in the phone number field of the contact entry eliminates the need for the user to manually launch the contacts user interface and provide a sequence of user inputs corresponding to entering the phone number in the phone number field thereby providing a better user experience.

In some embodiments, the first sharing affordance includes (948) a visual representation that corresponds with one or more of the data encoded in an optical machine-readable format and the target application. As an example, in FIGS. 6I-6L, the call affordance 638a, the contacts affordance 638b and the messaging affordance 638c include a smaller version of the encoded data 616. Including a visual representation of the encoded data in the sharing affordance indicates that the sharing affordance triggers an operation associated with the encoded data. Triggering an operation associated with the encoded data enhances the operability of the device and makes the user-device interface more efficient (e.g., by reducing the need for a sequence of user inputs corresponding to manually effectuating the operation) which, additionally, reduces power usage and improves battery life of the device by enabling the user to use the device more quickly and efficiently.

In some embodiments, a first sharing affordance of the one or more sharing affordances, when activated, triggers (950) a first user interface operation, and a second sharing affordance of the one or more sharing affordances, when activated, triggers a second user interface operation. As an example, in FIGS. 6J-6K, the call affordance 638a triggers the phone application to initiate a phone call to the phone number 621 indicated by the encoded data 616, and the contacts affordance 638b triggers the contacts application to create a new contact entry for the phone number 621 indicated by the encoded data 616. In some embodiments, the first sharing affordance, when activated, triggers (952) a first target application (e.g., a phone application, as illustrated in FIG. 6J) and the second sharing affordance, when activated, triggers a second target application (e.g., a contacts application, as illustrated in FIG. 6K). Triggering different operations and/or different applications improves the operability of the device by reducing the need for the user to manually perform the operations and/or launch the applications.

It should be understood that the particular order in which the operations in FIGS. 9A-9D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 1000) are also applicable in an analogous manner to method 900 described above with respect to FIGS. 9A-9D. For example, the user interfaces, user interface elements, images, data encoded in an optical machine-readable format, notifications, notification criteria etc., described above with reference to method 900 optionally have one or more of the characteristics of the user interfaces, user interface elements, images, data encoded in an optical machine-readable format, notifications, notification criteria, etc. described herein with reference to other methods described herein (e.g., methods 800 and 1000). For brevity, these details are not repeated here.

The operations in the information processing methods described above are, optionally implemented by running one or more functional modules in information processing apparatus such as general purpose processors (e.g., as described above with respect to FIGS. 1A and 3) or application-specific chips. Further, the operations described above with reference to FIGS. 9A-9D are, optionally, implemented by components depicted in FIGS. 1A-1B, or FIG. 3. For example, the receive operation 904 is, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 10A-10D illustrate a flow diagram of a method 1000 of handling encoded features that are in proximity of the device in accordance with some embodiments. The method 1000 is performed at an electronic device (e.g., the device 100 in FIG. 1A, or the device 300 in FIG. 3) with one or more processors, non-transitory memory, a display, and an input device. In some embodiments, the display is a touch-screen display and the input device is on or integrated with the display. In some embodiments, the display is separate from the input device. Some operations in method 1000 are, optionally, combined and/or the order of some operations is, optionally, changed.

As described below, the method 1000 provides an intuitive way to handle encoded features that are in proximity of the device. The method improves the operability of the device by displaying a notification in response to detecting an encoded feature in proximity of the device. For battery-operated electronic devices, displaying the notification in response to detecting the encoded feature reduces the need for the user to manually enter the information corresponding to the encoded feature into the device thereby conserving power and increasing the time between battery charges.

The device detects (1002) proximity of the device to an encoded feature (e.g., the NFC tag 780*a* shown in FIG. 7A). In response to detecting proximity of the device to the encoded feature, the device displays, on the display, a notification (e.g., the notification 740*a* shown in FIG. 7B). Displaying the notification in response to the device being in proximity of the encoded feature provides the user with an option to act on encoded information stored in the encoded feature thereby improving the operability of the device and providing a better user experience. Providing the user with an option to act on the encoded information stored in the encoded feature enhances the operability of the device and makes the user-device interface more efficient (e.g., by reducing the need for a sequence of user inputs corresponding to manually effectuating an action indicated by the encoded information) which, additionally, reduces power usage and improves battery life of the device by enabling the user to use the device more quickly and efficiently.

In accordance with a determination that the encoded feature is a first type of encoded feature, the notification includes (1004) a first indication of the first type of encoded feature. As an example, in FIGS. 7A-7B, the first type of encoded feature is an NFC tag (e.g., the NFC tag 780*a* shown in FIG. 7A). In the example of FIG. 7B, the notification 740*a* includes an indication 744*a* that indicates that the device 100 has detected an NFC tag. Including an indication of the first type of encoded feature provides the user with an option to act on the first type of encoded feature thereby improving the operability of the device and providing a better user experience.

In accordance with a determination that the encoded feature is a second type of encoded feature that is different from the first type of encoded feature, the notification includes (1008) a second indication of the second type of encoded feature, where the second indication is a graphical indication. As an example, in FIGS. 7C-7D, the second type of encoded feature is a beacon (e.g., the beacon 781 shown in FIG. 7C). In the example of FIG. 7D, the notification 740*b* includes an indication 744*b* that indicates that the device 100 has detected a beacon 781. Including an indication of the second type of encoded feature provides the user with an option to act on the second type of encoded feature thereby improving the operability of the device and providing a better user experience.

In some embodiments, the first type of encoded feature includes (1006) data encoded in an optical machine-readable (e.g., the encoded data 780*c* shown in FIG. 7E), and where the second type of encoded feature includes one of a beacon (e.g., the beacon 781 shown in FIG. 7C) and a Near Field Communications (NFC) tag (e.g., the NFC tag 780*a* shown in FIG. 7A).

Figure 10B:
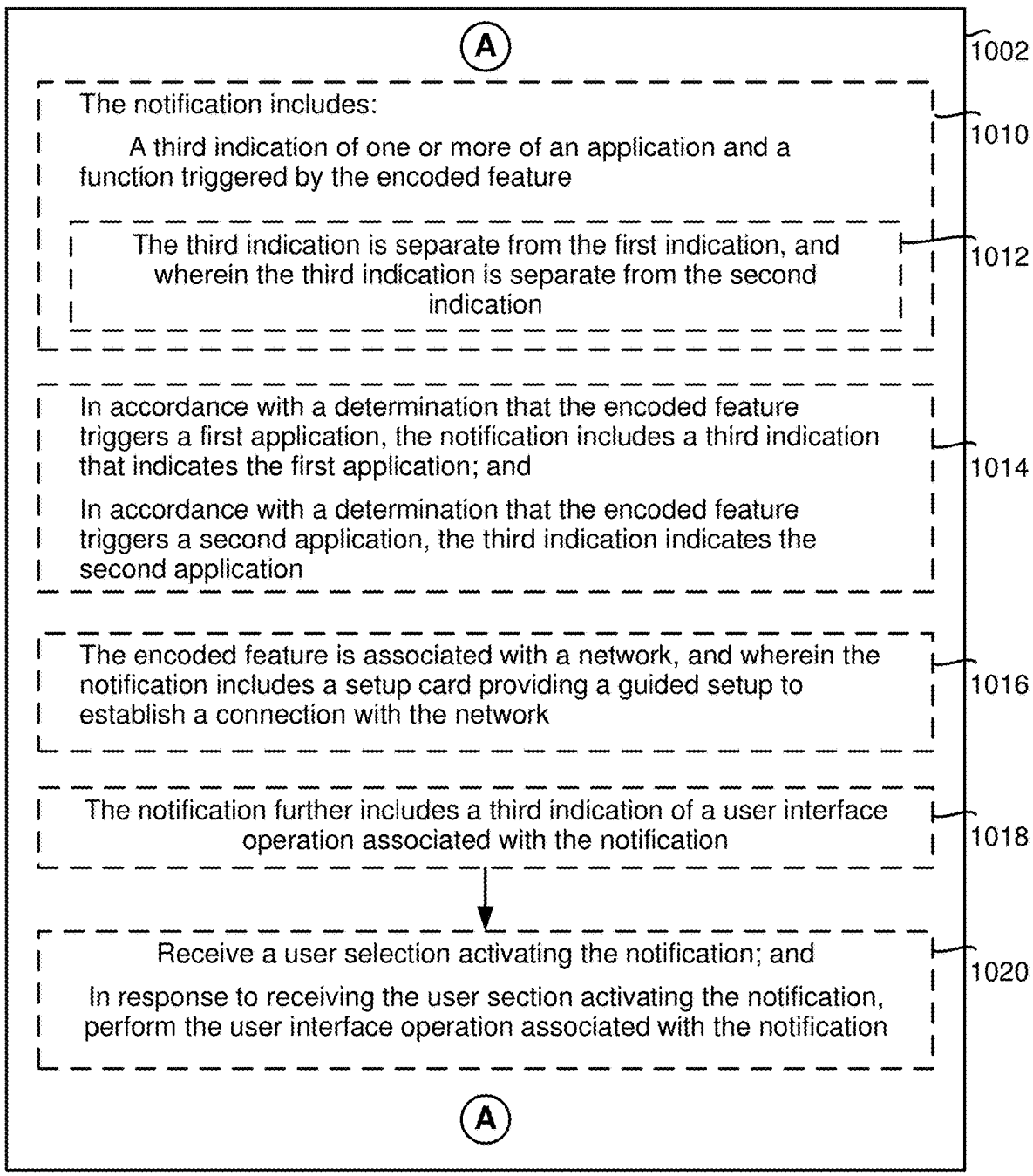

Referring to FIG. 10B, the notification includes (1010) a third indication of one or more of an application (e.g., the icon 748*a* shown in FIG. 7B) and a function triggered by the encoded feature (e.g., the descriptor 752*a* shown in FIG. 7B). In some embodiments, the third indication is separate (1012) from the first indication, and where the third indication is separate from the second indication. Indicating the application and/or the function provides the user with an option to activate the notification and cause the device to launch the application and/or perform the function without requiring a sequence of user inputs thereby improving the efficiency of the device. Performing the function enhances the operability of the device and makes the user-device interface more efficient (e.g., by reducing the need for a sequence of user inputs corresponding to manually effectuating the function) which, additionally, reduces power usage and improves battery life of the device by enabling the user to use the device more quickly and efficiently.

In accordance with a determination that the encoded feature triggers a first application, the notification includes (1014) a third indication that indicates the first application. In accordance with a determination that the encoded feature triggers a second application, the third indication indicates the second application. As an example, in FIG. 7B, the notification 740*a* includes the icon 748*a* for the browser application, whereas in FIG. 7J the notification includes the phone icon 751*a* for the phone application. Indicating different applications allows the user to decide whether the user desires to utilize the indicated application by activating the notification thereby providing a better user experience.

The encoded feature is associated with a network, and the notification includes (1016) a setup card providing a guided setup to establish a connection with the network. As an example, in FIGS. 7O-7P, the notification 740*g* provides the user with an option to connect with a network. The device provides authentication information to the network without requiring the user to provide a sequence of user inputs corresponding to manually entering the authentication information thereby improving the efficiency of the device and providing a better user experience for the user.

In some embodiments, the notification further includes a third indication of a user interface operation associated with the notification. As an example, in FIG. 7B, the notification

740*a* includes the descriptor 752*a* that indicates the user interface operation associated with the notification 740*a*. Indicating the user interface operation provides the user with additional information to decide whether the user wants to perform the user interface operation by activating the notification.

In some embodiments, the device receives (1020) a user selection activating the notification. In response to receiving the user section activating the notification, the device performs the user interface operation associated with the notification. As an example, in FIGS. 7O-7P, the device 100 receives the user input 790*e* selecting the notification 740*g*. In response to receiving the user input 790*e*, the device connects to the Wi-Fi network. Performing the user interface operation reduces the need for the user to provide a sequence of user inputs corresponding to manually effectuating the user interface operation thereby improving the efficiency of the device and providing a better user experience.

Figure 10C:
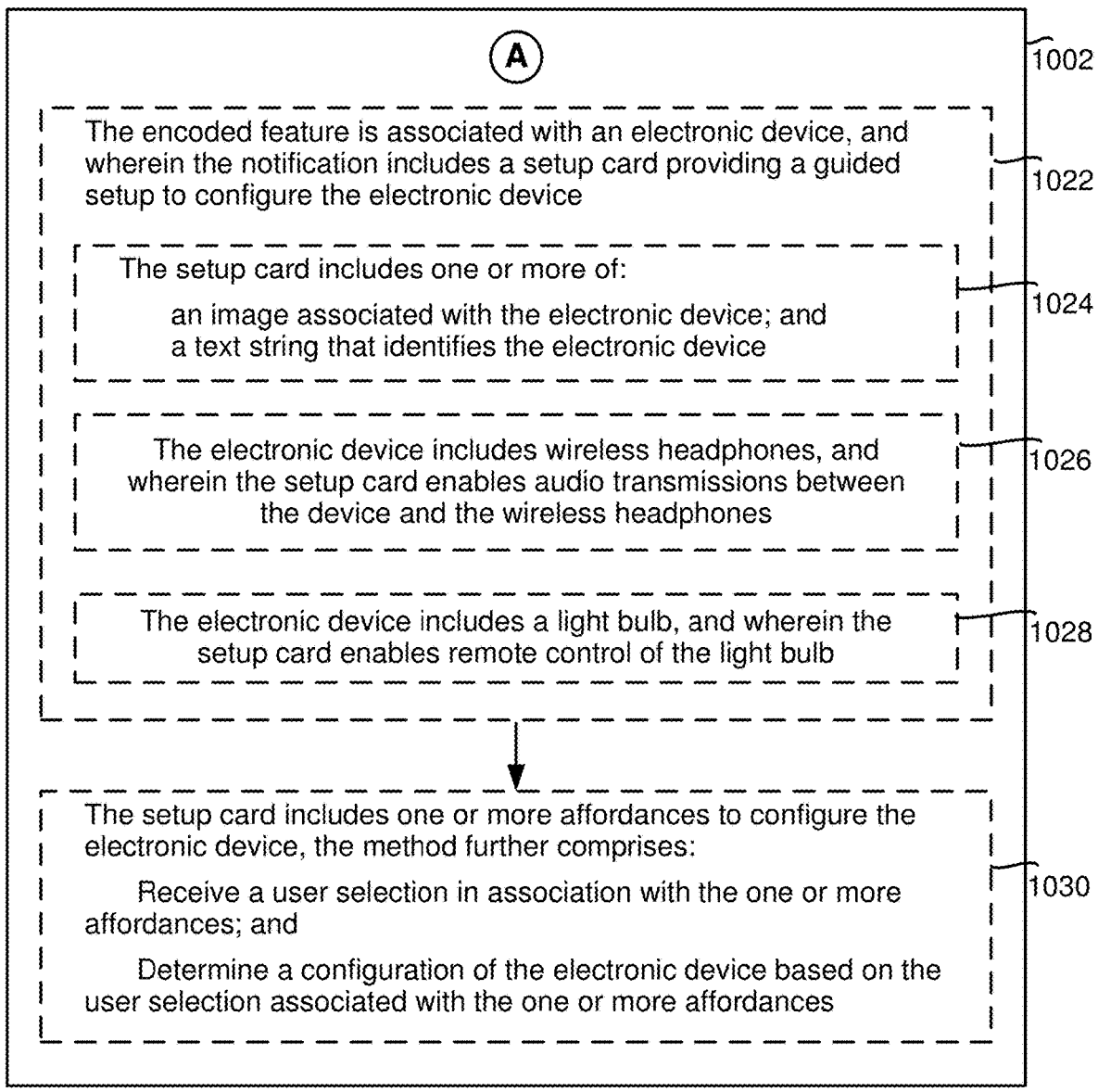

Referring to FIG. 10C, in some embodiments, the encoded feature is associated (1022) with an electronic device (e.g., the light bulb 760 shown in FIG. 7K), and the notification includes a setup card (e.g., the setup card 762*a* shown in FIG. 7L) providing a guided setup to configure the electronic device. The setup card allows the user to configure the electronic device thereby improving the operability of the device and providing an improved user experience.

In some embodiments, the setup card includes (1024) one or more of an image associated with the electronic device, and a text string that identifies the electronic device. As an example, in FIG. 7L, the setup card 762*a* includes an image of a light bulb and text (e.g., "light bulb"). In some embodiments, the electronic device includes (1026) wireless headphones, and the setup card enables audio transmissions between the device and the wireless headphones. In some embodiments, the electronic device includes (1028) a light bulb 760, and the setup card 762*a* enables remote control of the light bulb 760 (e.g., as shown in FIGS. 7K-7M).

In some embodiments, the setup card includes (1030) one or more affordances to configure the electronic device. In such embodiments, the device receives a user selection in association with the one or more affordances, determine a configuration of the electronic device based on the user selection associated with the one or more affordances. As an example, in FIG. 7M, the card 762*b* includes a brightness affordance 764*b*, a color affordance 764*c* and a schedule affordance 764*d*. In the example of FIG. 7M, the device 100 transmits configuration information 766 to the light bulb 760. Configuring the electronic device via the device allows the user to remotely control the electronic device. Presenting setup cards that allow remote control of the electronic device enhances the operability of the device and makes the user-device interface more efficient (e.g., by reducing the need for a sequence of user inputs corresponding to manually launching an application and navigating to a screen that allows control of the electronic device) which, additionally, reduces power usage and improves battery life of the device by enabling the user to use the device more quickly and efficiently.

Referring to FIG. 10D, in accordance with a determination that the encoded feature is associated with an ecosystem that includes the device, the device indicates (1032) via the notification that the encoded feature is part of the ecosystem. As an example, in FIG. 7L, displaying the setup card 762*a* indicates that the light bulb 760 and the device 100 are part of a shared ecosystem. In accordance with a determination that the encoded feature is not associated with the ecosystem that includes the device, the device forgoes indicating via the notification that the encoded feature is part of the ecosystem. As an example, in FIG. 7N, displaying the browser user interface 792*b* indicates that the light bulb 760 and the device 100 are not part of a shared ecosystem. Presenting a setup card with a different look-and-feel for the electronic devices that are in the same ecosystem as the device indicates that the device is capable of remotely controlling the electronic device. Presenting setup cards that allow remote control of the electronic device enhances the operability of the device and makes the user-device interface more efficient (e.g., by reducing the need for a sequence of user inputs corresponding to manually launching an application and navigating to a screen that allows control of the electronic device) which, additionally, reduces power usage and improves battery life of the device by enabling the user to use the device more quickly and efficiently.

In some embodiments, the encoded feature is associated (1034) with a network, and selection of the notification triggers an automatic process for joining the network and authenticating the device with the network. As an example, in FIGS. 7O-7P, the user input 790*e* selecting the notification 740*g* triggers an automatic process for joining the network and authenticating the device with the network. Triggering the automatic process eliminated the need for the user to provide a sequence of user inputs corresponding to manually entering the authentication information for the network thereby improving the efficiency of the device and providing a better user experience. Triggering the automatic process enhances the operability of the device and makes the user-device interface more efficient (e.g., by reducing the need for a sequence of user inputs corresponding to manually entering the authentication information into the device) which, additionally, reduces power usage and improves battery life of the device by enabling the user to use the device more quickly and efficiently.

It should be understood that the particular order in which the operations in FIGS. 10A-10D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 900) are also applicable in an analogous manner to method 1000 described above with respect to FIGS. 10A-10D. For example, the user interfaces, user interface elements, encoded features, notifications, notification criteria etc., described above with reference to method 1000 optionally have one or more of the characteristics of the user interfaces, user interface elements, encoded features, notification criteria, etc. described herein with reference to other methods described herein (e.g., methods 800 and 900). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips. The operations described above with reference to FIGS. 10A-10D are, optionally, implemented by components depicted in FIGS. 1A-1B, or FIG. 3. For example, the detect operation 1002 is, optionally, implemented by event sorter 170, event recognizer 180, and event handler 190. Event monitor 171 in event sorter 170 detects proximity of the device to an encoded feature, and event dispatcher module 174 delivers the event information to application 136-1. A respective event recognizer 180 of application 136-1 compares the event information to respective event definitions 186, and determines whether the encoded feature corresponds to a predefined event or sub-event, such as being a first type of encoded feature (e.g., an NFC tag, a beacon, and/or data encoded in an optical machine-readable format). When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
   at a device including a display, a camera, a non-transitory memory, and one or more processors coupled with the display, the camera and the non-transitory memory:
      displaying, on the display, a media capture user interface of a camera application that allows a user to capture one or more images, wherein displaying the media capture user interface of the camera application includes concurrently displaying:
         a media capture preview including an image of objects in a field of view of the camera that changes as the objects in the field of view of the camera change; and
         a media capture affordance that, when activated, stores, in the non-transitory memory, one or more images corresponding to the field of view of the camera; and
      while displaying the media capture user interface of the camera application:
         scanning the field of view of the camera for data encoded in an optical machine-readable format;
         in accordance with a determination that the field of view of the camera includes data encoded in the optical machine-readable format that meets respective notification criteria:
            displaying a notification that indicates that the camera application has detected data encoded in the optical machine-readable format, wherein the notification covers at least a portion of the media capture user interface;
            detecting a user input at a location corresponding to the notification; and
            in response to detecting the user input at the location corresponding to the notification and in accordance with a determination that the user input is of a first type that corresponds to a request to remove the notification, ceasing display of the notification and displaying the portion of the media capture user interface that was covered by the notification; and
         in accordance with a determination that the field of view of the camera does not include data encoded in the optical machine-readable format that meets the respective notification criteria, maintaining display of the media capture user interface of the camera application without displaying the notification.

2. The method of claim 1, wherein displaying the notification comprises:
   overlaying the notification on the media capture user interface while maintaining the display of the media capture affordance.

3. The method of claim 1, further comprising:
   while displaying the notification, receiving a user input that activates the media capture affordance; and
   in response to receiving the user input that activates the media capture affordance:
      removing the notification;
      storing, in the non-transitory memory, one or more images captured via the camera; and
      displaying, on the display, a representation of at least one of the one or more images.

4. The method of claim 1, wherein the optical machine-readable format includes a barcode, and wherein scanning the field of view of the camera includes scanning the field of view of the camera for the barcode.

5. The method of claim 4, wherein the barcode is a one-dimensional barcode, and wherein scanning the field of view of the camera includes scanning the field of view of the camera for the one-dimensional barcode.

6. The method of claim 4, wherein the barcode is a two-dimensional barcode, and wherein scanning the field of view of the camera includes scanning the field of view of the camera for the two-dimensional barcode.

7. The method of claim 1, wherein displaying the notification comprises:
   displaying a visual representation of the data encoded in the optical machine-readable format.

8. The method of claim 1, wherein the notification indicates a target application that is configured to act upon the data encoded in the optical machine-readable format.

9. The method of claim 8, wherein the notification indicates the target application by displaying an icon that corresponds with the target application.

10. The method of claim 1, wherein the notification includes an icon indicating that data encoded in the optical machine-readable format was detected in the field of view of the camera.

11. The method of claim 1, wherein the media capture user interface is associated with a first value for a display property and the notification is associated with a second value for the display property, wherein the second value is different from the first value.

12. The method of claim 1, wherein displaying the notification comprises:
   displaying the notification in the form of a banner that is located towards the top of the media capture user interface.

13. The method of claim 1, further comprising:
   in accordance with a determination that the notification has been displayed for a predetermined amount of time, removing the notification.

14. The method of claim 1, wherein displaying the notification prevents a user of the device from utilizing a portion of a functionality provided by the media capture user interface; and
wherein ceasing display of the notification allows the user of the device to utilize an entirety of the functionality provided by the media capture user interface.

15. The method of claim 1, further comprising:
in response to detecting the user input at the location corresponding to the notification and in accordance with a determination that the user input is of a second type that corresponds to a request to perform a user interface operation, performing a user interface operation associated with the notification.

16. The method of claim 15, wherein performing the user interface operation comprises:
presenting a user interface generated by a target application that is associated with the notification, wherein the user interface displays:
information related to the data encoded in the optical machine-readable format; and
an affordance that, when selected, triggers an action that acts upon the information.

17. The method of claim 1, further comprises:
in response to detecting the user input at the location corresponding to the notification and in accordance with a determination that the user input is of a third type that corresponds to a request to expand the notification, displaying an expanded view of the notification.

18. The method of claim 17, wherein displaying the expanded view comprises:
presenting, within the notification, a plurality of affordances, each affordance being associated with a respective user interface operation; and
in response to a selection of a first affordance of the plurality of affordances, performing the respective user interface operation associated with the first affordance.

19. The method of claim 1, further comprising:
determining whether the data encoded in the optical machine-readable format occupies at least a threshold percentage of the field of view of the camera;
in response to a determination that the data encoded in the optical machine-readable format occupies at least the threshold percentage of the field of view of the camera, determining that the data encoded in the optical machine-readable format meets the respective notification criteria; and
in response to a determination that the data encoded in the optical machine-readable format does not occupy at least the threshold percentage of the field of view of the camera, determining that the data encoded in the optical machine-readable format does not meet the respective notification criteria.

20. An electronic device comprising:
a display;
an input device;
one or more processors; and
non-transitory memory including one or more programs having computer-readable instructions, that when executed by the one or more processors, cause the electronic device to:
display, on the display, a media capture user interface of a camera application that allows a user to capture one or more images, wherein the media capture user interface of the camera application concurrently includes:
a media capture preview including an image of objects in a field of view of the camera that changes as the objects in the field of view of the camera change; and
a media capture affordance that, when activated, stores, in the non- transitory memory, one or more images corresponding to the field of view of the camera; and
while displaying the media capture user interface of the camera application:
scan the field of view of the camera for data encoded in an optical machine-readable format;
in accordance with a determination that the field of view of the camera includes data encoded in the optical machine-readable format that meets respective notification criteria:
display a notification that indicates that the camera application has detected data encoded in the optical machine-readable format, wherein the notification covers at least a portion of the media capture user interface;
detect a user input at a location corresponding to the notification; and
in response to detecting the user input at the location corresponding to the notification and in accordance with a determination that the user input is of a first type that corresponds to a request to remove the notification, cease display of the notification and display the portion of the media capture user interface that was covered by the notification; and
in accordance with a determination that the field of view of the camera does not include data encoded in the optical machine-readable format that meets the respective notification criteria, maintaining display of the media capture user interface of the camera application without displaying the notification.

21. The electronic device of claim 20, wherein displaying the notification comprises:
overlaying the notification on the media capture user interface while maintaining the display of the media capture affordance.

22. The electronic device of claim 20, wherein the one or more programs further cause the electronic device to:
while displaying the notification, receive a user input that activates the media capture affordance; and
in response to receiving the user input that activates the media capture affordance:
remove the notification;
store, in the non-transitory memory, one or more images captured via the camera; and
display, on the display, a representation of at least one of the one or more images.

23. The electronic device of claim 20, wherein the optical machine-readable format includes a barcode, and wherein scanning the field of view of the camera includes scanning the field of view of the camera for the barcode.

24. The electronic device of claim 23, wherein the barcode is a one-dimensional barcode, and wherein scanning the field of view of the camera includes scanning the field of view of the camera for the one-dimensional barcode.

25. The electronic device of claim 23, wherein the barcode is a two-dimensional barcode, and wherein scanning the field of view of the camera includes scanning the field of view of the camera for the two-dimensional barcode.

26. The electronic device of claim 20, wherein displaying the notification comprises:

displaying a visual representation of the data encoded in the optical machine-readable format.

27. The electronic device of claim 20, wherein the notification indicates a target application that is configured to act upon the data encoded in the optical machine-readable format.

28. The electronic device of claim 27, wherein the notification indicates the target application by displaying an icon that corresponds with the target application.

29. The electronic device of claim 20, wherein the notification includes an icon indicating that data encoded in the optical machine-readable format was detected in the field of view of the camera.

30. The electronic device of claim 20, wherein the media capture user interface is associated with a first value for a display property and the notification is associated with a second value for the display property, wherein the second value is different from the first value.

31. The electronic device of claim 20, wherein displaying the notification comprises:
  displaying the notification in the form of a banner that is located towards the top of the media capture user interface.

32. The electronic device of claim 20, wherein the one or more programs further cause the electronic device to:
  in accordance with a determination that the notification has been displayed for a predetermined amount of time, remove the notification.

33. The electronic device of claim 20, wherein the one or more programs further cause the electronic device to:
  in response to detecting the user input at the location corresponding to the notification and in accordance with a determination that the user input is of a second type that corresponds to a request to perform a user interface operation, perform a user interface operation associated with the notification.

34. The electronic device of claim 33, wherein performing the user interface operation comprises:
  presenting a user interface generated by a target application that is associated with the notification, wherein the user interface displays:
    information related to the data encoded in the optical machine-readable format; and
    an affordance that, when selected, triggers an action that acts upon the information.

35. The electronic device of claim 20, wherein the one or more programs further cause the electronic device to:
  in response to detecting the user input at the location corresponding to the notification and in accordance with a determination that the user input is of a third type that corresponds to a request to expand the notification, display an expanded view of the notification.

36. The electronic device of claim 35, wherein displaying the expanded view comprises:
  presenting, within the notification, a plurality of affordances, each affordance being associated with a respective user interface operation; and
  in response to a selection of a first affordance of the plurality of affordances, performing the respective user interface operation associated with the first affordance.

37. The electronic device of claim 20, wherein the one or more programs further cause the electronic device to:
  determine whether the data encoded in the optical machine-readable format occupies at least a threshold percentage of the field of view of the camera;
  in response to a determination that the data encoded in the optical machine-readable format occupies at least the threshold percentage of the field of view of the camera, determine that the data encoded in the optical machine-readable format meets the respective notification criteria; and
  in response to a determination that the data encoded in the optical machine-readable format does not occupy at least the threshold percentage of the field of view of the camera, determine that the data encoded in the optical machine-readable format does not meet the respective notification criteria.

38. The electronic device of claim 20, wherein displaying the notification prevents a user of the device from utilizing a portion of a functionality provided by the media capture user interface; and
  wherein ceasing display of the notification allows the user of the device to utilize an entirety of the functionality provided by the media capture user interface.

39. A non-transitory computer readable storage medium storing one or more programs, the one or more programs comprising instructions, which, when executed by an electronic device with a display and an input device, cause the electronic device to:
  display, on the display, a media capture user interface of a camera application that allows a user to capture one or more images, wherein the media capture user interface of the camera application concurrently includes:
    a media capture preview including an image of objects in a field of view of the camera that changes as the objects in the field of view of the camera change; and
    a media capture affordance that, when activated, stores, in the non- transitory memory, one or more images corresponding to the field of view of the camera; and
  while displaying the media capture user interface of the camera application:
    scan the field of view of the camera for data encoded in an optical machine-readable format;
    in accordance with a determination that the field of view of the camera includes data encoded in the optical machine-readable format that meets respective notification criteria:
      display a notification that indicates that the camera application has detected data encoded in the optical machine-readable format, wherein the notification covers at least a portion of the media capture user interface;
      detect a user input at a location corresponding to the notification; and
      in response to detecting the user input at the location corresponding to the notification and in accordance with a determination that the user input is of a first type that corresponds to a request to remove the notification, cease display of the notification and display the portion of the media capture user interface that was covered by the notification; and
    in accordance with a determination that the field of view of the camera does not include data encoded in the optical machine-readable format that meets the respective notification criteria, maintaining display of the media capture user interface of the camera application without displaying the notification.

40. The non-transitory computer readable storage medium of claim 39, wherein displaying the notification comprises:
  overlaying the notification on the media capture user interface while maintaining the display of the media capture affordance 41. The non-transitory computer readable storage medium of claim 39, wherein the one or more programs further cause the electronic device to:
- while displaying the notification, receive a user input that activates the media capture affordance; and
- in response to receiving the user input that activates the media capture affordance:
  - remove the notification;
  - store, in the non-transitory memory, one or more images captured via the camera; and
  - display, on the display, a representation of at least one of the one or more images.

42. The non-transitory computer readable storage medium of claim 39, wherein the optical machine-readable format includes a barcode, and wherein scanning the field of view of the camera includes scanning the field of view of the camera for the barcode.

43. The non-transitory computer readable storage medium of claim 42, wherein the barcode is a one-dimensional barcode, and wherein scanning the field of view of the camera includes scanning the field of view of the camera for the one-dimensional barcode.

44. The non-transitory computer readable storage medium of claim 42, wherein the barcode is a two-dimensional barcode, and wherein scanning the field of view of the camera includes scanning the field of view of the camera for the two-dimensional barcode.

45. The non-transitory computer readable storage medium of claim 39, wherein displaying the notification comprises:
- displaying a visual representation of the data encoded in the optical machine-readable format.

46. The non-transitory computer readable storage medium of claim 39, wherein the notification indicates a target application that is configured to act upon the data encoded in the optical machine-readable format.

47. The non-transitory computer readable storage medium of claim 46, wherein the notification indicates the target application by displaying an icon that corresponds with the target application.

48. The non-transitory computer readable storage medium of claim 39, wherein the notification includes an icon indicating that data encoded in the optical machine-readable format was detected in the field of view of the camera.

49. The non-transitory computer readable storage medium of claim 39, wherein the media capture user interface is associated with a first value for a display property and the notification is associated with a second value for the display property, wherein the second value is different from the first value.

50. The non-transitory computer readable storage medium of claim 39, wherein displaying the notification comprises:
- displaying the notification in the form of a banner that is located towards the top of the media capture user interface.

51. The non-transitory computer readable storage medium of claim 39, wherein the one or more programs further cause the electronic device to:
- in accordance with a determination that the notification has been displayed for a predetermined amount of time, remove the notification.

52. The non-transitory computer readable storage medium of claim 39, wherein the one or more programs further cause the electronic device to:
- in response to detecting the user input at the location corresponding to the notification and in accordance with a determination that the user input is of a second type that corresponds to a request to perform a user interface operation, perform a user interface operation associated with the notification.

53. The non-transitory computer readable storage medium of claim 52, wherein performing the user interface operation comprises:
- presenting a user interface generated by a target application that is associated with the notification, wherein the user interface displays:
  - information related to the data encoded in the optical machine-readable format; and
  - an affordance that, when selected, triggers an action that acts upon the information.

54. The non-transitory computer readable storage medium of claim 39, wherein the one or more programs further cause the electronic device to:
- in response to detecting the user input at the location corresponding to the notification and in accordance with a determination that the user input is of a third type that corresponds to a request to expand the notification, display an expanded view of the notification.

55. The non-transitory computer readable storage medium of claim 54, wherein displaying the expanded view comprises:
- presenting, within the notification, a plurality of affordances, each affordance being associated with a respective user interface operation; and
- in response to a selection of a first affordance of the plurality of affordances, performing the respective user interface operation associated with the first affordance.

56. The non-transitory computer readable storage medium of claim 39, wherein the one or more programs further cause the electronic device to:
- determine whether the data encoded in the optical machine-readable format occupies at least a threshold percentage of the field of view of the camera;
- in response to a determination that the data encoded in the optical machine-readable format occupies at least the threshold percentage of the field of view of the camera, determine that the data encoded in the optical machine-readable format meets the respective notification criteria; and
- in response to a determination that the data encoded in the optical machine-readable format does not occupy at least the threshold percentage of the field of view of the camera, determine that the data encoded in the optical machine-readable format does not meet the respective notification criteria.

57. The non-transitory computer readable storage medium of claim 39, wherein displaying the notification prevents a user of the device from utilizing a portion of a functionality provided by the media capture user interface; and
- wherein ceasing display of the notification allows the user of the device to utilize an entirety of the functionality provided by the media capture user interface.

* * * * *